US011387969B2

(12) United States Patent
Jia et al.

(10) Patent No.: US 11,387,969 B2
(45) Date of Patent: Jul. 12, 2022

(54) SIGNAL TRANSMISSION METHOD, RELATED DEVICE, AND SYSTEM

(71) Applicant: HUAWEI TECHNOLOGIES CO., LTD., Guangdong (CN)

(72) Inventors: Qiong Jia, Shanghai (CN); Jun Zhu, Shenzhen (CN); Yingpei Lin, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 46 days.

(21) Appl. No.: 16/706,017

(22) Filed: Dec. 6, 2019

(65) Prior Publication Data

US 2020/0119894 A1   Apr. 16, 2020

Related U.S. Application Data

(63) Continuation of application No. PCT/CN2018/090517, filed on Jun. 8, 2018.

(30) Foreign Application Priority Data

Jun. 9, 2017  (CN) .......................... 201710435815.6

(51) Int. Cl.
*H04L 12/28* (2006.01)
*H04L 5/00* (2006.01)
(Continued)

(52) U.S. Cl.
CPC .......... *H04L 5/0092* (2013.01); *H04L 5/0094* (2013.01); *H04W 72/0413* (2013.01);
(Continued)

(58) Field of Classification Search
CPC ..... H04L 5/001; H04L 5/0094; H04L 5/0453; H04W 72/0413; H04W 72/0496;
(Continued)

(56) References Cited

U.S. PATENT DOCUMENTS

2007/0097942 A1* 5/2007 Gorokhov ............ H04B 7/2656
370/342
2008/0310535 A1  12/2008 Kwon et al.
(Continued)

FOREIGN PATENT DOCUMENTS

CN  101146317 A  3/2008
CN  104704765 A  6/2015
(Continued)

OTHER PUBLICATIONS

Sequans Communications:"RB Allocation for PUSCH", 3GPP TSG RAN WG1 Meeting #84bis R1-162756, Busan, Korea, Apr. 11-15, 2016. total 3 pages.
(Continued)

*Primary Examiner* — John Pezzlo
(74) *Attorney, Agent, or Firm* — Womble Bond Dickinson (US) LLP

(57) ABSTRACT

Embodiments of this application disclose a signal transmission method, a related device, and a system. The method may include: receiving first indication information sent by a network device, where the first indication information is used to indicate an uplink resource that is allocated by the network device to a terminal in a first bandwidth; the resource indicated by the first indication information includes an integer quantity of resource blocks evenly distributed in a part or all of the first bandwidth; performing uplink transmission in a detected idle second bandwidth; and sending second indication information to the network device, where the second indication information is used to indicate the second bandwidth. This solution can support flexible bandwidth transmission, and can better adapt to a multi-bandwidth scenario supported by a next-generation new radio technology.

27 Claims, 16 Drawing Sheets

(51) Int. Cl.
*H04W 72/04* (2009.01)
*H04W 74/08* (2009.01)
*H04J 1/16* (2006.01)

(52) U.S. Cl.
CPC ... *H04W 72/0453* (2013.01); *H04W 72/0473* (2013.01); *H04W 74/0808* (2013.01)

(58) Field of Classification Search
CPC ......... H04W 74/0808; H04W 72/0453; H04W 16/14; H04B 7/2656
USPC ........ 370/252, 329, 386, 430; 270/252, 329, 270/386, 430
See application file for complete search history.

(56) References Cited

U.S. PATENT DOCUMENTS

| | | | | |
|---|---|---|---|---|
| 2015/0092703 | A1* | 4/2015 | Xu | H04L 5/003 370/329 |
| 2015/0156638 | A1 | 6/2015 | Yerramalli et al. | |
| 2015/0358826 | A1 | 12/2015 | Wei et al. | |
| 2016/0100407 | A1 | 4/2016 | Gaal et al. | |
| 2016/0344526 | A1* | 11/2016 | Fan | H04W 72/0446 |
| 2020/0077437 | A1* | 3/2020 | Stern-Berkowitz | H04W 74/0808 |
| 2020/0413426 | A1* | 12/2020 | Park | H04L 5/0094 |

FOREIGN PATENT DOCUMENTS

| | | |
|---|---|---|
| CN | 105072690 A | 11/2015 |
| CN | 105636211 A | 6/2016 |
| CN | 106231614 A | 12/2016 |
| WO | 2016057298 A1 | 4/2016 |
| WO | 2016197825 A1 | 12/2016 |
| WO | 2017035937 A1 | 3/2017 |
| WO | 2017061157 A1 | 4/2017 |

OTHER PUBLICATIONS

3GPP TS 38.211 V0.0.0 (May 2017), 3rd Generation Partnership Project; Technical Specification Group Radio Access Network; NR; Physical channels and modulation(Release 15), May 2017. total 10 pages.
LG Electronics,"PUSCH transmission in LAA",3GPP TSG HAN WG1 meeting #84 R1-160625,St Julian s, Malta, Feb. 15-19, 2016,total 6 pages.
Huawei, HiSilicon, Resource allocation for RB interleaved PUSCH for eLAA. 3GPP TSG RAN WG1 Meeting #85 , Nanjing, China, May 23-27, 2016, R1-164055, 7 pages.
KT Corp., Resource Allocation with Minimal Predefined Patterns for eLAA PUSCH. 3GPP TSG RAN WG1 Meeting £86, Gothenburg, Sweden, Aug. 23-27, 2016, R1-167776, 5 pages.
3GPP TSG-RAN WG1#84,R1-160994:"Uplink Resource Allocation Design for Enhanced LAA",Ericsson,St Julian s, Malta, Feb. 15-19, 2016,total 3 pages.
3GPP TSG RAN WG1 Meeting #85,R1-164574, On UL Resources Allocation for PUSCH,ZTE, Nanjing, China May 23-27, 2016,total 2 pages.
Qualcomm Incorporated, On performance requirements for Rel /14 eLAA,3GPP TSG RAN WG4 #81 R4-1609708, 3GPP, Nov. 4, 2016, 2015,total 6 pages.
LG Electronics, PUSCH resource allocation in LAA,3GPP TSG / RAN WG1#85 R1-164495, 3GPP, 2016, Jan. 14, 2005, total 7 pages.
Huawei, HiSilicon, On uplink resource allocation, 3GPP TSG RAN WG1 #89 R1 / 1708120, 3GPP, May 6, 2017,total 5 pages.

* cited by examiner

SIGNAL TRANSMISSION METHOD, RELATED DEVICE, AND SYSTEM

CROSS-REFERENCE TO RELATED APPLICATIONS

This application is a continuation of International Application No. PCT/CN2018/090517, filed on Jun. 8, 2018, which claims priority to Chinese Patent Application No. 201710435815.6, filed on Jun. 9, 2017. The disclosures of the aforementioned applications are hereby incorporated by reference in their entireties.

TECHNICAL FIELD

This application relates to the field of wireless communications technologies, and in particular, to a signal transmission method, a related device, and a system.

BACKGROUND

Rapid development of wireless communications technologies leads to a strain on spectrum resources, driving exploration on unlicensed frequency bands. However, there are many regulatory restrictions on use of the unlicensed frequency bands. On one hand, there are restrictions on an occupied channel bandwidth (OCB) of signals on the unlicensed frequency bands. As stipulated by the European Telecommunications Standards Institute (ETSI), for the 2.4 GHz and 5 GHz frequency bands, a signal transmission bandwidth needs to occupy at least 80% of a system bandwidth, and for the 60 GHz frequency band, a signal transmission bandwidth needs to occupy at least 70% of a system bandwidth. On the other hand, there are restrictions on transmit power of signals on the unlicensed frequency bands. For example, ETSI requires that a maximum power spectrum density of signals is 10 dBm/MHz on a 5150-5350 MHz frequency band.

In LTE Release 13, an enhanced licensed-assisted access (eLAA) technology is introduced into uplink transmission. To meet the OCB specifications of ESTI, the eLAA uses a resource interlace structure. One resource interlace includes 10 resource blocks (RB) that are evenly distributed in the system bandwidth. As shown in FIG. 1, if a system bandwidth is 20 MHz, corresponding to 100 RBs (an RB 0 to an RB 99), each resource interlace consists of 10 resource blocks that are evenly distributed in the entire bandwidth, and there are 10 RBs between every two adjacent RBs in each resource interlace. This ensures that each interlace has a frequency span (a bandwidth span between RBs on two ends) of 91 RBs, approximately 16.38 MHz, which is greater than 80% of the 20 MHz system bandwidth.

In addition, a communications system deployed on an unlicensed frequency band usually uses/shares a radio resource by using a listen before talk (LBT) mechanism. Before sending a signal, a station usually first listens to whether the unlicensed frequency band is idle. For example, the station determines a busy/idle state based on received power of a signal on the unlicensed frequency band. If the received power is less than a threshold, the station considers that the unlicensed frequency band is in an idle state, and can send the signal on the unlicensed frequency band. If the received power is greater than the threshold, the station considers that the unlicensed frequency band is in a busy state, and cannot send the signal on the unlicensed frequency band.

In a future 5th generation (5G) or new radio (NR) communications system, an unlicensed frequency band is also an indispensable technical means to meet a service requirement and enhance user experience. Compared with the existing LTE/LTE-A system, the future 5G or NR system supports more flexible bandwidth and implements more reliable and high-speed service transmission. In the future 5G or NR system, based on the LBT mechanism on the unlicensed frequency band, bandwidths that can be accessed may vary with different stations. Particularly, an actually accessed bandwidth of a terminal may be inconsistent with a bandwidth indicated by a base station. The existing resource interlace includes a fixed quantity (for example, 10) of RBs. If an idle bandwidth detected by the terminal by using the LBT is inconsistent with the bandwidth indicated by the base station, the terminal cannot use the idle bandwidth to transmit data, or cannot support flexible bandwidth transmission in the future communications system.

SUMMARY

To resolve a technical problem that an existing resource interlace solution cannot support flexible bandwidth transmission, embodiments of this application provide a signal transmission method, a related device, and a system, to support flexible bandwidth transmission, and better adapt to a multi-bandwidth scenario supported by a next-generation new radio technology.

According to a first aspect, this application provides a signal transmission method, applied to a network device side. The method includes: allocating an integer quantity of resource blocks evenly distributed in a part or all of a first bandwidth to a terminal as an uplink resource, and sending first indication information to a terminal, where the first indication information is used to indicate the uplink resource allocated by a network device to the terminal in the first bandwidth; and receiving second indication information sent by the terminal, where the second indication information is used to indicate an idle second bandwidth that is detected by the terminal and that is used for uplink transmission.

According to a second aspect, this application provides a signal transmission method, applied to a terminal side. The method includes: receiving first indication information sent by a network device, where the first indication information is used to indicate an uplink resource that is allocated by the network device to a terminal in a first bandwidth, and the resource indicated by the first indication information includes an integer quantity of resource blocks evenly distributed in a part or all of the first bandwidth; performing uplink transmission on the detected idle second bandwidth; and sending second indication information to the network device, where the second indication information is used to indicate the second bandwidth.

In this application, the first bandwidth is an available bandwidth in which the network device performs uplink resource scheduling, and the second bandwidth is an available bandwidth that is detected by the terminal by using LBT and that is used for uplink transmission. The first bandwidth may be an available bandwidth that is detected by the network device by using LBT when the network device performs resource scheduling. It should be understood that, even if the available bandwidth detected by the terminal by using LBT may be greater than the first bandwidth, the terminal still needs to perform uplink transmission according to an indication of the network device. In other words, the available bandwidth (namely, the second bandwidth) that is detected by the terminal by using LBT and that is used for uplink transmission can only be less than or equal to the first bandwidth.

The methods described in the first aspect and the second aspect can support flexible bandwidth transmission, and can better adapt to a multi-bandwidth scenario supported by a next-generation new radio technology.

With reference to the first aspect or the second aspect, this application mainly provides three resource scheduling manners. The following describes the three resource scheduling manners in detail.

In a first resource scheduling manner, the network device performs bandwidth resource scheduling in the first bandwidth at a full bandwidth level, and performs resource scheduling based on a fixed RB spacing of a resource interlace. In other words, the RB spacing does not change with the first bandwidth. Different from an existing resource interlace defined in the LTE, the RB spacing of the resource interlace defined in this application is fixed and does not change with a bandwidth.

For ease of subsequent description, an example in which an RB spacing of resource interlace in different bandwidths is fixed at N (N is a positive integer) is used. In other words, the resource indicated by the first indication information includes one or more resource interlaces evenly distributed in the first bandwidth, a spacing between two adjacent resource blocks in the resource interlaces is fixed at N and does not change with the first bandwidth, and N is a positive integer.

With reference to the first aspect or the second aspect, when the first resource scheduling manner is implemented, if the second bandwidth is equal to the first bandwidth, the terminal may perform uplink transmission on the resource indicated by the first indication information. If the second bandwidth is less than the first bandwidth, the terminal may perform uplink transmission on a resource that is in the second bandwidth and that is indicated by the first indication information.

With reference to the first aspect or the second aspect, when the first resource scheduling manner is implemented, if the second bandwidth is equal to the first bandwidth, the terminal may perform uplink transmission on the resource indicated by the first indication information at a transmit power not being 0; and if the second bandwidth is less than the first bandwidth, the terminal may perform uplink transmission on the resource indicated by the first indication information, where a transmit power for performing uplink transmission on the resource that is in the second bandwidth and that is indicated by the first indication information is not 0, and a transmit power for performing uplink transmission on the resource that is beyond the second bandwidth and that is indicated by the first indication information is 0.

With reference to the first aspect or the second aspect, when the first resource scheduling manner is implemented, the first indication information may be implemented as follows.

(1) The first indication information is implemented by using signaling.

In one embodiment of this application, the network device may add the first indication information to downlink control information (DCI). In one embodiment, a field may be added to the DCI to indicate a resource interlace allocated to the terminal. Alternatively, a related field used for resource indication in an existing DCI format, for example, an RB resource allocation field, may be used to indicate a resource block allocated to the terminal.

In one embodiment, the network device may alternatively add the first indication information to other response messages in response to a scheduling request, or the network device may alternatively encapsulate the first indication information into one message, and return the message to the terminal. This embodiment of this application imposes no limitation on how the network device sends the first indication information.

(2) Content in the first indication information is implemented as follows.

In one embodiment, the first indication information may include indication information of the first bandwidth, and an index of one or more resource interlaces that are allocated by the network device to the terminal in the first bandwidth.

In one embodiment, the first indication information may include an index of a start RB included in each of one or more resource interlaces allocated by the network device to the terminal in the first bandwidth, and a quantity of RBs. In this way, the terminal may learn a position of an actually allocated RB based on the index of the start RB included in each of the one or more resource interlaces, and the quantity of RBs.

In one embodiment, the first indication information may include an index of a start RB included in each of one or more resource interlaces allocated by the network device to the terminal in the first bandwidth, and a total quantity of RBs allocated by the network device to the terminal. Herein, a quantity of start RBs is a quantity of resource interlaces allocated by the network device. In this way, the terminal may obtain a quantity of RBs in one resource interlace by dividing the total quantity of RBs by the quantity of start RBs. In other words, the terminal may learn a resource interlace structure.

In one embodiment, the first indication information may include indication information of the first bandwidth, a quantity of resource interlaces allocated by the network device to the terminal, and an index of a start RB allocated by the network device to the terminal.

In one embodiment, a resource indicator value (RIV) may be used to indicate the resource interlace allocated by the network device to the terminal. This application is not limited to the foregoing implementations. The network device and the terminal may further agree on more resource indication manners. For example, the first indication information may include an index of an RB that is actually allocated by the network device to the terminal.

With reference to the first aspect or the second aspect, when the first resource scheduling manner is implemented, the second indication information may be implemented as follows.

The terminal may add the second indication information to uplink data. In one embodiment, the terminal may send the second indication information in a first symbol of uplink transmission, and may add the second indication information to each subcarrier actually occupied by uplink transmission. This application is not limited to this implementation. The terminal may alternatively add the second indication information in an uplink control signal related to the uplink data. The terminal may alternatively encapsulate the second indication information into one message, and send the message to the network device. A manner of implementing the second indication information (in other words, how the terminal sends the second indication information) is not limited in this embodiment of this application.

In one embodiment, the second indication information may include information about a size of the second bandwidth, or information about an index of a carrier or a subcarrier actually occupied by uplink transmission. The second indication information may alternatively include information about a carrier or subcarrier range actually occupied by uplink transmission, namely, a frequency span. This application is not limited to the two manners. The terminal may alternatively report, in another manner, a bandwidth actually occupied by uplink transmission, for example, index information of an RB actually occupied by uplink transmission. The example is merely used to explain this application and shall not be construed as a limitation.

In a second resource scheduling manner, the network device performs subband resource scheduling in the first bandwidth at a subband level, and performs resource scheduling based on an interlace segment corresponding to a subband. Herein, an interlace is one that is evenly distributed on the full bandwidth of the first bandwidth and whose RB spacing is fixed at N, namely, an interlace corresponding to the first bandwidth. Different from the first resource scheduling manner, resource allocation is not performed based on the interlace corresponding to the first bandwidth. Instead, the interlace corresponding to the first bandwidth is divided into interlace segments corresponding to a plurality of subbands, and a resource is allocated based on an interlace segment corresponding to each subband.

It should be understood that, a subband bandwidth is less than a full bandwidth (the first bandwidth in the first resource scheduling manner), and therefore performing LBT on a subband can fully use an idle resource and facilitate timely transmission of uplink data.

With reference to the first aspect or the second aspect, when the second resource scheduling manner is implemented, the terminal may perform uplink transmission on an idle detected subband.

With reference to the first aspect or the second aspect, when the second resource scheduling manner is implemented, for details about implementation of the first indication information by using signaling, refer to related content in the first resource scheduling manner.

With reference to the first aspect or the second aspect, when the second resource scheduling manner is implemented, content of the first indication information may be implemented as follows.

In one embodiment, the first indication information may include an index of a subband corresponding to an interlace segment allocated by the network device to the terminal, and an index of an interlace corresponding to the interlace segment.

In one embodiment, the first indication information may include an index of a subband corresponding to an interlace segment allocated by the network device to the terminal, and an index of a start RB in an interlace corresponding to the interlace segment.

In one embodiment, the first indication information may include an index of an interlace corresponding to an interlace segment allocated by the network device to the terminal, and a segment index of the interlace segment in the interlace.

In one embodiment, the first indication information may include indication information $W_{subband}$ of a subband bandwidth corresponding to an interlace segment allocated by the network device to the terminal, a quantity L of interlaces related to the interlace segment, and an index $RB_{START}$ of a start RB allocated by the network device to the terminal.

In one embodiment, a resource indicator value (RIV) may be used to indicate a resource block allocated by the network device to the terminal on a single subband. This application is not limited to the foregoing implementations. The network device and the terminal may further agree on more resource indication manners. For example, the first indication information may include an index of an RB that is actually allocated by the network device to the terminal.

With reference to the first aspect or the second aspect, when the second resource scheduling manner is implemented, for details about implementation of the second indication information by using signaling, refer to related content in the first resource scheduling manner.

With reference to the first aspect or the second aspect, when the second resource scheduling manner is implemented, the second indication information may include an index of a subband actually occupied by uplink transmission. The second indication information may also include an index of a subcarrier actually occupied by uplink transmission. This application is not limited to these manners, and other different manners may be used in an actual application. For example, the second indication information may include a range of subcarriers actually occupied by uplink transmission. The example is merely used to explain this application and shall not be construed as a limitation.

In a third resource scheduling manner, the network device performs subband resource scheduling in the first bandwidth at a subband level, selects an appropriate interlace structure on a subband, and performs resource scheduling based on an interlace on the subband. The interlace may be one with a fixed quantity and evenly distributed on a subband, or may be one with a fixed RB spacing and evenly distributed on the subband.

It should be understood that, a subband bandwidth is less than the full bandwidth (the first bandwidth in the first resource scheduling manner), and LBT on a subband can fully use an idle resource and facilitates timely transmission of uplink data.

With reference to the first aspect or the second aspect, when the third resource scheduling manner is implemented, the terminal may perform uplink transmission on an idle detected subband.

With reference to the first aspect or the second aspect, when the third resource scheduling manner is implemented, for details about implementation of the first indication information by using signaling, refer to related content in the first resource scheduling manner.

With reference to the first aspect or the second aspect, when the third resource scheduling manner is implemented, content of the first indication information may be implemented as follows.

In one embodiment, the first indication information may include an index of a subband corresponding to an interlace allocated by the network device to the terminal, and an index of the interlace.

In one embodiment, the first indication information may include an index of a subband corresponding to an interlace allocated by the network device to the terminal, and an index of a start RB in the interlace.

In one embodiment, the first indication information may include indication information $W_{subband}$ of a subband bandwidth corresponding to an interlace allocated by the network device to the terminal, a quantity L of interlaces allocated by the network device to the terminal on a subband, and an index $RB_{START}$ of a start RB allocated by the network device to the terminal on the subband.

With reference to the first aspect or the second aspect, when the third resource scheduling manner is implemented, for details about implementation of the second indication information by using signaling, refer to related content in the first resource scheduling manner.

With reference to the first aspect or the second aspect, when the third resource scheduling manner is implemented, the second indication information may include an index of a subband actually occupied by uplink transmission. The second indication information may also include an index of a subcarrier actually occupied by uplink transmission. This application is not limited to these manners, and other different manners may be used in an actual application. For example, the second indication information may include a range of subcarriers actually occupied by uplink transmission. The example is merely used to explain this application and shall not be construed as a limitation.

In addition, the first resource scheduling manner is a bandwidth resource scheduling manner at a full bandwidth level, and the second resource allocation manner is a subband resource scheduling manner at a subband level. The network device further needs to add, to the first indication information, a flag bit used to distinguish the two scheduling manners, so as to indicate a resource allocation manner used by the network device.

In one embodiment, after receiving the first indication information, the terminal may first identify the flag bit.

If the resource allocation manner indicated by the flag bit is bandwidth resource scheduling, the terminal performs LBT on a bandwidth (namely, the first bandwidth) indicated by the network device. When the detected idle bandwidth (namely, the second bandwidth) used for uplink transmission is equal to the first bandwidth, the terminal may perform uplink transmission on all resources indicated by the first indication information. When the detected idle bandwidth (namely, the second bandwidth) used for uplink transmission is less than the first bandwidth, the terminal may perform uplink transmission on a part of resources indicated by the first indication information.

If the resource allocation manner indicated by the flag bit is subband resource scheduling, the terminal performs LBT on a subband (namely, a subband of the first bandwidth) indicated by the first indication information. If the subband is idle, the terminal may perform uplink transmission on a scheduled resource on the subband. If the subband is occupied, the terminal cannot perform uplink transmission on the subband. Herein, the scheduled resource on the subband refers to a resource that is on the subband and that is indicated by the first indication information.

In one embodiment, the bandwidth resource scheduling manner at the full bandwidth level may be further converted into the subband resource scheduling manner at the subband level. In one embodiment, in the bandwidth resource scheduling manner at the full bandwidth level, if the terminal does not detect the idle bandwidth after performing LBT, the network device may use the subband resource scheduling manner. In this way, the terminal may perform subband LBT again, to increase a success rate of LBT and perform uplink transmission in time.

According to a third aspect, this application provides a signal transmission method, applied to a network device side. The method includes: allocating, on a subband of a first channel bandwidth, an uplink resource to a terminal based on an integer quantity of resource blocks evenly distributed on the subband, and sending first indication information to a terminal, where the first indication information is used to indicate the uplink resource allocated by a network device to the terminal on the subband; and receiving second indication information sent by the terminal. The second indication information is used to indicate an idle subband.

According to a fourth aspect, this application provides a signal transmission method, applied to a terminal side. The method includes: receiving first indication information sent by a network device, where the first indication information is used to indicate an uplink resource allocated by the network device to a terminal on a subband of first channel bandwidth; during uplink transmission, listening to, according to the first indication information, whether the subband is idle, and if the subband is idle, performing uplink transmission on the subband; and sending second indication information to the network device, to indicate the idle subband.

It may be understood that according to the methods in the third aspect and the fourth aspect, because a subband bandwidth is relatively small, LBT on a subband can fully use an idle resource and facilitate timely transmission of uplink data, and scheduling can be performed at a smaller granularity.

According to a fifth aspect, a network device is provided, including a plurality of functional units, configured to correspondingly perform the method according to any one of the first aspect or the implementations of the first aspect.

According to a sixth aspect, a terminal is provided, including a plurality of functional units, configured to correspondingly perform the method according to any one of the second aspect or the implementations of the second aspect.

According to a seventh aspect, a network device is provided, including a plurality of functional units, configured to correspondingly perform the method according to any one of the third aspect or the implementations of the third aspect.

According to an eighth aspect, a terminal is provided, including a plurality of functional units, configured to correspondingly perform the method according to any one of the fourth aspect or the implementations of the fourth aspect.

According to a ninth aspect, a network device is provided, configured to perform the signal transmission method according to the first aspect. The network device may include a memory, and a processor, a transmitter, and a receiver that are coupled to the memory. The transmitter is configured to send a signal to another wireless network device, for example, a terminal. The receiver is configured to receive a signal sent by the another wireless network device, for example, the terminal. The memory is configured to store implementation code of the signal transmission method according to the first aspect. The processor is configured to execute program code stored in the memory, in other words, perform the signal transmission method according to any one of the first aspect or the implementations of the first aspect.

According to a tenth aspect, a terminal is provided, configured to perform the signal transmission method according to the second aspect. The terminal may include a memory, and a processor, a transmitter, and a receiver that are coupled to the memory. The transmitter is configured to send a signal to another wireless network device, for example, a network device. The receiver is configured to receive a signal sent by the another wireless network device, for example, the network device. The memory is configured to store implementation code of the signal transmission method according to the second aspect. The processor is configured to execute program code stored in the memory, in other words, perform the signal transmission method according to any one of the second aspect or the implementations of the second aspect.

According to an eleventh aspect, a network device is provided, configured to perform the signal transmission method according to the third aspect. The network device may include a memory, and a processor, a transmitter, and a receiver that are coupled to the memory. The transmitter is configured to send a signal to another wireless network device, for example, a terminal. The receiver is configured to receive a signal sent by the another wireless network device, for example, the terminal. The memory is configured to store implementation code of the signal transmission method according to the third aspect. The processor is configured to execute program code stored in the memory, in other words, perform the signal transmission method according to any one of the third aspect or the implementations of the third aspect.

According to a twelfth aspect, a terminal is provided, configured to perform the signal transmission method according to the fourth aspect. The terminal may include a memory, and a processor, a transmitter, and a receiver that are coupled to the memory. The transmitter is configured to send a signal to another wireless network device, for example, a network device. The receiver is configured to receive a signal sent by the another wireless network device, for example, the network device. The memory is configured to store implementation code of the signal transmission method according to the fourth aspect. The processor is configured to execute program code stored in the memory, in other words, perform the signal transmission method according to any one of the fourth aspect or the implementations of the fourth aspect.

According to a thirteenth aspect, a communications system is provided, including a network device and a terminal.

The network device is configured to allocate, to the terminal, an integer quantity of resource blocks evenly distributed in a part or all of a first bandwidth as an uplink resource, send first indication information to a terminal, and receive second indication information sent by the terminal.

The terminal is configured to receive the first indication information sent by the network device, perform uplink transmission on a detected idle second bandwidth, and finally send the second indication information to the network device.

The first indication information is used to indicate the uplink resource allocated by the network device to the terminal in the first bandwidth. The resource indicated by the first indication information includes an integer quantity of resource blocks evenly distributed in a part or all of the first bandwidth. The second indication information is used to indicate the second bandwidth.

In one embodiment, the network device may be the network device according to the fifth aspect or the ninth aspect. The terminal may be the terminal according to the sixth aspect or the tenth aspect.

According to a fourteenth aspect, a communications system is provided, including a network device and a terminal.

The network device is configured to allocate, on a subband of a first channel bandwidth, an uplink resource to the terminal based on an integer quantity of resource blocks evenly distributed on the subband, send first indication information to a terminal, and receive second indication information sent by the terminal.

The terminal is configured to receive the first indication information sent by the network device, listen and determine whether the subband is idle, and perform uplink transmission on the subband if the subband is idle. The terminal is configured to send the second indication information to the network device, to indicate the idle subband.

The first indication information is used to indicate the uplink resource allocated by the network device to the terminal in the first bandwidth. The resource indicated by the first indication information includes an integer quantity of resource blocks evenly distributed on a subband of the first bandwidth. The second indication information is used to indicate an idle subband.

The network device may be the network device according to the seventh aspect or the eleventh aspect. The terminal may be the terminal according to the eighth aspect or the twelfth aspect.

According to a fifteenth aspect, a computer-readable storage medium is provided. The computer-readable storage medium stores an instruction, and when the instruction runs on a computer, the computer is enabled to perform the signal transmission method according to the first aspect.

According to a sixteenth aspect, another computer-readable storage medium is provided. The computer-readable storage medium stores an instruction, and when the instruction runs on a computer, the computer is enabled to perform the signal transmission method according to the second aspect.

According to a seventeenth aspect, a computer-readable storage medium is provided. The computer-readable storage medium stores an instruction, and when the instruction runs on a computer, the computer is enabled to perform the signal transmission method according to the third aspect.

According to an eighteenth aspect, another computer-readable storage medium is provided. The computer-readable storage medium stores an instruction, and when the instruction runs on a computer, the computer is enabled to perform the signal transmission method according to the fourth aspect.

According to a nineteenth aspect, a computer program product including an instruction is provided. When the instruction runs on a computer, the computer is enabled to perform the signal transmission method according to the first aspect.

According to a twentieth aspect, another computer program product including an instruction is provided. When the instruction runs on a computer, the computer is enabled to perform the signal transmission method according to the second aspect.

According to a twenty-first aspect, a computer program product including an instruction is provided. When the instruction runs on a computer, the computer is enabled to perform the signal transmission method according to the third aspect.

According to a twenty-second aspect, another computer program product including an instruction is provided. When the instruction runs on a computer, the computer is enabled to perform the signal transmission method according to the fourth aspect.

BRIEF DESCRIPTION OF DRAWINGS

To describe the technical solutions in the embodiments of this application or in the background more clearly, the following briefly describes the accompanying drawings required for describing the embodiments of this application or the background.

DESCRIPTION OF EMBODIMENTS

Terms used in implementations of this application are merely used to explain embodiments of this application, but are not intended to limit this application.

For ease of understanding the embodiments of this application, a wireless communications system in the embodiments of this application is first described.

Figure 1:
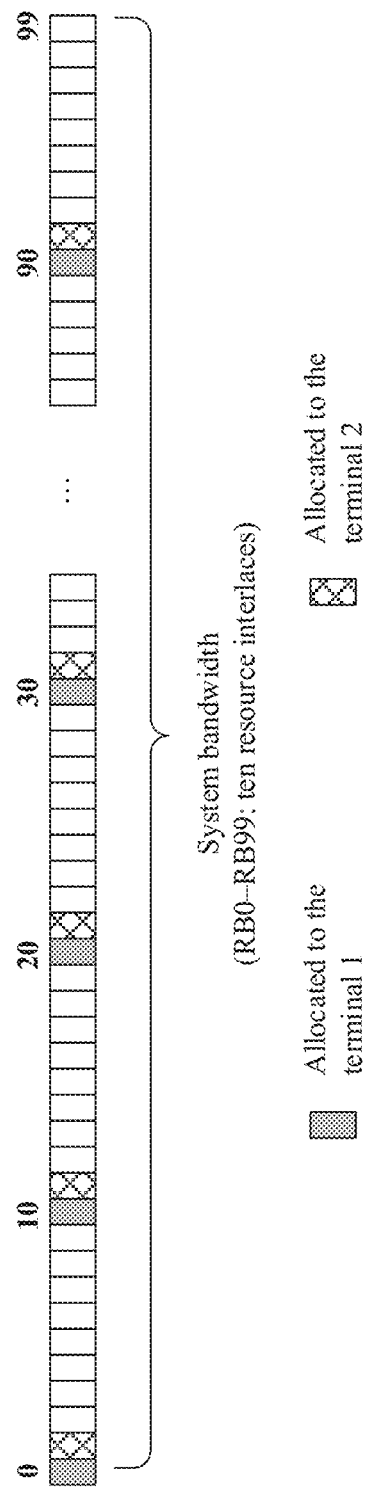
FIG. 1 is a schematic diagram of a structure of a prior-art resource interlace according to this application.
Figure 2:
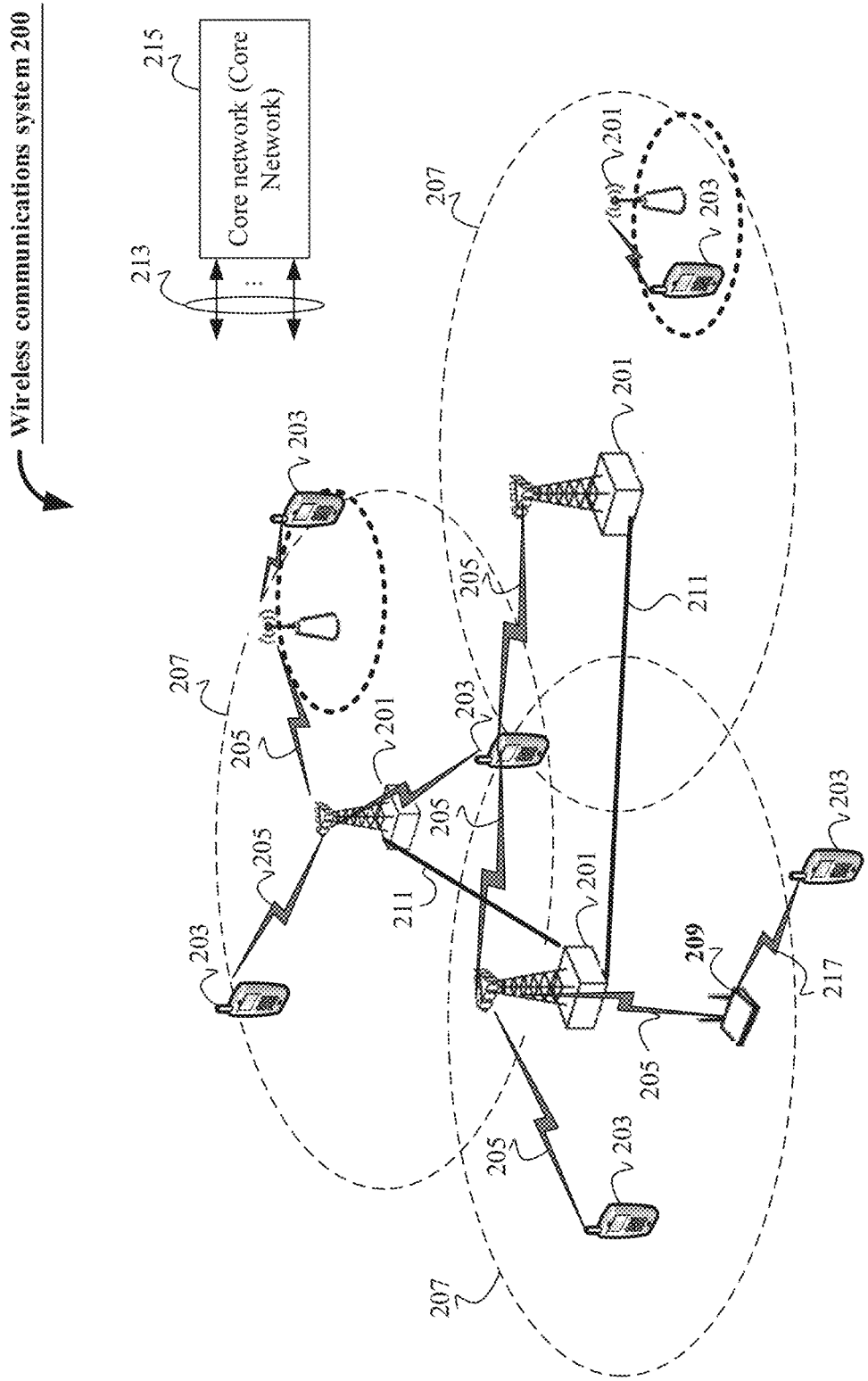
FIG. 2 is a schematic diagram of an architecture of a wireless communications system according to this application.

FIG. 2 shows a wireless communications system 200 in this application. The wireless communications system 200 may work on a licensed or unlicensed frequency band. It may be understood that use of the unlicensed frequency band may improve a capacity of the wireless communications system 200. As shown in FIG. 2, the wireless communications system 200 includes one or more network devices (Base Station) 201, for example, a NodeB, an eNodeB, or a WLAN access point, one or more terminals 203, and a core network 215.

The network device 201 may be configured to communicate with the terminal 203 under control of a network device controller (not shown). In some embodiments, the network device controller may be a part of the core network 215, or may be integrated into the network device 201.

The network device 201 may be configured to transmit control information or user data to the core network 215 through a backhaul interface (for example, an S1 interface) 213.

The network device 201 may perform wireless communication with the terminal 203 by using one or more antennas. Each network device 201 may provide communication coverage for a coverage area 207 corresponding to the network device 201. The coverage area 207 corresponding to an access point may be divided into a plurality of sectors, and one sector corresponds to a part of the coverage area (not shown).

Two network devices 201 may communicate with each other directly or indirectly through a backhaul link 211. The backhaul link 211 herein may be a wired or wireless communication connection link.

In some embodiments of this application, the network device 201 may be a base transceiver station, a radio transceiver, a basic service set (BSS), an extended service set (ESS), a NodeB, an eNodeB, or the like. The wireless communications system 200 may include several different types of network devices 201, for example, a macro base station, a micro base station, and the like. The network device 201 may apply different wireless technologies, for example, a cell radio access technology or a WLAN radio access technology.

The terminals 203 may be distributed in the entire wireless communications system 200, and may be stationary or moving. In some embodiments of this application, the terminal 203 may be a mobile device, a mobile station, a mobile unit, a radio unit, a remote unit, a user agent, a mobile client, or the like.

In this embodiment of this application, the wireless communications system 200 may be an LTE communications system capable of working on an unlicensed frequency band, for example, an LTE-U system, or may be a 5G communications system, a future new radio communications system, or the like capable of working on an unlicensed frequency band. The wireless communications system 200 may use a licensed-assisted access (LAA) scheme to process terminal access on the unlicensed frequency band. In the LAA scheme, a primary cell works on a licensed frequency band to transfer key messages and services requiring assured quality of service, and a secondary cell works on an unlicensed frequency band to improve data plane performance.

In this embodiment of this application, the wireless communications system 200 can support multi-carrier (waveform signals at different frequencies) operations. A multi-carrier transmitter can simultaneously transmit modulated signals on a plurality of carriers. For example, each communication connection 205 may carry multi-carrier signals modulated by using different wireless technologies. Each modulated signal may be sent on different carriers, and may carry control information (for example, a reference signal and a control channel), overhead information, data, and the like.

In addition, the wireless communications system 200 may further include a Wi-Fi network. To ensure that both an operator network and a Wi-Fi network can function (working on an unlicensed frequency band), the wireless communications system 200 may use a listen before talk (LBT) mechanism. For example, in the wireless communications system 200, some terminals 203 may be connected to a Wi-Fi access point 209 through Wi-Fi communication connections 217, to use unlicensed frequency band resources, and some terminals 203 may be connected to the network device 201 through mobile communication connections 205, to use unlicensed frequency band resources. Before using an unlicensed frequency band, any device needs to listen, to detect whether the frequency band is occupied, and can occupy the frequency band to transmit data only if the frequency band is idle.

To meet the OCB specifications of ESTI, an uplink resource is allocated based on a resource interlace in the wireless communication system 200. However, an existing resource interlace consists of a fixed quantity of 10 RBs. Therefore, positions of RBs in a resource interlace in different bandwidth scenarios cannot be aligned, and flexible bandwidth transmission cannot be supported.

Figure 3:
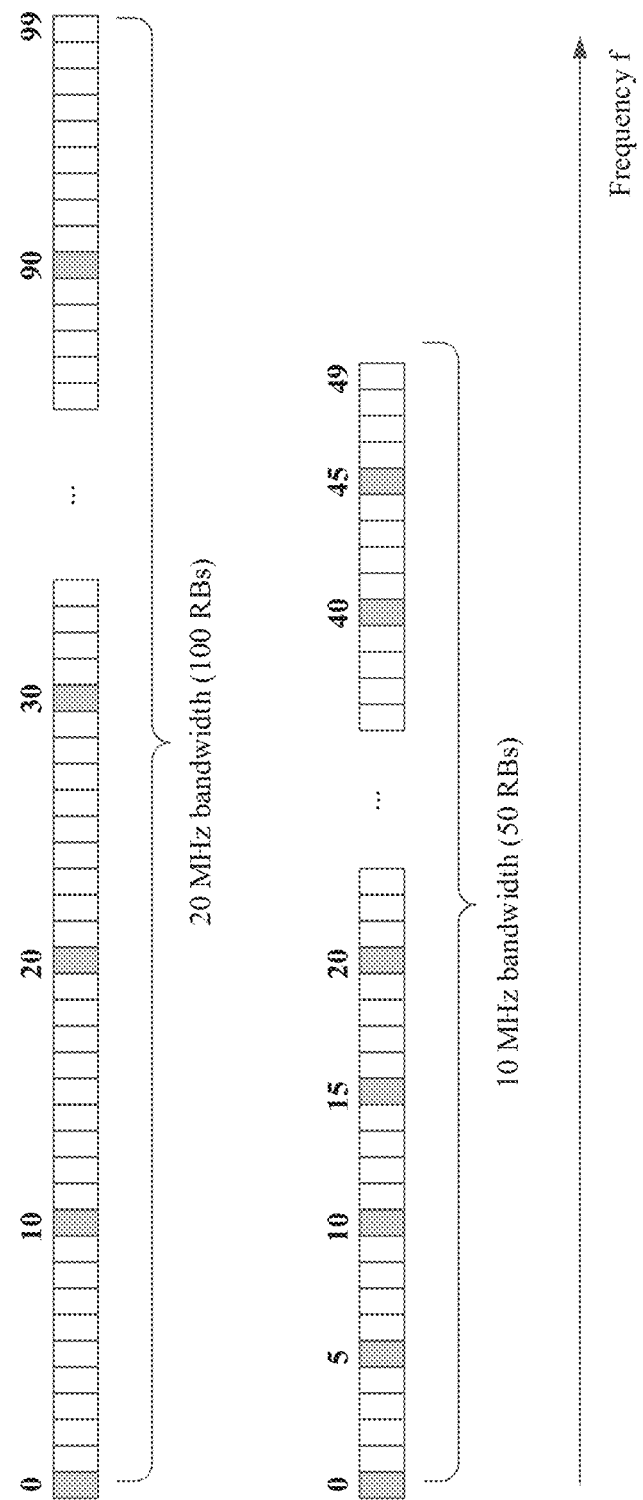
FIG. 3 is a schematic diagram of a structure of a prior-art resource interlace in different bandwidths according to this application.

As shown in FIG. 3, a resource interlace includes 10 RBs in both a 10 MHz bandwidth and a 20 MHz bandwidth. In the 20 MHz bandwidth, nine resource blocks are spaced between two adjacent resource blocks in one resource interlace (interlace). In the 10 MHz bandwidth, four resource blocks are spaced between two adjacent resource blocks in one resource interlace. It can be seen from FIG. 3 that, in the 10 MHz bandwidth and the 20 MHz bandwidth, some RBs in the resource interlaces are separately located in different frequency domain positions and cannot be aligned. It may be understood that resource interlaces in different bandwidths correspond to different time-frequency positions. Therefore, if the resource interlace in the 20 MHz bandwidth is allocated to the terminal, the terminal cannot transmit data by using the resource interlace in the 10 MHz bandwidth. In one embodiment, when an actually accessible bandwidth detected by the terminal by using LBT is inconsistent with a bandwidth scheduled by the network device (for example, the base station), the terminal cannot perform uplink transmission, or the terminal needs to wait for the network device to reallocate a resource.

Figure 4:
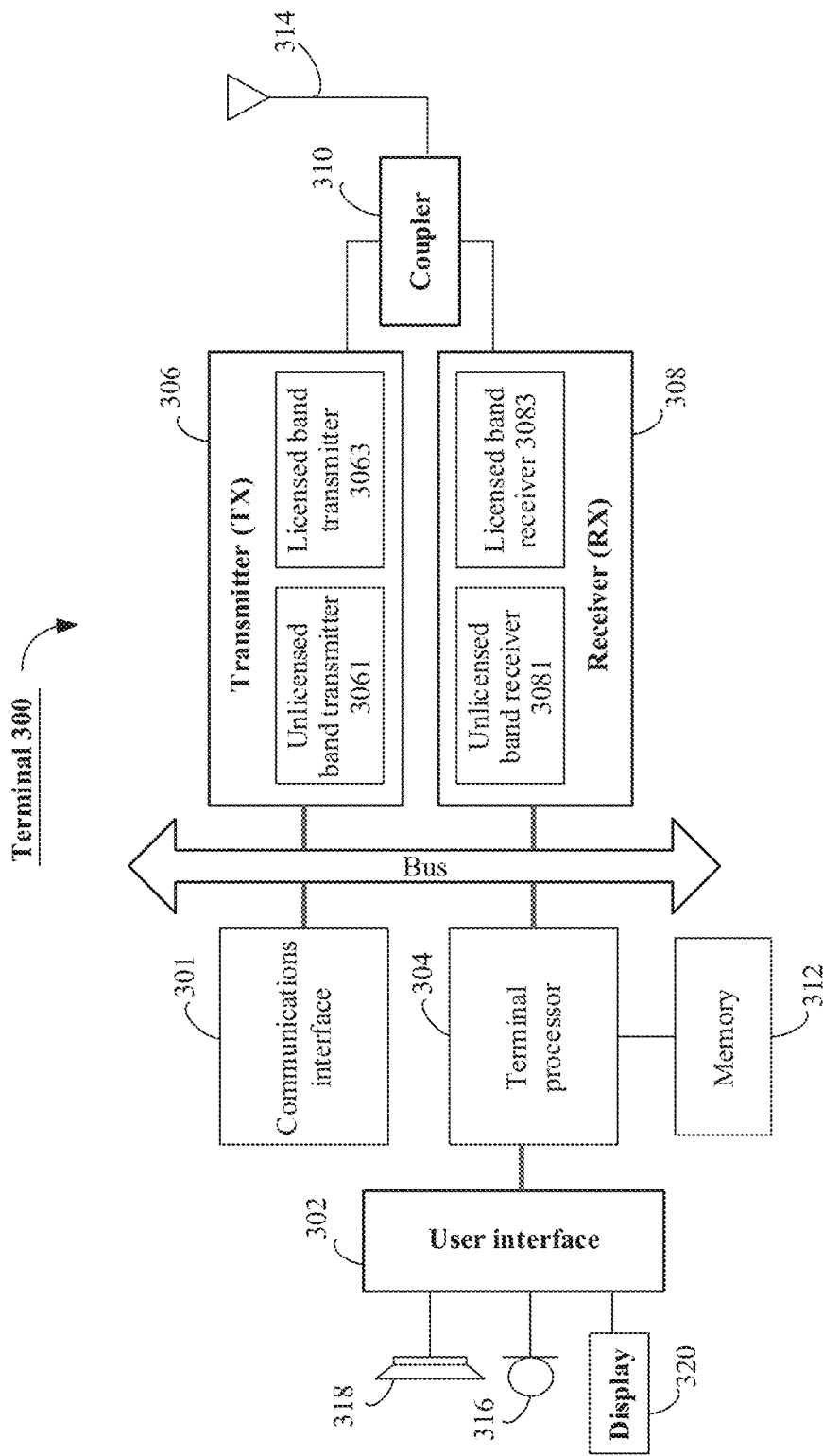
FIG. 4 is a schematic diagram of a hardware architecture of a terminal according to an embodiment of this application.

FIG. 4 shows a terminal 300 according to some embodiments of this application. As shown in FIG. 4, the terminal 300 may include input/output modules (including an audio input/output module 318, a key input module 316, a display 320, and the like), a user interface 302, one or more terminal processors 304, a transmitter 306, a receiver 308, a coupler 310, an antenna 314, and a memory 312. These components may be connected by using a bus or in another manner. FIG. 4 shows an example of connection by using a bus.

The communications interface 301 may be used by the terminal 300 to communicate with another communications device, for example, a base station. The base station may be the network device 400 shown in FIG. 4. In one embodiment, the communications interface 301 may include one or more of a global system for mobile communications (GSM) (2G) communications interface, a wideband code division multiple access (WCDMA) (3G) communications interface, a long term evolution (LTE) (4G) communications interface, or the like, or may be a 4.5G, 5G, or future new radio communications interface. This application is not limited to the wireless communications interface. A wired communications interface 301, for example, a local area network (LAN) interface may further be configured for the terminal 300.

The antenna 314 may be configured to convert electromagnetic energy in a transmission line into an electromagnetic wave in free space, or convert an electromagnetic wave in free space into electromagnetic energy in a transmission line. The coupler 310 is configured to divide a mobile communication signal received by the antenna 314 into a plurality of signals, and allocate them to a plurality of receivers 308.

The transmitter 306 may be configured to perform transmission processing on a signal output by the terminal processor 304, for example, modulate the signal onto a licensed or unlicensed frequency band. In some embodiments of this application, the transmitter 306 may include an unlicensed band transmitter 3061 and a licensed band transmitter 3063. The unlicensed band transmitter 3061 may support the terminal 300 to transmit a signal on one or more unlicensed frequency bands, and the licensed band transmitter 3063 may support the terminal 300 to transmit a signal on one or more licensed frequency bands.

The receiver 308 may be configured to perform receiving processing on the mobile communication signal received by the antenna 314. For example, the receiver 308 may demodulate a received signal that has been modulated onto an unlicensed or licensed frequency band. In some embodiments of this application, the receiver 308 may include an unlicensed band receiver 3081 and a licensed band receiver 3083. The unlicensed band receiver 3081 may support the terminal 300 to receive a signal that is modulated onto an unlicensed frequency band, and the licensed band receiver 3083 may support the terminal 300 to receive a signal that is modulated onto a licensed frequency band.

In some embodiments of this application, the transmitter 306 and the receiver 308 may be considered as a wireless modem. In the terminal 300, there may be one or more transmitters 306 and receivers 308.

In addition to the transmitter 306 and the receiver 308 shown in FIG. 4, the terminal 300 may further include other communications components, for example, a GPS module, a Bluetooth module, and a wireless fidelity (Wi-Fi) module. In addition to the wireless communication signal, the terminal 300 may further support other wireless communication signals, for example, a satellite signal and a short-wave signal. This application is not limited to wireless communications. The terminal 300 may be further equipped with a wired network interface (for example, a LAN interface) to support wired communications.

The input/output modules may be configured to implement interaction between the terminal 300 and a user or an external environment, and may mainly include the audio input/output module 318, the key input module 316, the display 320, and the like. In one embodiment, the input/output modules may further include a camera, a touchscreen, a sensor, and the like. The input/output modules all communicate with the terminal processor 304 through the user interface 302.

The memory 312 is coupled to the terminal processor 304, and configured to store various software programs and/or a plurality of sets of instructions. In one embodiment, the memory 312 may include a high-speed random access memory, and may also include a non-volatile memory, for example, one or more magnetic disk storage devices, flash memory devices, or other non-volatile solid-state storage devices. The memory 312 may store an operating system (briefly referred to as a system below), for example, an embedded operating system such as Android, iOS, Windows, or Linux. The memory 312 may further store a network communications program. The network communications program may be used for communication with one or more additional devices, terminal devices, and network devices. The memory 312 may further store a user interface program. The user interface program may use a graphical operation interface to visually display content of an application program, and use input controls such as menus, dialog boxes, and keys to receive control operations of a user on the application program.

In some embodiments of this application, the memory 312 may be configured to store an implementation program, on a terminal 300 side, of a signal transmission method provided in one or more embodiments of this application. For implementation of the signal transmission method provided in one or more embodiments of this application, refer to the following embodiments.

The terminal processor 304 may be configured to read and execute a computer-readable instruction. In one embodiment, the terminal processor 304 may be configured to invoke a program stored in the memory 312, for example, the implementation program of the signal transmission method provided in one or more embodiments of this application on the terminal 300 side, and execute an instruction included in the program.

It may be understood that the terminal 300 may be the terminal 203 in the wireless communications system 200 shown in FIG. 2, and may be implemented as a mobile device, a mobile station, a mobile unit, a wireless unit, a remote unit, a user agent, a mobile client, or the like.

It should be noted that the terminal 300 shown in FIG. 4 is only an implementation in this embodiment of this application. In an actual application, the terminal 300 may further include more or fewer components, and this is not limited herein.

Figure 5:
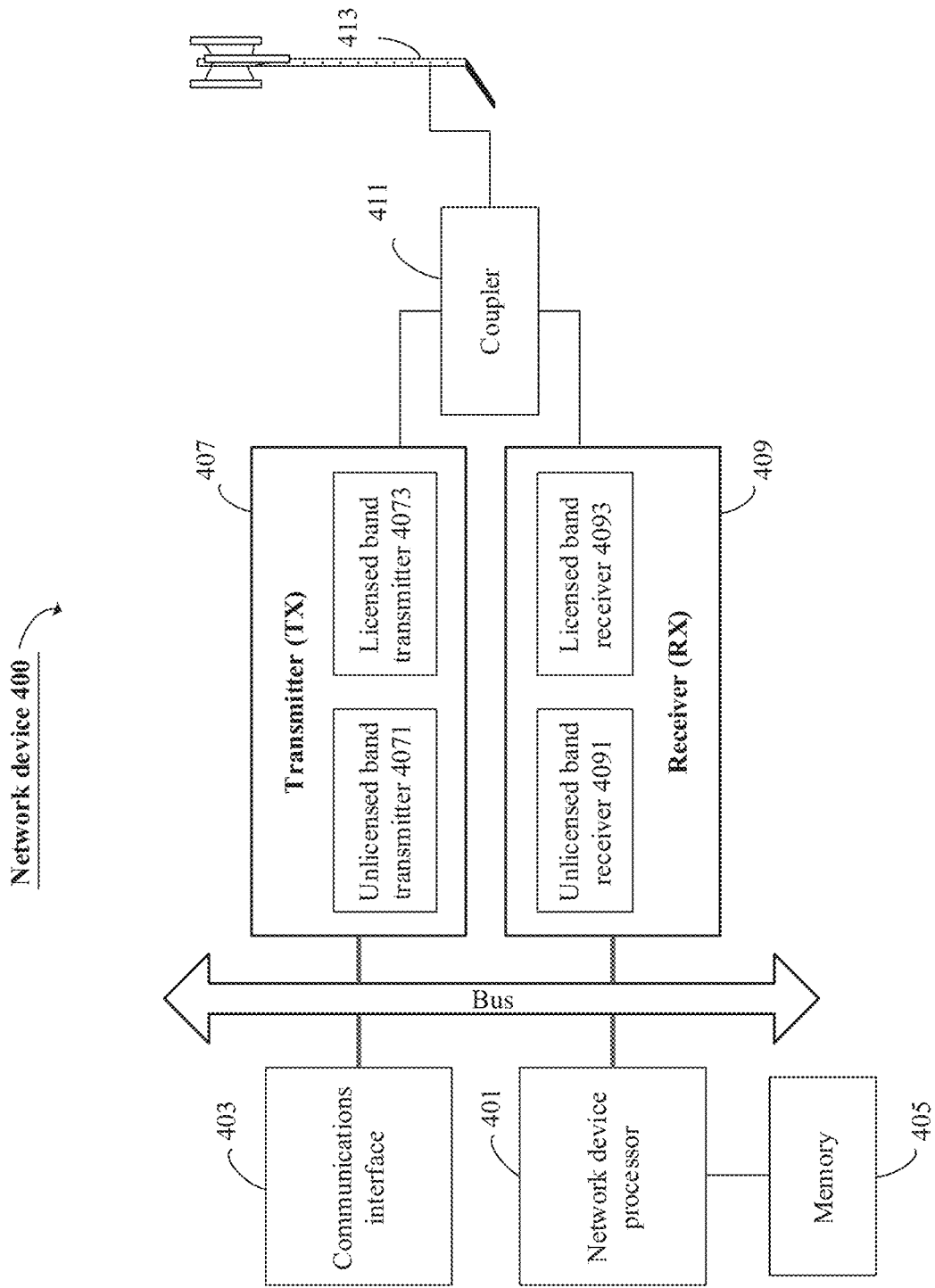
FIG. 5 is a schematic diagram of a hardware architecture of a network device according to an embodiment of this application.

FIG. 5 shows a network device 400 according to some embodiments of this application. As shown in FIG. 5, the network device 400 may include: a communications interface 403, one or more network device processors 401, a transmitter 407, a receiver 409, a coupler 411, an antenna 413, and a memory 405. These components may be connected by using a bus or in another manner. FIG. 5 shows an example of connection by using a bus.

The communications interface 403 may be used by the network device 400 to communicate with another communications device, for example, a terminal device or another base station. The terminal device may be the terminal 300 shown in FIG. 3. In one embodiment, the communications interface 403 may include one or more of a global system for mobile communications (GSM) (2G) communications interface, a wideband code division multiple access (WCDMA) (3G) communications interface, a long term evolution (LTE) (4G) communications interface, or the like, or may be a 4.5G, 5G, or future new radio communications interface. This application is not limited to the wireless communications interface. A wired communications interface 403 may further be configured for the network device 400. For example, a backhaul link between one network device 400 and another network device 400 may be a wired communication connection.

The antenna 413 may be configured to convert electromagnetic energy in a transmission line into an electromagnetic wave in free space, or convert an electromagnetic wave in free space into electromagnetic energy in a transmission line. The coupler 411 may be configured to divide a mobile communication signal into a plurality of signals, and allocate them to a plurality of receivers 409.

The transmitter 407 may be configured to perform transmission processing on a signal output by the network device processor 401, for example, modulate the signal in a licensed or unlicensed frequency band. In some embodiments of this application, the transmitter 407 may include an unlicensed band transmitter 4071 and a licensed band transmitter 4073. The unlicensed band transmitter 4071 may support the network device 400 to transmit a signal on one or more unlicensed frequency bands, and the licensed band transmitter 4073 may support the network device 400 to transmit a signal on one or more licensed frequency bands.

The receiver 409 may be configured to perform receiving processing on the mobile communication signal received by the antenna 413. For example, the receiver 409 may demodulate a received signal that has been modulated onto an unlicensed or licensed frequency band. In some embodiments of this application, the receiver 409 may include an unlicensed band receiver 4091 and a licensed band receiver 4093. The unlicensed band receiver 4091 may support the network device 400 to receive a signal that is modulated onto an unlicensed frequency band, and the licensed band receiver 4093 may support the network device 400 to receive a signal that is modulated onto a licensed frequency band.

In some embodiments of this application, the transmitter 407 and the receiver 409 may be considered as a wireless modem. There may be one or more transmitters 407 and receivers 409 in the network device 400.

The memory 405 is coupled to the network device processor 401, and is configured to store various software programs and/or a plurality of sets of instructions. In one embodiment, the memory 405 may include a high-speed random access memory, and may also include a non-volatile memory, for example, one or more disk storage devices, flash memory devices, or other non-volatile solid-state storage devices. The memory 405 may store an operating system (briefly referred to as a system below), for example, an embedded operating system such as uCOS, VxWorks, or RTLinux. The memory 405 may further store a network communication program. The network communication program may be used to communicate with one or more peripheral devices, one or more terminal devices, or one or more network devices.

The network device processor 401 may be configured to manage radio channels, establish or disconnect a call or communication link, and control cross-cell handover of user equipment in a local control cell. In one embodiment, the network device processor 401 may include an administration module/communications module (AM/CM) (a center for speech channel switching and information exchanging), a basic module (BM) (configured to complete call processing, signaling processing, radio resource management, radio link management, and circuit maintenance functions), a transcoder and submultiplexer (TCSM) (configured to complete multiplexing/demultiplexing and transcoding functions), and the like.

In this embodiment of this application, the network device processor 401 may be configured to read and execute a computer-readable instruction. In one embodiment, the network device processor 401 may be configured to invoke a program stored in the memory 405, for example, a program for implementing, on a network device 400 side, the signal transmission method provided in one or more embodiments of this application, and execute an instruction included in the program.

It may be understood that the network device 400 may be the base station 201 in the wireless communications system 200 shown in FIG. 2, and may be implemented as a base transceiver station, a wireless transceiver, a basic service set (BSS), an extended service set (ESS), a NodeB, an eNodeB, or the like. The network device 400 may be implemented by several different types of base stations, for example, a macro base station, a micro base station, or the like. The base station 400 may apply different wireless technologies, for example, a cell radio access technology or a WLAN radio access technology.

It should be noted that the network device 400 shown in FIG. 5 is merely an implementation of this embodiment of this application. In an actual application, the network device 400 may alternatively include more or fewer components, and this is not limited herein.

Based on the foregoing embodiments corresponding to the wireless communications system 200, the terminal 300, and the network device 400, to support flexible bandwidth transmission during uplink transmission, an embodiment of this application provides a signal transmission method.

Main principles of this application may include:

1. During uplink resource scheduling, a network device allocates a resource based on a resource interlace with a fixed RB spacing. Herein, the RB spacing refers to a spacing between any two adjacent RBs in the resource interlace. Different from an existing resource interlace defined in the LTE, the RB spacing of the resource interlace defined in this application is fixed and does not change with a bandwidth.

Figure 6:
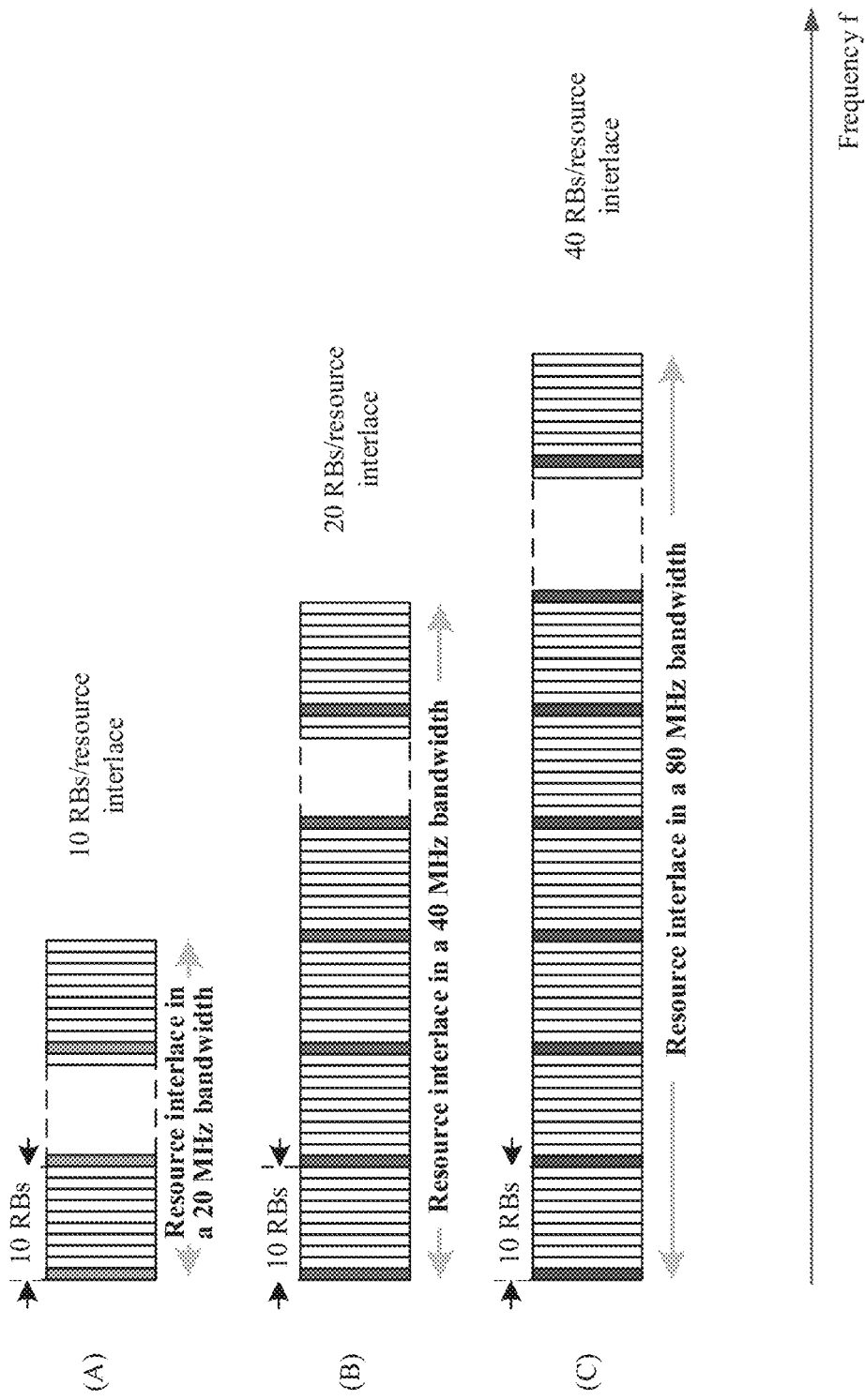
FIG. 6 is a schematic diagram of a structure of a resource interlace with a fixed RB spacing according to this application.

For example, as shown in FIG. 6, an RB spacing N of each resource interlace is 10 in 20 MHz, 40 MHz, and 80 MHz bandwidths. It can be seen from FIG. 6 that the resource interlace newly defined in this application facilitates resource alignment between different bandwidths. When an accessible bandwidth detected by a terminal by using LBT is inconsistent with a bandwidth scheduled by the network device, the terminal may perform uplink transmission without waiting for the network device to re-schedule a resource. Therefore, flexible bandwidth transmission is supported.

To simplify the following description, it may be assumed that an RB spacing of each resource interlace in different bandwidths is fixed at N (N is a positive integer).

2. An accessible bandwidth detected by the terminal by using LBT may be inconsistent with an available bandwidth used by the network device during uplink resource scheduling. Therefore, the terminal further needs to report actual bandwidth information of uplink transmission to the network device, so that the network device can correctly receive the information. In addition, during an OCB test, whether uplink transmission meets an OCB requirement may alternatively be determined based on the bandwidth reported by the terminal, to ensure that flexible multi-bandwidth transmission meets the OCB requirement.

In this application, the available bandwidth used by the network device during uplink resource scheduling may be referred to as a first bandwidth, and the available bandwidth that is detected by the terminal by using LBT and that is used for uplink transmission may be referred to as a second bandwidth. The first bandwidth may be the available bandwidth that is detected by the network device by using LBT when the network device performs resource scheduling. It should be understood that, even if the available bandwidth detected by the terminal by using LBT may be greater than the first bandwidth, the terminal still needs to perform uplink transmission according to an indication of the network device. In other words, the available bandwidth (namely, the second bandwidth) that is detected by the terminal by using LBT and that is used for uplink transmission can only be less than or equal to the first bandwidth.

In one embodiment, if the second bandwidth is equal to the first bandwidth, the terminal may perform uplink transmission on the second bandwidth completely according to a scheduling indication of the network device. In other words, the terminal may perform uplink transmission on a resource indicated by resource indication information delivered by the network device. If the second bandwidth is less than the first bandwidth, the terminal may perform uplink transmission in a part of the resource indicated by the resource indication information. In other words, the terminal may perform uplink transmission on the resource that is in the second bandwidth and that is indicated by the resource indication information.

For example, as shown in FIG. 6, it is assumed that the network device schedules a resource interlace to the terminal in a 40 MHz bandwidth (namely, the first bandwidth). The resource interlace includes an RB 0, an RB 10, an RB 20, . . . , an RB 90, an RB 100, an RB 110, . . . , an RB 180, and an RB 190. When the terminal detects an 80 MHz available bandwidth by using LBT, because the resource scheduled by the network device to the terminal is located in the 40 MHz first bandwidth, the terminal can perform uplink transmission only in the idle 40 MHz bandwidth. In this case, the second bandwidth is the idle 40 MHz bandwidth. When the terminal detects an idle 80 MHz bandwidth by using LBT, because the resource scheduled to the terminal is located in the 40 MHz first bandwidth, the terminal can perform uplink transmission only in the idle 40 MHz second bandwidth (in this case, the second bandwidth is equal to the first bandwidth). When the idle bandwidth that is available for uplink transmission and that is detected by the terminal by using LBT is the 20 MHz bandwidth (namely, the second bandwidth), because only some resource blocks (that is, the RB 0, the RB 10, the RB 20, . . . , and the RB 90) in the resource interlace scheduled to the terminal are in the 20 MHz bandwidth, the terminal may perform uplink transmission on these resource blocks in the 20 MHz available bandwidth according to the scheduling indication of the network device. The example in FIG. 6 is merely used to explain this application and shall not be construed as a limitation.

It may be understood that when the second bandwidth is less than the first bandwidth, a ratio of a bandwidth actually occupied when the terminal performs uplink transmission in the second bandwidth to the first bandwidth may not meet the OCB requirement. In this case, the terminal needs to report the second bandwidth to the network device. In this way, whether uplink transmission meets the OCB requirement may be determined based on the bandwidth reported by the terminal. Herein, the second bandwidth reported by the terminal may be used as the claimed bandwidth in the OCB test.

For example, as shown in FIG. 6, it is assumed that the network device schedules a resource interlace to the terminal in the 40 MHz bandwidth. The resource interlace includes an RB 0, an RB 10, an RB 20, . . . , an RB 90, an RB 100, an RB 110, . . . , an RB 180, and an RB 190. When the idle bandwidth that is available for uplink transmission and that is detected by the terminal by using LBT is a 20 MHz bandwidth, because the terminal can perform uplink transmission only on some resource blocks (that is, the RB 0, the RB 10, the RB 20, . . . , and the RB 90) in the resource interlace allocated by the network device, the actual bandwidth occupied by uplink transmission is 16.38 MHz (if a subcarrier spacing is 15 kHz, one RB occupies 0.18 MHz, and 91 RBs occupy 16.38 MHz). In this case, if the 40 MHz bandwidth (namely, the first bandwidth) is used to determine whether uplink transmission meets the OCB requirement, a bandwidth utilization of an uplink signal is finally obtained as follows: 16.38 MHz/40 MHz 41%, which obviously does not meet the OCB requirement. In addition, the terminal may perform uplink transmission only in the detected idle second bandwidth, and therefore it is unreasonable to determine the OCB requirement based on the first bandwidth. In this case, if the bandwidth (namely, the 20 MHz second bandwidth) reported by the terminal is used to determine whether uplink transmission meets the OCB requirement, a bandwidth utilization of an uplink signal is finally obtained as follows: 16.38 MHz/20 MHz 82%, which obviously meets the OCB requirement. The example in FIG. 6 is merely used to explain this application and shall not be construed as a limitation.

This application is not limited to various bandwidth scenarios such as the 20 MHz, 40 MHz, and 80 MHz bandwidths shown in FIG. 6. This application is further applicable to another bandwidth scenario, for example, a 60 MHz or 100 MHz bandwidth. In addition, a quantity of RBs corresponding to each bandwidth scenario, the RB spacing of the resource interlace, and the like are not limited to those shown in FIG. 6. For details, refer to future communications technology specifications.

Figure 7:
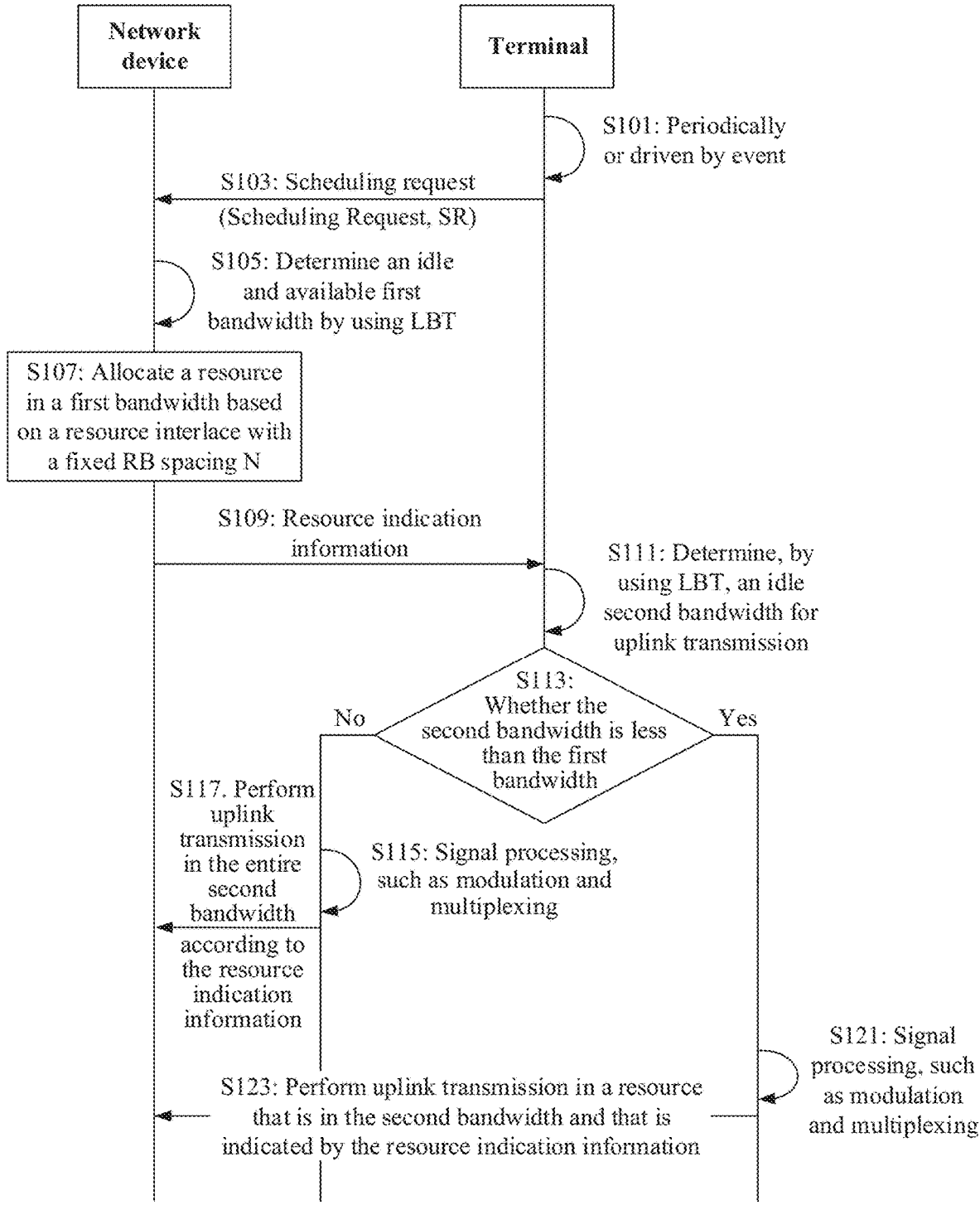
FIG. 7 is a schematic flowchart of a signal transmission method according to an embodiment of this application.

FIG. 7 shows a signal transmission method according to an embodiment of this application. In the embodiment shown in FIG. 7, a network device performs bandwidth resource scheduling in a first bandwidth at a full bandwidth level, and performs resource scheduling based on a fixed RB spacing of a resource interlace. The RB spacing does not change with the first bandwidth. Details are described below.

S103: The network device receives a scheduling request (SR) sent by a terminal. The scheduling request is used to request the network device to allocate an uplink transmission resource.

Referring to operation S101 in FIG. 7, the terminal may periodically send the scheduling request to the network device. For example, the terminal sends the scheduling request to the network device once every transmission time interval (TTI). Alternatively, the terminal may send the scheduling request to the network device when driven by an event. For example, when there is uplink data to be transmitted, the terminal sends the scheduling request to the network device. Arrival of the uplink data herein is an event driving the terminal to send the scheduling request. This embodiment of this application imposes no limitation on a mechanism for triggering the terminal to send the scheduling request.

S105-S107: In response to the scheduling request, before performing resource scheduling, the network device may first perform LBT to determine the first bandwidth corresponding to an idle and available unlicensed frequency band. Then, during resource allocation, the network device allocates a resource based on a resource interlace with a fixed RB spacing of N. In one embodiment, the uplink resource allocated by the network device to the terminal may include one or more resource interlaces. Herein, the resource interlace with a fixed RB spacing of N is evenly distributed in the entire first bandwidth, and a spacing between any two RBs is fixed at N.

For example, it is assumed that one RB occupies 12 subcarriers and each subcarrier occupies 15 kHz. It should be understood that, to avoid intersymbol interference, the first bandwidth may include a guard band. Assuming that a proportion of the guard band in the first bandwidth is 10%, and a proportion of a transmission bandwidth that is actually used to transmit a signal in the first bandwidth is 90%. As shown in FIG. 6, if an RB spacing N of a resource interlace in various bandwidth scenarios is 10, when the first bandwidth is 20 MHz, the transmission bandwidth (which is actually 18 MHz) corresponds to 100 RBs, and a resource interlace in the 20 MHz first bandwidth consists of 10 RBs. (A) in FIG. 6 shows a structure of the resource interlace;

when the first bandwidth is 40 MHz, the transmission bandwidth (which is actually 36 MHz) corresponds to 200 RBs, and a resource interlace in the 40 MHz first bandwidth consists of 20 RBs. (B) in FIG. 6 shows a structure of the resource interlace;

when the first bandwidth is 80 MHz, the transmission bandwidth (which is actually 72 MHz) corresponds to 400 RBs, and a resource interlace in the 80 MHz first bandwidth consists of 40 RBs. (C) in FIG. 6 shows a structure of the resource interlace.

It can be seen that, the RB spacing N of the resource interlace is fixed and does not change with a bandwidth. Therefore, a larger bandwidth leads to a larger quantity of RBs included in a resource interlace.

S109: The network device returns resource indication information to the terminal, where the resource indication information is used to indicate an uplink resource that is allocated by the network device to the terminal in the first bandwidth. In this application, the resource indication information may be referred to as first indication information.

(1) The first indication information is implemented by using signaling.

In one embodiment of this application, the network device may add the resource indication information to downlink control information (DCI). In one embodiment, a new field may be added to the DCI to indicate a resource interlace allocated to the terminal. Alternatively, a related field used for resource indication in an existing DCI format, for example, an RB resource allocation (Resource block assignment) field, may be used to indicate a resource block allocated to the terminal.

For example, the network device may add the resource indication information to an uplink scheduling grant (UL grant) returned to the terminal. The UL grant herein is a type of DCI in a DCI format 0, 0A, 0B, 4, 4A, or 4B.

In one embodiment, the network device may alternatively add the resource indication information to other response messages in response to the scheduling request, or the network device may alternatively encapsulate the resource indication information into one message, and return the message to the terminal. This embodiment of this application imposes no limitation on how the network device sends the resource indication information.

(2) Content in the first indication information is implemented as follows.

In one embodiment, the resource indication information may include indication information of the first bandwidth, and an index of one or more resource interlaces that are allocated by the network device to the terminal in the first bandwidth.

It may be understood that although resource interlaces in different bandwidths may be aligned, but may include different quantities of RBs. Therefore, when the index of the resource interlace allocated to the terminal is indicated, which bandwidth also needs to be indicated for the resource interlace. In this way, the terminal may learn the structure (in other words, the quantity of included RBs) of the resource interlace according to the indication information of the first bandwidth, and learn, based on the index of the resource interlace, a position of an RB actually allocated by the network device.

Figures 8A, 8B:
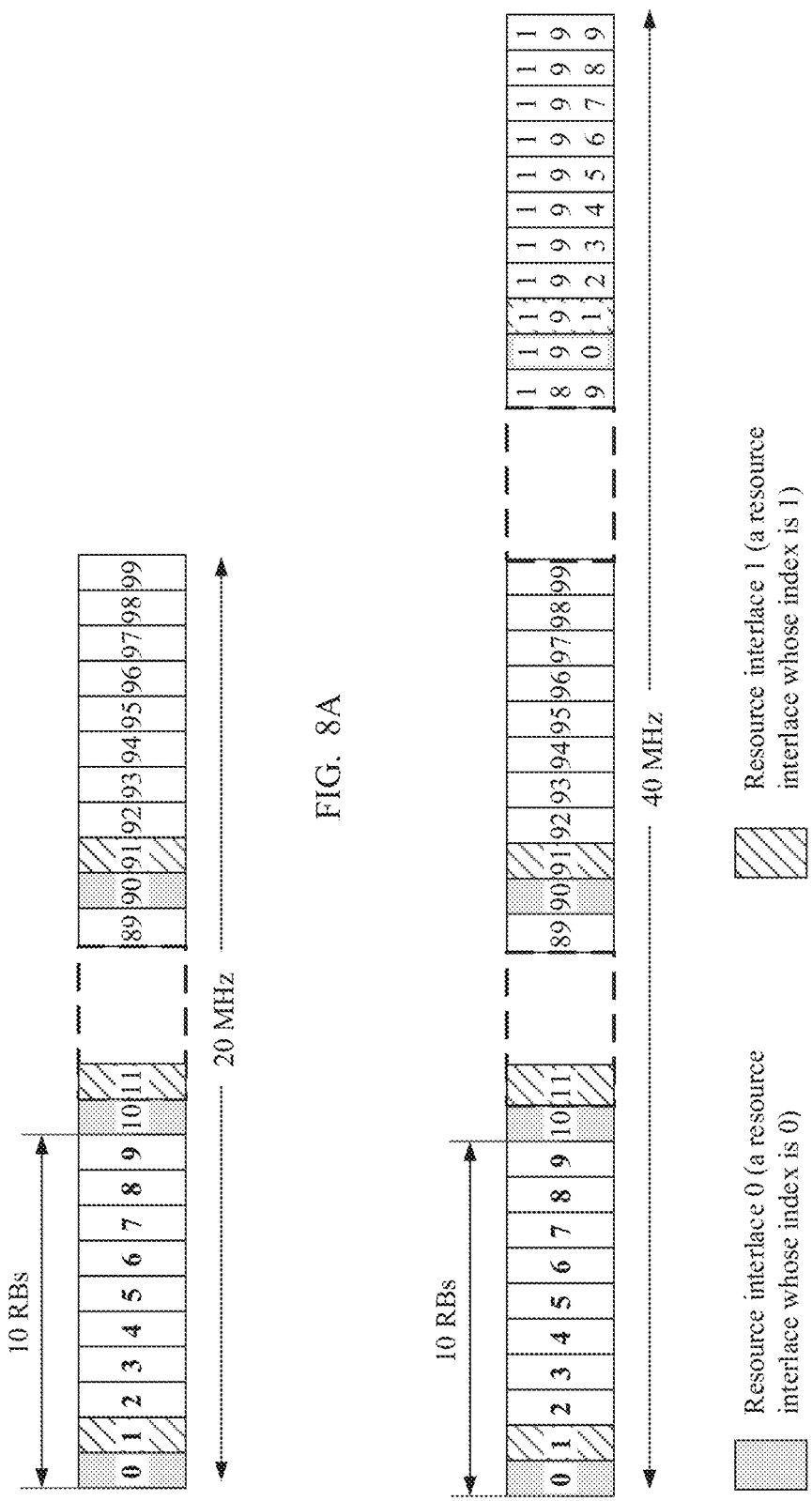
FIG. 8A and FIG. 8B are schematic diagrams of a resource interlace with an RB spacing of 10 in different bandwidth scenarios according to this application.

For example, as shown in FIG. 8A, it is assumed that resource interlaces allocated by the network device to the terminal in the 20 MHz first bandwidth includes an interlace 0 and an interlace 1. The resource indication information may indicate the 20 MHz first bandwidth, and indexes 0 and 1 of the resource interlaces 0 and 1. In this way, the terminal may learn, based on 20 MHz, that the interlace 0 and the interlace 1 are a structure shown in FIG. 8A, in other words, include 10 RBs. Then, the terminal may learn, based on the indexes 0 and 1, the RBs actually allocated by the network device, including: {an RB 0, an RB 10, an RB 20, . . . , and an RB 90} (namely, the interlace 0), and {an RB 1, an RB 11, an RB 21, . . . , and an RB 91} (namely, the interlace 1).

For another example, as shown in FIG. 8B, it is assumed that resource interlaces allocated by the network device to the terminal in the 40 MHz first bandwidth includes interlaces 0 and 1. The resource indication information may indicate the 40 MHz first bandwidth, and indexes 0 and 1 of the resource interlaces 0 and 1. In this way, the terminal may learn, based on 40 MHz, that the interlace 0 and the interlace 1 are a structure shown in FIG. 8B, in other words, include 20 RBs. Then, the terminal may learn, based on the indexes 0 and 1, the RBs actually allocated by the network device, including: {an RB 0, an RB 10, an RB 20, . . . , an RB 90, an RB 100, an RB 110, . . . , an RB 180, and an RB 190} (namely, the interlace 0), and {an RB 1, an RB 11, an RB 21, . . . , an RB 91, an RB 101, an RB 111, . . . , an RB 181, and an RB 191} (namely, the interlace 1).

This example is used to merely explain this embodiment of this application without constituting any limitation.

In one embodiment, the resource indication information may include an index of a start RB included in each of one or more resource interlaces allocated by the network device to the terminal in the first bandwidth, and a quantity of RBs. In this way, the terminal may learn a position of an actually allocated RB based on the index of the start RB included in each of the one or more resource interlaces, and the quantity of RBs.

For example, as shown in FIG. 8A, it is assumed that resource interlaces allocated by the network device to the terminal in the 20 MHz first bandwidth includes interlaces 0 and 1. The resource indication information may indicate that start RBs in the interlaces 0 and 1 are an RB 0 and an RB 1 respectively, and quantities of RBs included in the interlaces 0 and 1 are both 10. In this way, the terminal may learn, based on the quantities of RBs (namely, 10 RBs) included in the interlaces 0 and 1, that the interlaces 0 and 1 are a structure shown in FIG. 8A. In other words, the network device allocates the resource to the terminal in the 20 MHz bandwidth. Then, the terminal may learn, based on indexes 0 and 1 of the start RBs in the interlaces 0 and 1, the RBs actually allocated by the network device, including: {an RB 0, an RB 10, an RB 20, . . . , and an RB 90} (namely, the interlace 0), and {an RB 1, an RB 11, an RB 21, . . . , and an RB 91} (namely, the interlace 1).

For another example, as shown in FIG. 8B, it is assumed that resource interlaces allocated by the network device to the terminal in the 40 MHz first bandwidth includes an interlace 0 and an interlace 1. In this case, the resource indication information may indicate that start RBs in the interlaces 0 and 1 are an RB 0 and an RB 1 respectively, and quantities of RBs included in the interlaces 0 and 1 are both 20. In this way, the terminal may learn, based on the quantities of RBs (namely, 20 RBs) included in the interlaces 0 and 1, that the interlaces 0 and 1 are a structure shown in FIG. 8B. In other words, the network device allocates the resource to the terminal in the 40 MHz bandwidth. Then, the terminal may learn, based on the indexes 0 and 1 of the start RBs, the RBs actually allocated by the network device, including: {an RB 0, an RB 10, an RB 20, . . . , an RB 90, an RB 100, an RB 110, . . . , an RB 180, and an RB 190} (namely, the interlace 0), and {an RB 1, an RB 11, an RB 21, . . . , an RB 91, an RB 101, an RB 111, . . . , an RB 181, and an RB 191} (namely, the interlace 1).

This example is used to merely explain this embodiment of this application without constituting any limitation.

In one embodiment, the resource indication information may include an index of a start RB included in each of one or more resource interlaces allocated by the network device to the terminal in the first bandwidth, and a total quantity of RBs allocated by the network device to the terminal. Herein, a quantity of start RBs is a quantity of resource interlaces allocated by the network device. In this way, the terminal may obtain a quantity of RBs in one resource interlace by dividing the total quantity of RBs by the quantity of start RBs. In other words, the terminal may learn a resource interlace structure.

For example, as shown in FIG. 8A, it is assumed that resource interlaces allocated by the network device to the terminal in the 20 MHz first bandwidth include interlaces 0 and 1. In this case, the resource indication information may indicate that start RBs in the interlaces 0 and 1 are an RB 0 and an RB 1 respectively, and a total quantity of RBs allocated by the network device to the terminal is 20. In this way, the terminal may obtain, based on the total quantity 20 divided by a quantity 2 of the start RBs (the RB 0 and the RB 1), that one resource interlace includes 10 RBs. In other words, the resource interlace is a structure shown in FIG. 8A. Then, the terminal may learn, based on indexes 0 and 1 of the start RBs, the RBs actually allocated by the network device, including: {an RB 0, an RB 10, an RB 20, . . . , and an RB 90} (namely, the interlace 0), and {an RB 1, an RB 11, an RB 21, . . . , and an RB 91} (namely, the interlace 1).

For another example, as shown in FIG. 8B, it is assumed that resource interlaces allocated by the network device to the terminal in the 40 MHz first bandwidth includes interlaces 0 and 1. In this case, the resource indication information may indicate that start RBs in the interlaces 0 and 1 are an RB 0 and an RB 1 respectively, and a total quantity of RBs allocated by the network device to the terminal is 40. The terminal may obtain, based on the total quantity 40 divided by a quantity 2 of the start RBs (the RB 0 and the RB 1), that one resource interlace includes 20 RBs. In other words, the resource interlace is a structure shown in FIG. 8B. Then, the terminal may learn, based on the indexes 0 and 1 of the start RBs in the interlaces 0 and 1, the RBs actually allocated by the network device, including: {an RB 0, an RB 10, an RB 20, . . . , an RB 90, an RB 100, an RB 110, . . . , an RB 180, and an RB 190} (namely, the interlace 0), and {an RB 1, an RB 11, an RB 21, . . . , an RB 91, an RB 101, an RB 111, . . . , an RB 181, and an RB 191} (namely, the interlace 1).

This example is used to merely explain this embodiment of this application without constituting any limitation.

In one embodiment, the resource indication information may include indication information of the first bandwidth, a quantity of resource interlaces allocated by the network device to the terminal, and an index of a start RB allocated by the network device to the terminal.

In one embodiment, an RB set allocated by the network device to the terminal may be indicated as $RB_{START}+1+i\cdot N$, where $RB_{START}$ indicates an index of a start RB allocated by the network device to the terminal; $1=01 \wedge L-1$, where L indicates a quantity of resource interlaces allocated by the network device to the terminal; N indicates an RB spacing of a resource interlace; $i=01 \wedge M-1$, where $N_{RB}^{UL}$ indicates a quantity of RBs corresponding to an uplink transmission bandwidth. The RB spacing N of the resource interlace is a known value. Therefore, if the index $RB_{START}$ of the start RB, the quantity L of resource interlaces, and the first bandwidth ($N_{RB}^{UL}$ may be deduced) are learned, the RB set allocated by the network device to the terminal may be determined.

It is assumed that one RB occupies 12 subcarriers and each subcarrier occupies 15 kHz. If the first bandwidth is 20 MHz and a proportion of a transmission bandwidth is 90%, the uplink transmission bandwidth actually used to transmit an uplink signal corresponds to 100 RBs, namely, $N_{RB}^{UL}=100$.

Example 1

As shown in FIG. 8A, if the network device allocates one resource interlace (namely, L=1) to the terminal starting from an RB 0 (namely, $RB_{START}=0$), and an RB spacing of the resource interlace is 10 (namely, N=10), the RB set allocated to the terminal is:

$$0+\{(1-1)\}+\{0,1,\ldots,9\}\times 10=\{0,10,20,30,\ldots,90\}$$

The RB set is the resource interlace 0 in FIG. 8A.

Example 2

As shown in FIG. 8A, if the network device allocates two resource interlaces (namely, $RB_{START}=0$) to the terminal starting from an RB 0 (namely, L=2), and an RB spacing of the resource interlace is 10 (namely, N=10), the RB set allocated to the terminal is:

$$0+\{0,(2-1)\}+\{0,1,\ldots,9\}\times 10=\{0,10,20,30,\ldots,90\} \ \& \ \{1,11,21,31,\ldots,91\}$$

The two RB sets are resource interlaces 0 and 1 in FIG. 8A.

This example is used to merely explain this embodiment of this application without constituting any limitation.

In one embodiment, a resource indicator value (RIV) may be used to indicate the resource interlace allocated by the network device to the terminal. In one embodiment, reference may be made to an existing RIV calculation algorithm in 3GPP36.213. $(L-1) \leq \lfloor M/2 \rfloor$, $RIV=M(L-1)+RB_{START}$. Otherwise, $RIV=M(M-L+1)+(M-1-RB_{START})$.

This application is not limited to the foregoing implementations. The network device and the terminal may further agree on more resource indication manners. For example, the resource indication information may include an index of an RB that is actually allocated by the network device to the terminal. As shown in FIG. 8A, it is assumed that resource interlaces allocated by the network device to the terminal in the 20 MHz first bandwidth includes an interlace 0. In this case, the resource indication information may indicate indexes, for example, 0, 10, 20, . . . , and 90, of the 10 resource blocks, including an RB 0, an RB 10, an RB 20, . . . , and an RB 90 included in the interlace 0. The example is merely used to explain this application and shall not be construed as a limitation.

S111-S127. After receiving the resource indication information, the terminal needs to perform LBT before uplink transmission, detect an idle and available unlicensed frequency band, and determine an idle second bandwidth available for uplink transmission. For details, refer to S111. It should be understood that if the terminal does not detect an idle spectrum resource after LBT, the terminal cannot perform uplink transmission. Then, the terminal performs uplink transmission in a part or all of the second bandwidth according to the resource indication information. For details, refer to S113-S123. During signal transmission, signal processing may be performed. For example, to-be-transmitted uplink data is modulated on a part or all of the resource indicated by the resource indication information, and frequency multiplexing and resource sharing processing are performed on a to-be-transmitted signal.

It should be understood that, even if the idle bandwidth detected by the terminal by using LBT may be greater than the first bandwidth, the terminal can perform transmission only in the first bandwidth scheduled by the network device. In other words, the terminal needs to perform uplink transmission according to an indication of the network device. In other words, the available bandwidth (namely, the second bandwidth) that is detected by the terminal by using LBT and that is used for uplink transmission can only be less than or equal to the first bandwidth.

As shown in S113-S123, if the second bandwidth is equal to the first bandwidth, the terminal may perform uplink transmission in the second bandwidth according to the resource indication information. In other words, the terminal may perform uplink transmission on the resource indicated by the resource indication information. If the second bandwidth is less than the first bandwidth, the terminal may perform uplink transmission in a part of the resource indicated by the resource indication information. In other words, the terminal may perform uplink transmission on the resource that is in the second bandwidth and that is that is indicated by the resource indication information. For related examples and descriptions, refer to the principle parts of the embodiments of the invention. Details are not described herein again.

In some embodiments, if the second bandwidth is less than the first bandwidth, the terminal may still transmit the uplink data on the resource indicated by the resource indication information, but a transmit power at which the terminal performs uplink transmission on the resource that is in the second bandwidth and that is indicated by the resource indication information is not 0, and a transmit power for performing uplink transmission on a resource that is beyond the second bandwidth and that is indicated by the first indication information is 0. In this way, it can be ensured that there is signal energy only on an idle frequency band during uplink transmission, and there is no signal energy on a non-idle frequency band, without interfering with other signals transmitted on the non-idle frequency band.

Figure 9:
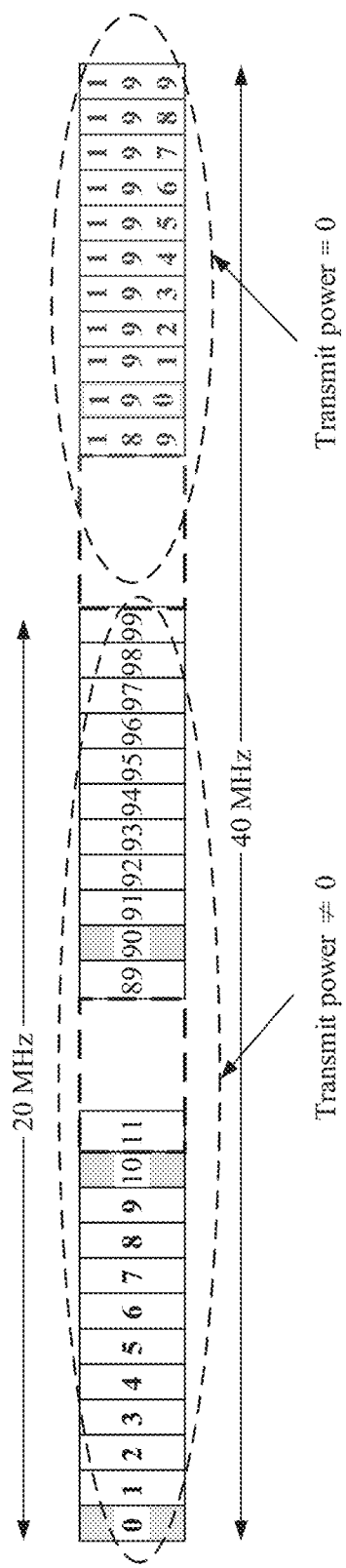
FIG. 9 is a schematic diagram of setting a signal transmit power to 0 on a non-idle frequency band according to this application.

For example, as shown in FIG. 9, the first bandwidth is 40 MHz, and the idle second bandwidth that is available for uplink transmission and that is determined by the terminal by using LBT is 20 MHz. The terminal still chooses to transmit the uplink data in the 40 MHz first bandwidth. A transmit power of an uplink signal is not 0 only in the idle second bandwidth, and is 0 on the non-idle frequency band. The example is merely used to explain this application and shall not be construed as a limitation.

In addition, the terminal further needs to send indication information to the network device. The indication information is used to indicate a bandwidth actually occupied by uplink transmission, so that the network device can correctly receive the uplink data. In this application, the indication information may be referred to as second indication information. During OCB detection, whether uplink transmission meets an OCB requirement may alternatively be determined based on the bandwidth reported by the terminal in the indication information.

In some embodiments, the terminal may add the second indication information during uplink transmission. In one embodiment, the terminal may send the second indication information in a first symbol of uplink transmission. In one embodiment, the terminal may add the second indication information to each subcarrier actually occupied by uplink transmission. This application is not limited to this implementation. The terminal may alternatively add the second indication information to an uplink control signal related to uplink transmission. In another implementation, the terminal may further encapsulate the second indication information into a separate message, and send the message to the network device.

In one embodiment, the terminal may send the second indication information on an unlicensed frequency band. For example, the terminal may add the second indication information to uplink transmission, or to an uplink control signal related to uplink transmission. For another example, the terminal may perform LBT on the unlicensed frequency band again, and separately send the second indication information in the re-detected idle bandwidth. The examples are merely some embodiments of this application, and shall not constitute a limitation. There may be different embodiments in an actual application. In one embodiment, the terminal may alternatively send the second indication information on a licensed frequency band.

A manner of implementing the second indication information (in other words, how the terminal sends the second indication information) is not limited in this embodiment of this application.

In one embodiment, the second indication information may include a size of the second bandwidth, or an index of a carrier or a subcarrier that is actually occupied by uplink transmission. The second indication information may also include a carrier or subcarrier range actually occupied by uplink transmission, in other words, a frequency span. This application is not limited to the two manners. The terminal may further report, in another manner, the bandwidth actually occupied by uplink transmission, for example, an index of an RB actually occupied by uplink transmission. The example is merely used to explain this application and shall not be construed as a limitation.

According to the embodiment in FIG. 7, the network device performs bandwidth resource scheduling in the first bandwidth at a full bandwidth level, and performs resource scheduling based on a fixed RB spacing of a resource interlace. The RB spacing does not change with the first bandwidth. In this way, resource scheduling can be more flexible while the OCB requirement of ESTI is met.

In addition to bandwidth resource scheduling at a full bandwidth level provided in the embodiment in FIG. 7, the network device may further perform subband resource scheduling at a subband level. In this application, the subband refers to one or more carrier, or some subcarriers or some resource blocks on a carrier. There may not be the concept of a subband in a future communications technology. However, concepts such as a part of subcarriers or resource blocks that are actually represented by the subband are also applicable to this application. The following describes resource scheduling at a subband level in detail.

Figure 10:
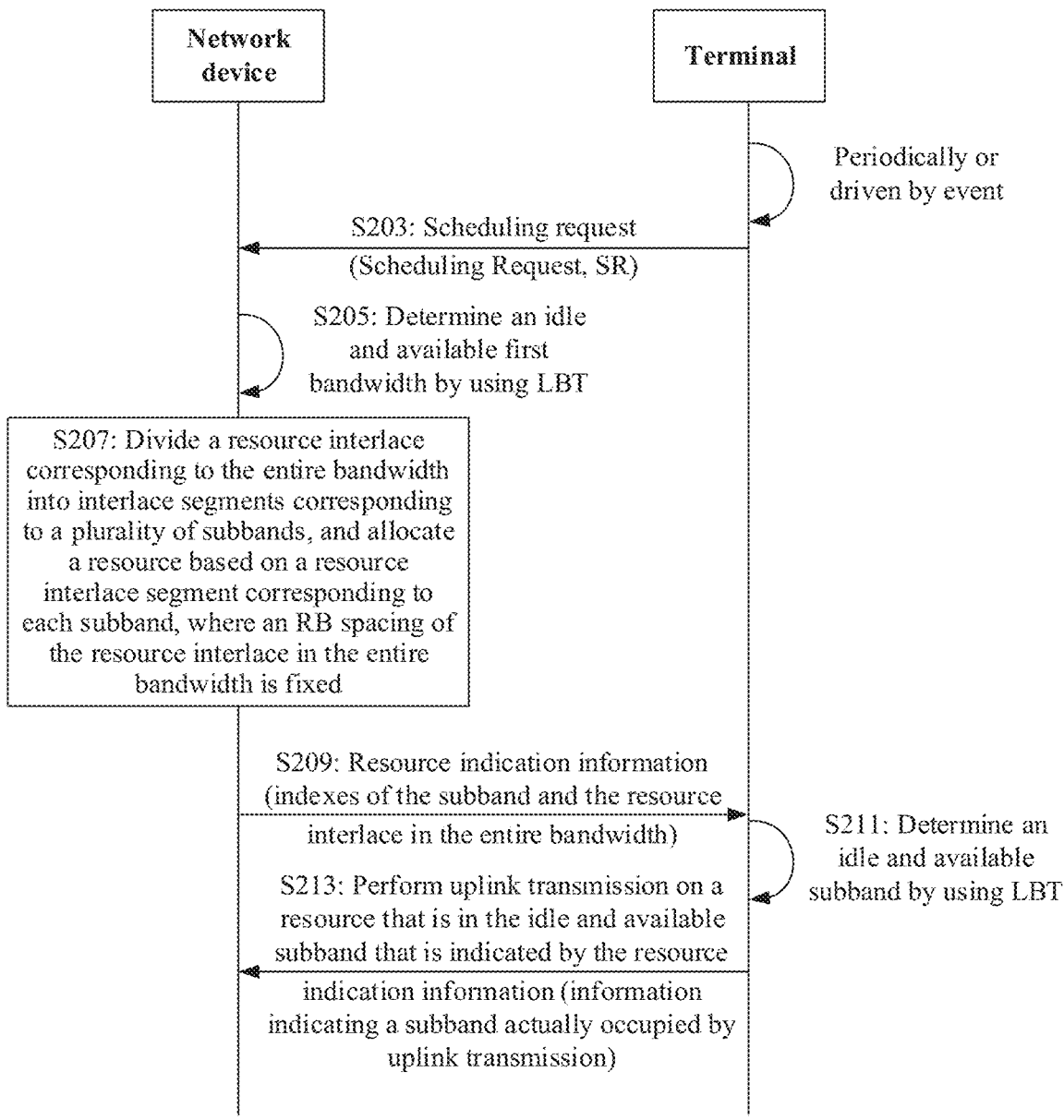
FIG. 10 is a schematic flowchart of a signal transmission method according to another embodiment of this application.

FIG. 10 shows a signal transmission method according to another embodiment of this application. In the embodiment in FIG. 10, a network device performs subband resource scheduling in a first bandwidth at a subband level, and performs resource scheduling based on an interlace segment corresponding to a subband. Herein, an interlace is one that is evenly distributed on the full bandwidth of the first bandwidth and whose RB spacing is fixed at N, namely, an interlace corresponding to the first bandwidth. Details are described below.

S203: The network device receives a scheduling request sent by a terminal. The scheduling request is used to request the network device to allocate an uplink transmission resource. For details, refer to S103 in the embodiment of FIG. 7. Details are not described herein again.

S205: In response to the scheduling request, the network device may first perform LBT before performing resource scheduling to determine a first bandwidth corresponding to an idle and available unlicensed frequency band.

S207: Different from the embodiment in FIG. 7, during resource allocation, a resource is not allocated based on an interlace corresponding to the first bandwidth. Instead, the interlace corresponding to the first bandwidth is divided into interlace segments corresponding to a plurality of subbands, and a resource is allocated based on an interlace segment corresponding to each subband.

Figure 11:
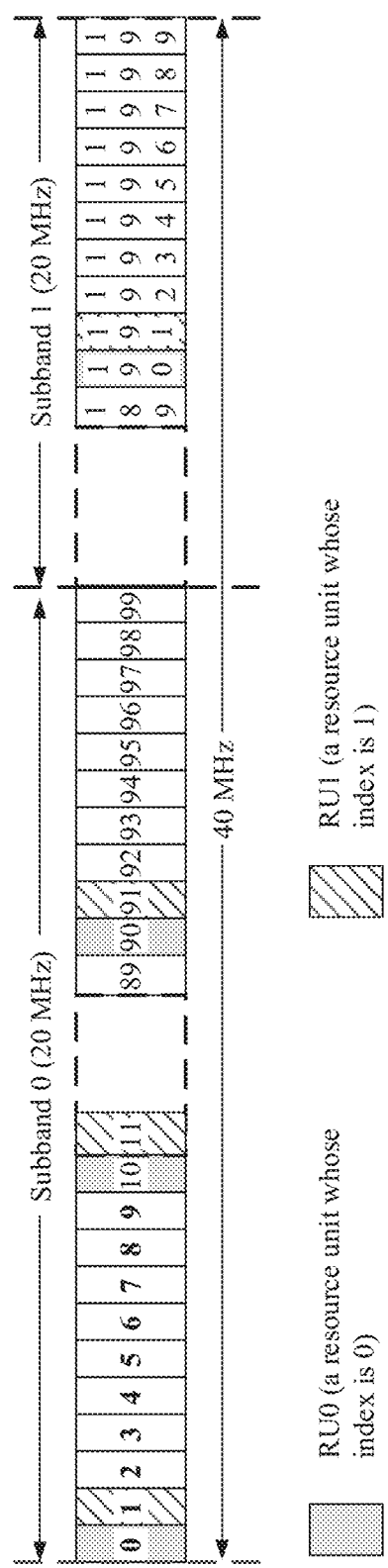
FIG. 11 is a schematic diagram of performing subband division on an interlace with a fixed RB spacing according to this application.

For example, as shown in FIG. 11, it is assumed that the first bandwidth is 40 MHz, and an interlace corresponding to the first bandwidth is an interlace with an RB spacing of 10, for example, interlaces 0 and 1. The network device divides the interlace corresponding to the first bandwidth into two interlace segments respectively corresponding to two subbands (both in 20 MHz). In one embodiment, for the interlace 0, interlace segments corresponding to a subband 0 includes an RB 0, an RB 10, an RB 20, . . . , and an RB 90; interlace segments corresponding to a subband 1 includes an RB 100, an RB 110, . . . , an RB 180, and an RB 190. For the interlace 1, interlace segments corresponding to a subband 0 includes an RB 1, an RB 11, an RB 21, . . . , and an RB 91; interlace segments corresponding to a subband 1 includes an RB 101, an RB 111, . . . , an RB 181, and an RB 191.

The example is merely used to explain this application and shall not be construed as a limitation. This application is not limited to that shown in FIG. 11. During subband division, a subband bandwidth may be another value, and subbands may have different bandwidths. An implementation of subband division is not limited in this application, as long as a ratio of a span of an interlace segment corresponding to a subband in frequency domain to a bandwidth of the subband meets an OCB requirement.

In one embodiment, an uplink resource allocated by the network device to the terminal may include one or more interlace fragments. For example, in FIG. 11, the uplink resource allocated by the network device to the terminal may include a segment of the interlace 0 corresponding to the subband 0, and a segment of the interlace 1 corresponding to the subband 0. The example is merely used to explain this application and shall not be construed as a limitation.

For one interlace, an interlace segment is a part of resource blocks in the interlace, and the part of resource blocks are contiguous in the interlace. For example, in FIG. 11, for the interlace 0, the interlace segments corresponding to the subband 0 includes the RB 0, the RB 10, the RB 20, . . . , and the RB 90. The RB 0, the RB 10, the RB 20, . . . , and the RB 90 are a part of the resource blocks in the interlace 0, and are a first, a second, a third, . . . , and a tenth RB, which are contiguous in the interlace 0. The example is merely used to explain this application and shall not be construed as a limitation.

S209: The network device returns resource indication information to the terminal, where the resource indication information is used to indicate an uplink resource allocated by the network device to the terminal on a subband of the first bandwidth. In this application, the resource indication information may be referred to as first indication information.

For implementation of the resource indication information by using signaling, refer to S109 in the embodiment in FIG. 7. Details are not described herein again.

The following describes how content in the resource indication information is implemented.

In one embodiment, the resource indication information may include an index of a subband corresponding to an interlace segment allocated by the network device to the terminal, and an index of an interlace corresponding to the interlace segment.

For example, as shown in FIG. 11, it is assumed that the interlace segments allocated by the network device to the terminal includes a segment (which may be referred to as a segment 1 for short) of the interlace 1 corresponding to the subband 0, and a segment (which may be referred to as a segment 2 for short) of the interlace 0 corresponding to the subband 1. The resource indication information may include an index of the subband (namely, an index of the subband 0) corresponding to the segment 1, an index of the interlace (namely, an index of the interlace 1), an index of the subband (namely, an index of the subband 1) corresponding to the segment 2, and an index of the interlace (namely, an index of the interlace 0). In this way, the terminal may learn, based on the indexes of the subband 0 and the interlace 1, that the resource actually allocated by the network device includes the segment 1. Similarly, the terminal may learn, based on the indexes of the subband 1 and the interlace 0, that the resource actually allocated by the network device includes the segment 2. The example is merely used to explain this application and shall not be construed as a limitation.

In one embodiment, the resource indication information may include an index of a subband corresponding to an interlace segment allocated by the network device to the terminal, and an index of a start RB in an interlace corresponding to the interlace segment.

It may be understood that the index of the start RB may be used to indicate which interlace the start RB belongs to. The terminal may learn, based on both the index of the start RB and the index of the subband corresponding to the interlace segment, which interlace segments are actually allocated by the network device.

For example, as shown in FIG. 11, it is assumed that the interlace segments allocated by the network device to the terminal includes the segment of the interlace 1 corresponding to the subband 0 (the segment of the interlace 1 on the subband 0, which may be referred to as a segment 1 for short), and the segment of the interlace 0 corresponding to the subband 1 (which may be referred to as a segment 2 for short). The resource indication information may include an index of the subband (namely, an index of the subband 0) corresponding to the segment 1, an index of a start RB (namely, an index of an RB 1) in the interlace corresponding to the segment 1, an index of the subband (namely, an index of the subband 1) corresponding to the segment 2, and an index of a start RB in the interlace corresponding to the segment 2 (namely, an index of the RB 0). In this way, the terminal may learn, based on the index of the RB 1, that the interlace segment allocated by the network device to the terminal belongs to the interlace 1. The terminal may determine, based on both the indexes of the RB 1 and the subband 0, that the interlace segment allocated by the network device to the terminal is the segment of the interlace 1 on the subband 0, namely, the segment 1. Similarly, the terminal may learn, based on the indexes of the RB 0 and the subband 1, that the resource actually allocated by the network device includes the segment 2. The example is merely used to explain this application and shall not be construed as a limitation.

In one embodiment, the resource indication information may include an index of an interlace corresponding to an interlace segment allocated by the network device to the terminal, and an index of the interlace segment in the interlace.

In one embodiment, indexes may be numbered for segments of one interlace corresponding to each subband. For example, as shown in FIG. 11, the interlace 0 is divided into interlace segments respectively corresponding to two subbands. The interlace segments respectively corresponding to the two subbands may be numbered as follows: a segment 0 (namely, an RB 0, an RB 10, an RB 20, . . . , and an RB 90), and a segment 1 (namely, an RB 100, an RB 110, . . . , an RB 180, and an RB 190). In this way, if the resource indication information includes indexes of the interlace 0 and the segment 0, the terminal may learn that the interlace segment actually allocated by the network device is the segment 0 in the interlace 0.

In one embodiment, the resource indication information may include indication information $W_{subband}$ of a subband bandwidth corresponding to an interlace segment allocated by the network device to the terminal, a quantity L of interlaces related to the interlace segment, and an index $RB_{START}$ of a start RB allocated by the network device to the terminal. This implementation is similar to the fourth implementation of the resource indication information in the embodiment in FIG. 7, and is equivalent to that the subband is considered as the first bandwidth in the embodiment in FIG. 7.

In one embodiment, an RB set allocated by the network device to the terminal may be indicated as $RB_{START}+1+i \cdot N$, where $RB_{START}$ indicates an index of a start RB allocated by the network device to the terminal on a subband; $l=0,1,\Lambda$ $L-1$, where L indicates a quantity of interlaces related to an interlace segment allocated by the network device to the terminal on the subband; N indicates an RB spacing of a resource interlace; $i=0,1,\Lambda$ $M-1$, where $N_{RB}^{subband}$ indicates a quantity of RBs corresponding to the subband. The RB spacing of the resource interlace is a known value. Therefore, if $RB_{START}$, L, and $W_{subband}$ ($N_{RB}^{subband}$ may be deduced) are learned, the RB set allocated by the network device to the terminal may be determined.

As shown in FIG. 11, it is assumed that the RB spacing of the resource interlace is 10 (namely, N=10), and the 40 MHz first bandwidth is divided into two 20 MHz subbands, namely, $N_{RB}^{subband}=100$.

Example 1

If the network device allocates, starting from the RB 0 (namely, $RB_{START}=0$), the segment (namely, L=1) of the interlace 0 corresponding to the subband 0 to the terminal, the RB set allocated to the terminal is:

$$0+\{(1-1)\}+\{0,1,\ldots,9\} \times 10=\{0,10,20,30,\ldots,90\}$$

The RB set is the segment of the interlace 0 corresponding to the subband 0 in FIG. 11.

Example 2

If the network device allocates, starting from the RB 0 (namely, $RB_{START}=0$), the segment of the interlace 0 corresponding to the subband 0 and the segment of the interlace 1 corresponding to the subband 0 (namely, L=2) to the terminal, the RB set allocated to the terminal is:

$$0+\{0,(2-1)\}+\{0,1,\ldots,9\} \times 10=\{0,10,20,30,\ldots,90\} \ \& \ \{1,11,21,31,\ldots,91\}$$

The two RB sets are respectively the segment of the interlace 0 corresponding to the subband 0 and the segment of the interlace 1 corresponding to the subband 0 in FIG. 11. This example is used to merely explain this embodiment of this application without constituting any limitation.

In one embodiment, a resource indicator value (RIV) may be used to indicate a resource block allocated by the network device to the terminal on a single subband. In one embodiment, reference may be made to an existing RIV calculation algorithm in 3GPP36.213. When $(L-1) \leq \lfloor M/2 \rfloor$, $RIV=M(L-1)+RB_{START}$. Otherwise, $RIV=M(M-L+1)+(M-1-RB_{START})$.

This application is not limited to the foregoing implementations. The network device and the terminal may further agree on more resource indication manners. For example, the resource indication information may include an index of an RB that is actually allocated by the network device to the terminal. The example is merely used to explain this application and shall not be construed as a limitation.

S211-S213: After receiving the resource indication information, the terminal may perform LBT on the subband to determine an idle and available subband. Herein, the idle and available subband is equivalent to the foregoing second bandwidth. Then, the terminal performs uplink transmission in a part of the idle and available subband according to the resource indication information. In one embodiment, the terminal may perform uplink transmission on a resource that is in the subband and that is indicated by the resource indication information. It should be understood that if the terminal does not detect an idle subband after LBT, the terminal cannot perform uplink transmission.

In one embodiment, the terminal may learn, according to the resource indication information, one or more interlace segments allocated by the network device to the terminal, and subbands corresponding to the one or more interlace segments. In one embodiment, the terminal may perform LBT only on the subbands corresponding to the one or more interlace segments, and perform uplink transmission on a detected idle and available subband.

For example, as shown in FIG. 11, it is assumed that the interlace segment allocated by the network device to the terminal in the 40 MHz first bandwidth includes the segment of the interlace 0 corresponding to the subband 0, and the segment of the interlace 1 corresponding to the subband 1. In this case, the terminal may perform LBT on the subbands 0 and 1. In one embodiment, when detecting that the subband 0 is idle and available and the subband 1 is not idle and unavailable, the terminal may perform uplink transmission on the subband 0, and in one embodiment, on the segment of the interlace 0 corresponding to the subband 0. The example is merely used to explain this application and shall not be construed as a limitation.

It should be understood that, a subband bandwidth is relatively less than a full bandwidth (for example, the 40 MHz first bandwidth FIG. 11), and therefore performing LBT on the subband can fully use an idle resource at a smaller scheduling granularity and facilitate timely transmission of uplink data.

In addition, the terminal further needs to send the indication information to the network device when performing uplink transmission on the idle and available subband. The indication information is used to indicate the bandwidth actually occupied by uplink transmission, so that the network device can correctly receive the uplink data. In this application, the indication information may be referred to as second indication information. During OCB detection, whether uplink transmission meets the OCB requirement may alternatively be determined based on the subband reported by the terminal in the indication information.

In one embodiment, the second indication information may include an index of the subband actually occupied for uplink transmission. The second indication information may also include an index of a subcarrier actually occupied by uplink transmission. This application is not limited to these manners, and other different manners may be used in an actual application. For example, the second indication information may include a range of subcarriers actually occupied by uplink transmission. The example is merely used to explain this application and shall not be construed as a limitation.

In one embodiment, for implementation of the second indication information by using signaling, refer to related content in the embodiment in FIG. 7. Details are not described herein again.

According to the embodiment in FIG. 10, the network device performs subband resource scheduling in the first bandwidth at a subband level, and performs resource allocation based on an interlace segment corresponding to each subband. The adopted interlace is an interlace that is evenly distributed in the entire first bandwidth and whose RB spacing is fixed at N. In this way, flexible transmission may be implemented in a multi-bandwidth scenario, a success rate of listening using LBT may be further increased, and uplink transmission efficiency may be improved.

Figure 12:
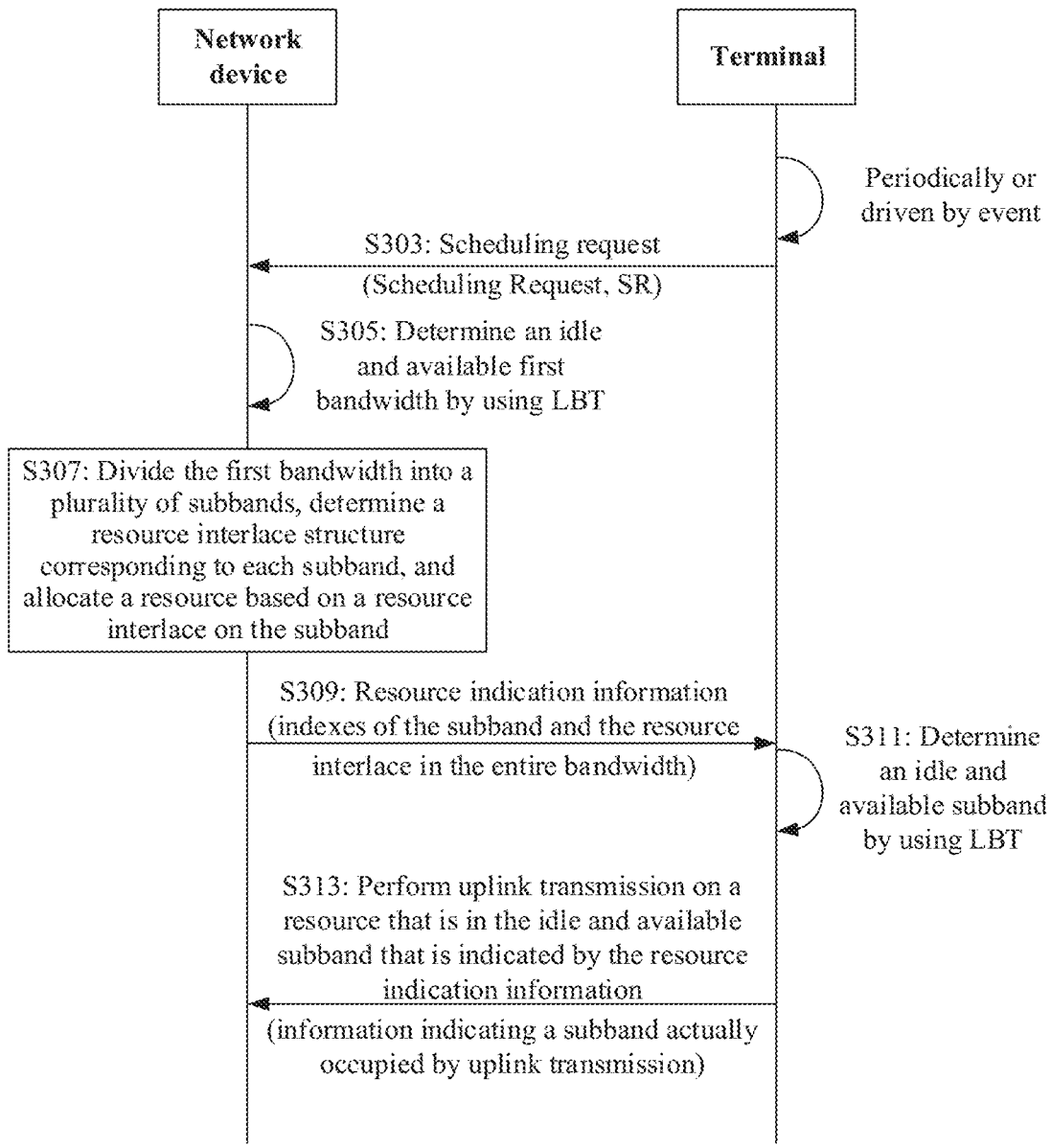
FIG. 12 is a schematic flowchart of a signal transmission method according to still another embodiment of this application.

FIG. 12 shows a signal transmission method according to still another embodiment of this application. In the embodiment in FIG. 12, a network device performs subband resource scheduling in a first bandwidth at a subband level, selects an appropriate interlace structure on a subband, and performs resource scheduling by using an interlace on the subband. Different from the embodiment in FIG. 7 or FIG. 10, the interlace used in the embodiment in FIG. 12 is an interlace on a subband. The interlace may be a fixed quantity of interlaces evenly distributed on the subband, or may be interlaces, with a fixed RB spacing, evenly distributed on the subband. Details are described below.

S303: The network device receives a scheduling request sent by a terminal. The scheduling request is used to request the network device to allocate an uplink transmission resource. For details, refer to S103 in the embodiment of FIG. 7. Details are not described herein again.

S305: In response to the scheduling request, the network device may first perform LBT before performing resource scheduling to determine a first bandwidth corresponding to an idle and available unlicensed frequency band.

S307: Divide the interlace corresponding to the first bandwidth into a plurality of subbands, determine an interlace structure corresponding to each subband, and allocate a resource based on an interlace on each subband.

Figure 13:
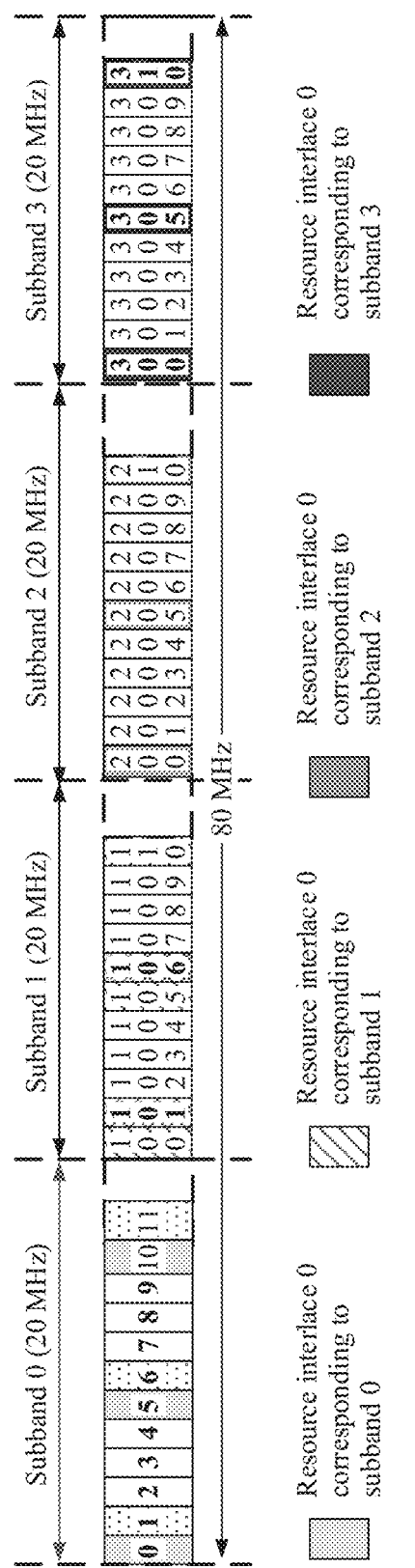
FIG. 13 is a schematic diagram of a resource interlace on each subband after subband division according to this application.

For example, as shown in FIG. 13, the first bandwidth is 80 MHz, the first bandwidth is divided into four subbands, and an interlace corresponding to each subband is an interlace whose RB spacing N is fixed at 5. The example is merely used to explain this application and shall not be construed as a limitation.

This application is not limited to that shown in FIG. 13. During subband division, a subband bandwidth may be another value, and subbands may have different bandwidths. The interlace corresponding to the subband may be a fixed quantity of interlaces evenly distributed on the subband, or may be interlaces, with a fixed RB spacing, evenly distributed on the subband. The subbands may correspond to a same or different interlace structures. Implementations of subband division and the interlace used by the subband are not limited in this application, as long as a ratio of a span of the interlace corresponding to the subband in frequency domain to a bandwidth of the subband meets an OCB requirement.

In one embodiment, the uplink resource allocated by the network device to the terminal may include one or more interlaces. The one or more interlaces may be interlaces on a same or different subbands.

For example, as shown in FIG. 13, the uplink resource allocated by the network device to the terminal may include interlaces 0 and 1 on a subband 0, namely, a plurality of interlaces on the same subband. The uplink resource allocated by the network device to the terminal may further include the interlace 0 on the subband 0 and an interlace 0 on a subband 1, namely, a plurality of interlaces on different subbands. The example is merely used to explain this application and shall not be construed as a limitation.

S309: The network device returns resource indication information to the terminal, where the resource indication information is used to indicate an uplink resource allocated by the network device to the terminal on the subband of the first bandwidth. In this application, the resource indication information may be referred to as first indication information.

For implementation of the resource indication information by using signaling, refer to S109 in the embodiment in FIG. 7. Details are not described herein again.

The following describes how content in the resource indication information is implemented.

In one embodiment, the resource indication information may include an index of a subband corresponding to an interlace allocated by the network device to the terminal, and an index of the interlace.

For example, as shown in FIG. 13, it is assumed that the interlace allocated by the network device to the terminal includes the interlace 1 corresponding to the subband 0 and the interlace 0 corresponding to the subband 1. The resource indication information may include an index of the subband 0, an index of the interlace 0 on the subband 0, an index of the subband 1, and an index of the interlace 0 on the subband 1. In this way, the terminal may learn, based on the indexes of the subband 0 and the interlace 0 on the subband 0, that the resource actually allocated by the network device includes {an RB 0, an RB 5, an RB 10, . . . , an RB 90, and an RB 95}. Similarly, the terminal may learn, based on the indexes of the subband 1 and the interlace 0 on the subband 1, that the resource actually allocated by the network device includes {an RB 100, an RB 105, an RB 110, . . . , an RB 190, and an RB 195}. The example is merely used to explain this application and shall not be construed as a limitation.

In one embodiment, the resource indication information may include an index of a subband corresponding to an interlace allocated by the network device to the terminal, and an index of a start RB in the interlace.

It may be understood that, on a known subband (which may be deduced based on an index of the subband), the index of the start RB may be used to indicate which (some) interlace or interlaces the start RB belongs to on the known subband.

For example, as shown in FIG. 13, it is assumed that the interlace allocated by the network device to the terminal includes the interlace 1 corresponding to the subband 0 and the interlace 0 corresponding to the subband 1. The resource indication information may include an index of the subband 0, an index of a start RB in the interlace 0 on the subband 0 (namely, an index of an RB 0), an index of the subband 1, and an index of a start RB in the interlace 0 on the subband 1 (namely, an index of an RB 100). In this way, the terminal may learn, based on the indexes of the subband 0 and the RB 0, that the resource actually allocated by the network device includes the interlace 0 on the subband 0. Similarly, the terminal may learn, based on the indexes of the subband 1 and the interlace 0 on the subband 1, that the resource actually allocated by the network device includes the inter-lace 0 on the subband 1. The example is merely used to explain this application and shall not be construed as a limitation.

In one embodiment, the resource indication information may include indication information $W_{subband}$ of a subband bandwidth corresponding to an interlace allocated by the network device to the terminal, a quantity L of interlaces allocated by the network device to the terminal on the subband, and an index $RB_{START}$ of a start RB allocated by the network device to the terminal on the subband.

In one embodiment, an RB set allocated by the network device to the terminal may be indicated as $RB_{START}+l+i\cdot N$, where $RB_{START}$ indicates an index of a start RB allocated by the network device to the terminal on a subband; $l=0,1,\Lambda$ L−1, where L indicates a quantity of interlaces allocated by the network device to the terminal on the subband; N indicates an RB spacing of a resource interlace on the subband; $i=0,1,\Lambda$ M−1, where $N_{RB}^{subband}$ indicates a quantity of RBs corresponding to the subband.

This implementation is similar to the fourth implementation of the resource indication information in the embodiment in FIG. 7, and is equivalent to that the subband is considered as the first bandwidth in the embodiment in FIG. 7. For details, refer to related content in the foregoing embodiments. Details are not described herein again.

This application is not limited to the foregoing implementations. The network device and the terminal may further agree on more resource indication manners. For example, the resource indication information may include an index of an RB that is actually allocated by the network device to the terminal. The example is merely used to explain this application and shall not be construed as a limitation.

S311-S313: After receiving the resource indication information, the terminal may perform LBT on the subband to determine an idle and available subband. Herein, the idle and available subband is equivalent to the foregoing second bandwidth. Then, the terminal performs uplink transmission in a part of the idle and available subband according to the resource indication information. In one embodiment, the terminal may perform uplink transmission on a resource that is in the subband and that is indicated by the resource indication information. It should be understood that if the terminal does not detect an idle subband after LBT, the terminal cannot perform uplink transmission.

In one embodiment, the terminal may learn, according to the resource indication information, one or more interlaces allocated by the network device to the terminal, and subbands corresponding to the one or more interlaces. In one embodiment, the terminal may perform LBT only on the subbands corresponding to the one or more interlaces, and perform uplink transmission on a detected idle and available subband.

It should be understood that, a subband bandwidth is relatively less than a full bandwidth (for example, the 80 MHz first bandwidth FIG. 13), and therefore performing LBT on the subband can fully use an idle resource and facilitate timely transmission of uplink data.

In addition, the terminal further needs to send the indication information to the network device when performing uplink transmission on the idle and available subband. The indication information is used to indicate the bandwidth actually occupied by uplink transmission, so that the network device can correctly receive the uplink data. In this application, the indication information may be referred to as second indication information. During OCB detection, whether uplink transmission meets the OCB requirement may alternatively be determined based on the subband reported by the terminal in the indication information.

In one embodiment, the second indication information may include an index of the subband actually occupied for uplink transmission. The second indication information may also include an index of a subcarrier actually occupied by uplink transmission. This application is not limited to these manners, and other different manners may be used in an actual application. For example, the second indication information may include a range of subcarriers actually occupied by uplink transmission. The example is merely used to explain this application and shall not be construed as a limitation.

For implementation of the second indication information by using signaling, refer to related content in the embodiment in FIG. 7. Details are not described herein again.

According to the embodiment in FIG. 12, the network device performs subband resource scheduling at a subband level in the first bandwidth, selects a proper interlace structure on the subband, and then performs resource scheduling by using the interlace on the subband as a basic unit. In this way, flexible transmission may be implemented in a multibandwidth scenario, a success rate of listening using LBT may be further increased, and uplink transmission efficiency may be improved.

In this application, the network device may allocate a resource based on an interlace with a fixed RB spacing. In one embodiment, during resource allocation, the network device may perform bandwidth resource scheduling in the first bandwidth at a full bandwidth level, or may perform subband resource scheduling on a subband of the first bandwidth at a subband level.

In this application, a bandwidth resource scheduling manner at a full bandwidth level may be referred to as a first resource allocation manner, and a subband resource scheduling manner at a subband level may be referred to as a second resource allocation manner.

In the case of resource scheduling at the full bandwidth level, for an implementation of a resource indication manner (namely, the resource indication information) of the network device, refer to the embodiment in FIG. 7. In the case of resource scheduling at the subband level, for an implementation of a resource indication manner (namely, the resource indication information) of the network device, refer to the embodiment in FIG. 10.

In addition, the network device further needs to add, to the resource indication information, a flag bit used to distinguish the two scheduling manners, so as to indicate a resource allocation manner used by the network device.

In one embodiment, after receiving the resource indication information, the terminal may first identify the flag bit.

If the resource allocation manner indicated by the flag bit is bandwidth resource scheduling, the terminal performs LBT on a bandwidth (namely, the first bandwidth) indicated by the network device. When the detected idle bandwidth (namely, the second bandwidth) used for uplink transmission is equal to the first bandwidth, the terminal may perform uplink transmission on all resources indicated by the resource indication information. When the detected idle bandwidth (namely, the second bandwidth) used for uplink transmission is less than the first bandwidth, the terminal may perform uplink transmission on a part of resources indicated by the resource indication information.

If the resource allocation manner indicated by the flag bit is subband resource scheduling, the terminal performs LBT on a subband (namely, the subband of the first bandwidth) indicated by the resource indication information. If the subband is idle, the terminal may perform uplink transmission on a scheduled resource on the subband. If the subband is occupied, the terminal cannot perform uplink transmission on the subband. Herein, the scheduling resource on the subband refers to a resource that is on the subband and that is indicated by the resource indication information.

In one embodiment, the bandwidth resource scheduling manner at the full bandwidth level may be further converted into the subband resource scheduling manner at the subband level. In one embodiment, in the bandwidth resource scheduling manner at the full bandwidth level, if the terminal does not detect the idle bandwidth after performing LBT, the network device may use the subband resource scheduling manner. In this way, the terminal may perform subband LBT again, to increase a success rate of LBT and perform uplink transmission in time.

The following describes in detail how to design a resource interlace with a fixed RB spacing newly defined in this application in a scenario of a plurality of system bandwidths and/or subcarrier spacings.

First, terms in Table 1 to Table 26 are explained.

In one embodiment, a bandwidth percent in the tables indicates a proportion of a transmission bandwidth in a system bandwidth. Herein, the system bandwidth includes the transmission bandwidth and a guard band. RB number indicates a quantity ($N_{RB}$) of RBs corresponding to the transmission bandwidth. Interlace structure indicates a quantity ($N_{RB}^{interlace}$) of RBs in each interlace. RB spacing indicates an RB spacing of each interlace, in other words, a spacing ($N_{RB}^{spacing}$)($N_{RB}^{spacing}=N_{RB}/N_{RB}^{interlace}$) between two adjacent RBs in each interlace.

For a known system bandwidth BW, interlace structures in different transmission bandwidth scenarios need to meet the following two conditions:

$N_{RB}$ mod $N_{RB}^{interlace}$=0, and $(N_{RB}-N_{RB}^{spacing}+1)*BW^{RB}/BW$<threshold, where indicates $BW^{RB}$ a bandwidth occupied by each RB. threshold indicates an OCB requirement of ESTI. For example, for an unlicensed low frequency band of 5 GHz, a threshold is 80%; for an unlicensed high frequency band of 60 GHz, a threshold is 70%.

In one embodiment, the first condition ($N^{RB}$ mod $N_{RB}^{interlace}$=0) is used to determine the interlace structures in different transmission bandwidth scenarios, so that the entire transmission bandwidth can be split into an integer quantity of interlaces. The second condition is used to control a frequency span of an interlace, so that a ratio of the frequency span $((N^{RB}-N_{RB}^{spacing}+1)*BW^{RB})$ of the interlace to the system bandwidth BW meets the OCB requirement.

Using Table 1 as an example, it is assumed that a system bandwidth (BW) is 20 MHz, and a subcarrier spacing (subcarrier spacing, SCS) is 15 KHz. A specific transmission bandwidth scenario in Table 1 is selected in the following description: bandwidth percent=90.00%.

In one embodiment, in a 90.00% transmission bandwidth scenario, to meet the foregoing two conditions, four interlace structures may be obtained, which are as follows:

A first interlace structure: Each interlace includes 10 RBs, and an RB spacing of each interlace is equal to 10 RBs.

A second interlace structure: Each interlace includes 20 RBs, and an RB spacing of each interlace is equal to 5 RBs.

A third interlace structure: Each interlace includes 25 RBs, and an RB spacing of each interlace is equal to 4 RBs.

A fourth interlace structure: Each interlace includes 50 RBs, and an RB spacing of each interlace is equal to 2 RBs.

The example is merely used to explain this application and shall not be construed as a limitation. Table 2 to Table 26 further show interlace structures in other scenarios of a plurality of system bandwidths and/or subcarrier spacings. Details are not described herein again.

In one embodiment, in Table 1 to Table 26, a plurality of parameter values included in the fourth column (interlace structure) sequentially correspond to a plurality of parameter values included in the fifth column (RB spacing), and two corresponding parameters respectively indicate a quantity of RBs included in an interlace and an RB spacing of the interlace. For example, in a 90.90% transmission bandwidth scenario, the fourth column in Table 1 includes four parameter values: 10, 20, 25, and 50. The fifth column in Table 1 includes four parameter values: 10, 5, 4, and 2. 10 corresponds to 10, 20 corresponds to 5, 25 corresponds to 4, and 50 corresponds to 2. The example is merely used to explain this application and shall not be construed as a limitation.

It can be seen from the table that, an interlace structure that meets the two conditions cannot be found in some transmission bandwidth scenarios. For example, the 90.90% transmission bandwidth scenario and a 92.70% transmission bandwidth scenario in Table 1, and the like. For these scenarios, an interlace structure in a similar transmission bandwidth scenario may be used, but the entire transmission bandwidth cannot be exactly divided into an integer quantity of interlaces.

To design a resource interlace (interlace) with a fixed RB spacing newly defined in the present application, interlaces with a same RB spacing are found from interlaces in the plurality of system bandwidths.

For example, it is assumed that a transmission bandwidth proportion is 90.00%. Four same interlace structures may be found from the interlace structures in the four system bandwidth scenarios (20 MHz, 40 MHz, 80 MHz, and 100 MHz) respectively indicated in Table 1 to Table 4. RB spacings in the four interlace structures are 2. 4, 5, and 10 respectively. In the four system bandwidth scenarios, the interlace structure newly defined in this application may be any one of the four interlace structures.

The example is merely used to explain this application and shall not be construed as a limitation. Similarly, the interlace structure newly defined in this application may be determined from interlace structures in the plurality of system bandwidths in other tables. Details are not described herein again.

Not limited to Table 1 to Table 26, actual values of interlace structures, table parameters, transmission bandwidths, subcarrier spacings, and the like in the scenario of the plurality of system bandwidths and/or subcarrier spacings are all subject to definitions in a future standard.

TABLE 1

Resource interlace design (BW = 20 MHz, SCS = 15 KHz)

| Bandwidth percent | RB number | Subcarrier number | Interlace structure (RB/interlace) | RB spacing |
|---|---|---|---|---|
| 90.00% | 100 | 1200 | 10, 20, 25, 50 | 10, 5, 4, 2 |
| 90.90% | 101 | 1212 | Null | Null |
| 91.80% | 102 | 1224 | 17, 34, 51 | 6, 3, 2 |
| 92.70% | 103 | 1236 | Null | Null |
| 93.60% | 104 | 1248 | 8, 13, 26, 52 | 13, 8, 4, 2 |
| 94.50% | 105 | 1260 | 7, 15, 21, 35 | 15, 7, 5, 3 |
| 95.40% | 106 | 1272 | 53 | 2 |

TABLE 1-continued

Resource interlace design (BW = 20 MHz, SCS = 15 KHz)

| Bandwidth percent | RB number | Subcarrier number | Interlace structure (RB/interlace) | RB spacing |
|---|---|---|---|---|
| 96.30% | 107 | 1284 | Null | Null |
| 97.20% | 108 | 1296 | 6, 9, 12, 18, 27, 36, 54 | 18, 12, 9, 6, 4, 3, 2 |
| 98.10% | 109 | 1308 | Null | Null |
| 99.00% | 110 | 1320 | 5, 10, 11, 22, 55 | 22, 11, 10, 5, 2 |

TABLE 2

Resource interlace design (BW = 40 MHz, SCS = 15 KHz)

| Bandwidth percent | RB number | Subcarrier number | Interlace structure (RB/interlace) | RB spacing |
|---|---|---|---|---|
| 90.00% | 200 | 2400 | 10, 20, 25, 40, 50, 100 | 20, 10, 8, 5, 4, 2 |
| 90.45% | 201 | 2412 | 67 | 3 |
| 90.90% | 202 | 2424 | 101 | 2 |
| 91.35% | 203 | 2436 | 29 | 7 |
| 91.80% | 204 | 2448 | 12, 17, 34, 51, 68, 102 | 17, 12, 6, 4, 3, 2 |
| 92.25% | 205 | 2460 | 41 | 5 |
| 92.70% | 206 | 2472 | 103 | 2 |
| 93.15% | 207 | 2484 | 9, 23, 69 | 23, 9, 3 |
| 93.60% | 208 | 2496 | 8, 13, 16, 26, 52, 104 | 26, 16, 13, 8, 4, 2 |
| 94.05% | 209 | 2508 | 11, 19 | 19, 11 |
| 94.50% | 210 | 2520 | 7, 10, 14, 15, 21, 30, 35, 42, 70, 105 | 30, 21, 15, 14, 10, 7, 6, 5, 3, 2 |
| 94.95% | 211 | 2532 | Null | Null |
| 95.40% | 212 | 2544 | 53, 106 | 4, 2 |
| 95.85% | 213 | 2556 | 71 | 3 |
| 96.30% | 214 | 2568 | 107 | 2 |
| 96.75% | 215 | 2580 | 43 | 5 |
| 97.20% | 216 | 2592 | 6, 8, 9, 12, 18, 24, 27, 36, 54, 72, 108 | 36, 27, 24, 18, 12, 9, 8, 6, 4, 3, 2 |
| 97.65% | 217 | 2604 | 7, 31 | 31, 7 |
| 98.10% | 218 | 2616 | 109 | 2 |
| 98.55% | 219 | 2628 | 73 | 3 |
| 99.00% | 220 | 2640 | 10, 11, 20, 22, 44, 55, 110 | 22, 20, 11, 10, 5, 4, 2 |

TABLE 3

Resource interlace design (BW = 80 MHz, SCS = 15 KHz)

| Bandwidth percent | RB number | Subcarrier number | Interlace structure (RB/interlace) | RB spacing |
|---|---|---|---|---|
| 90.00% | 400 | 4800 | 10, 16, 20, 25, 40, 50, 80, 100, 200 | 40, 25, 20, 16, 10, 8, 5, 4, 2 |
| 90.23% | 401 | 4812 | Null | Null |
| 90.45% | 402 | 4824 | 67, 134, 201 | 6, 3, 2 |
| 90.68% | 403 | 4836 | 13, 31 | 31, 13 |
| 90.90% | 404 | 4848 | 101, 202 | 4, 2 |
| 91.13% | 405 | 4860 | 9, 15, 27, 45, 81, 135 | 45, 27, 15, 9, 5, 3 |
| 91.35% | 406 | 4872 | 14, 29, 58, 203 | 29, 14, 7, 2 |
| 91.58% | 407 | 4884 | 11, 37 | 37, 11 |
| 91.80% | 408 | 4896 | 8, 12, 17, 24, 34, 51, 68, 102, 136, 204 | 51, 34, 24, 17, 12, 8, 6, 4, 3, 2 |
| 92.03% | 409 | 4908 | Null | Null |
| 92.25% | 410 | 4920 | 10, 41, 82, 205 | 41, 10, 5, 2 |
| 92.48% | 411 | 4932 | 137 | 3 |
| 92.70% | 412 | 4944 | 103, 206 | 4, 2 |
| 92.93% | 413 | 4956 | 59 | 7 |
| 93.15% | 414 | 4968 | 9, 18, 23, 46, 69, 138, 207 | 46, 23, 18, 9, 6, 3, 2 |
| 93.38% | 415 | 4980 | 83 | 5 |
| 93.60% | 416 | 4992 | 8, 13, 16, 26, 32, 52, 104, 208 | 52, 32, 26, 16, 13, 8, 4, 2 |
| 93.83% | 417 | 5004 | 139 | 3 |
| 94.05% | 418 | 5016 | 11, 19, 22, 38, 209 | 38, 22, 19, 11, 2 |

TABLE 3-continued

Resource interlace design (BW = 80 MHz, SCS = 15 KHz)

| Bandwidth percent | RB number | Subcarrier number | Interlace structure (RB/interlace) | RB spacing |
|---|---|---|---|---|
| 94.28% | 419 | 5028 | Null | Null |
| 94.50% | 420 | 5040 | 7, 10, 12, 14, 15, 20, 21, 28, 30, 35, 42, 60, 70, 84, 105, 140, 210 | 60, 42, 35, 30, 28, 21, 20, 15, 14, 12, 10, 7, 6, 5, 4, 3, 2 |
| 94.73% | 421 | 5052 | Null | Null |
| 94.95% | 422 | 5064 | 211 | 2 |
| 95.18% | 423 | 5076 | 9, 47, 141 | 47, 9, 3 |
| 95.40% | 424 | 5088 | 8, 53, 106, 212 | 53, 8, 4, 2 |
| 95.63% | 425 | 5100 | 17, 25, 85 | 25, 17, 5 |
| 95.85% | 426 | 5112 | 6, 71, 142, 213 | 71, 6, 3, 2 |
| 96.08% | 427 | 5124 | 7, 61 | 61, 7 |
| 96.30% | 428 | 5136 | 107, 214 | 4, 2 |
| 96.53% | 429 | 5148 | 11, 13, 33, 39, 143 | 39, 33, 13, 11, 3 |
| 96.75% | 430 | 5160 | 10, 43, 86, 215 | 43, 10, 5, 2 |
| 96.98% | 431 | 5172 | Null | Null |
| 97.20% | 432 | 5184 | 6, 8, 9, 12, 16, 18, 24, 27, 36, 48, 54, 72, 108, 144, 216 | 72, 54, 48, 36, 27, 24, 18, 16, 12, 9, 8, 6, 4, 3, 2 |
| 97.43% | 433 | 5196 | Null | Null |
| 97.65% | 434 | 5208 | 7, 14, 31, 62, 217 | 62, 31, 14, 7, 2 |
| 97.88% | 435 | 5220 | 15, 29, 87, 145 | 29, 15, 5, 3 |
| 98.10% | 436 | 5232 | 109, 218 | 4, 2 |
| 98.33% | 437 | 5244 | 19, 23 | 23, 19 |
| 98.55% | 438 | 5256 | 6, 73, 146, 219 | 73, 6, 3, 2 |
| 98.78% | 439 | 5268 | Null | Null |
| 99.00% | 440 | 5280 | 8, 10, 11, 20, 22, 40, 44, 55, 88, 110, 220 | 55, 44, 40, 22, 20, 11, 10, 8, 5, 4, 2 |

TABLE 4

Resource interlace design (BW = 100 MHz, SCS = 15 KHz)

| Bandwidth percent | RB number | Subcarrier number | Interlace structure (RB/interlace) | RB spacing |
|---|---|---|---|---|
| 90.00% | 500 | 6000 | 10, 20, 25, 50, 100, 125, 250 | 50, 25, 20, 10, 5, 4, 2 |
| 90.18% | 501 | 6012 | 167 | 3 |
| 90.36% | 502 | 6024 | 251 | 2 |
| 90.54% | 503 | 6036 | Null | Null |
| 90.72% | 504 | 6048 | 9, 12, 14, 18, 21, 24, 28, 36, 42, 56, 63, 72, 84, 126, 168, 252 | 56, 42, 36, 28, 24, 21, 18, 14, 12, 9, 8, 7, 6, 4, 3, 2 |
| 90.90% | 505 | 6060 | 101 | 5 |
| 91.08% | 506 | 6072 | 11, 22, 23, 46, 253 | 46, 23, 22, 11, 2 |
| 91.26% | 507 | 6084 | 13, 39, 169 | 39, 13, 3 |
| 91.44% | 508 | 6096 | 127, 254 | 4, 2 |
| 91.62% | 509 | 6108 | Null | Null |
| 91.80% | 510 | 6120 | 10, 15, 17, 30, 34, 51, 85, 102, 170, 255 | 51, 34, 30, 17, 15, 10, 6, 5, 3, 2 |
| 91.98% | 511 | 6132 | 73 | 7 |
| 92.16% | 512 | 6144 | 8, 16, 32, 64, 128, 256 | 64, 32, 16, 8, 4, 2 |
| 92.34% | 513 | 6156 | 9, 19, 27, 57, 171 | 57, 27, 19, 9, 3 |
| 92.52% | 514 | 6168 | 257 | 2 |
| 92.70% | 515 | 6180 | 103 | 5 |
| 92.88% | 516 | 6192 | 12, 43, 86, 129, 172, 258 | 43, 12, 6, 4, 3, 2 |
| 93.06% | 517 | 6204 | 11, 47 | 47, 11 |
| 93.24% | 518 | 6216 | 7, 14, 37, 74, 259 | 74, 37, 14, 7, 2 |
| 93.42% | 519 | 6228 | 173 | 3 |
| 93.60% | 520 | 6240 | 8, 10, 13, 20, 26, 40, 52, 65, 104, 130, 260 | 65, 52, 40, 26, 20, 13, 10, 8, 5, 4, 2 |
| 93.78% | 521 | 6252 | Null | Null |
| 93.96% | 522 | 6264 | 9, 18, 29, 58, 87, 174, 261 | 58, 29, 18, 9, 6, 3, 2 |
| 94.14% | 523 | 6276 | Null | Null |
| 94.32% | 524 | 6288 | 131, 262 | 4, 2 |
| 94.50% | 525 | 6300 | 7, 15, 21, 25, 35, 75, 105, 175 | 75, 35, 25, 21, 15, 7, 5, 3 |

TABLE 4-continued

Resource interlace design (BW = 100 MHz, SCS = 15 KHz)

| Bandwidth percent | RB number | Subcarrier number | Interlace structure (RB/interlace) | RB spacing |
|---|---|---|---|---|
| 94.68% | 526 | 6312 | 263 | 2 |
| 94.86% | 527 | 6324 | 17, 31 | 31, 17 |
| 95.04% | 528 | 6336 | 8, 11, 12, 16, 22, 24, 33, 44, 48, 66, 88, 132, 176, 264 | 66, 48, 44, 33, 24, 22, 16, 12, 11, 8, 6, 4, 3, 2 |
| 95.22% | 529 | 6348 | 23 | 23 |
| 95.40% | 530 | 6360 | 10, 53, 106, 265 | 53, 10, 5, 2 |
| 95.58% | 531 | 6372 | 9, 59, 177 | 59, 9, 3 |
| 95.76% | 532 | 6384 | 7, 14, 19, 28, 38, 76, 133, 266 | 76, 38, 28, 19, 14, 7, 4, 2 |
| 95.94% | 533 | 6396 | 13, 41 | 41, 13 |
| 96.12% | 534 | 6408 | 6, 89, 178, 267 | 89, 6, 3, 2 |
| 96.30% | 535 | 6420 | 107 | 5 |
| 96.48% | 536 | 6432 | 8, 67, 134, 268 | 67, 8, 4, 2 |
| 96.66% | 537 | 6444 | 179 | 3 |
| 96.84% | 538 | 6456 | 269 | 2 |
| 97.02% | 539 | 6468 | 7, 11, 49, 77 | 77, 49, 11, 7 |
| 97.20% | 540 | 6480 | 6, 9, 10, 12, 15, 18, 20, 27, 30, 36, 45, 54, 60, 90, 108, 135, 180, 270 | 90, 60, 54, 45, 36, 30, 27, 20, 18, 15, 12, 10, 9, 6, 5, 4, 3, 2 |
| 97.38% | 541 | 6492 | Null | Null |
| 97.56% | 542 | 6504 | 271 | 2 |
| 97.74% | 543 | 6516 | 181 | 3 |
| 97.92% | 544 | 6528 | 8, 16, 17, 32, 34, 68, 136, 272 | 68, 34, 32, 17, 16, 8, 4, 2 |
| 98.10% | 545 | 6540 | 109 | 5 |
| 98.28% | 546 | 6552 | 6, 7, 13, 14, 21, 26, 39, 42, 78, 91, 182, 273 | 91, 78, 42, 39, 26, 21, 14, 13, 7, 6, 3, 2 |
| 98.46% | 547 | 6564 | Null | Null |
| 98.64% | 548 | 6576 | 137274 | 4, 2 |
| 98.82% | 549 | 6588 | 9, 61, 183 | 61, 9, 3 |
| 99.00% | 550 | 6600 | 10, 11, 22, 25, 50, 55, 110, 275 | 55, 50, 25, 22, 11, 10, 5, 2 |

TABLE 5

Resource interlace design (BW = 20 MHz, SCS = 30 KHz)

| Bandwidth percent | RB number | Subcarrier number | Interlace structure (RB/interlace) | RB spacing |
|---|---|---|---|---|
| 90.00% | 50 | 600 | 10, 25 | 5, 2 |
| 91.80% | 51 | 612 | 17 | 3 |
| 93.60% | 52 | 624 | 13, 26 | 4, 2 |
| 95.40% | 53 | 636 | Null | Null |
| 97.20% | 54 | 648 | 6, 9, 18, 27 | 9, 6, 3, 2 |
| 99.00% | 55 | 660 | 5, 11 | 11, 5 |

TABLE 6

Resource interlace design (BW = 40 MHz, SCS = 30 KHz)

| Bandwidth percent | RB number | Subcarrier number | Interlace structure (RB/interlace) | RB spacing |
|---|---|---|---|---|
| 90.00% | 100 | 1200 | 10, 20, 25, 50 | 10, 5, 4, 2 |
| 90.90% | 101 | 1212 | Null | Null |
| 91.80% | 102 | 1224 | 17, 34, 51 | 6, 3, 2 |
| 92.70% | 103 | 1236 | Null | Null |
| 93.60% | 104 | 1248 | 8, 13, 26, 52 | 13, 8, 4, 2 |
| 94.50% | 105 | 1260 | 7, 15, 21, 35 | 15, 7, 5, 3 |
| 95.40% | 106 | 1272 | 53 | 2 |

TABLE 6-continued

Resource interlace design (BW = 40 MHz, SCS = 30 KHz)

| Bandwidth percent | RB number | Subcarrier number | Interlace structure (RB/interlace) | RB spacing |
|---|---|---|---|---|
| 96.30% | 107 | 1284 | Null | Null |
| 97.20% | 108 | 1296 | 6, 9, 12, 18, 27, 36, 54 | 18, 12, 9, 6, 4, 3, 2 |
| 98.10% | 109 | 1308 | Null | Null |
| 99.00% | 110 | 1320 | 5, 10, 11, 22, 55 | 22, 11, 10, 5, 2 |

TABLE 7

Resource interlace design (BW = 80 MHz, SCS = 30 KHz)

| Bandwidth percent | RB number | Subcarrier number | Interlace structure (RB/interlace) | RB spacing |
|---|---|---|---|---|
| 90.00% | 200 | 2400 | 10, 20, 25, 40, 50, 100 | 20, 10, 8, 5, 4, 2 |
| 90.45% | 201 | 2412 | 67 | 3 |
| 90.90% | 202 | 2424 | 101 | 2 |
| 91.35% | 203 | 2436 | 29 | 7 |
| 91.80% | 204 | 2448 | 12, 17, 34, 51, 68, 102 | 17, 12, 6, 4, 3, 2 |
| 92.25% | 205 | 2460 | 41 | 5 |
| 92.70% | 206 | 2472 | 103 | 2 |
| 93.15% | 207 | 2484 | 9, 23, 69 | 23, 9, 3 |
| 93.60% | 208 | 2496 | 8, 13, 16, 26, 52, 104 | 26, 16, 13, 8, 4, 2 |
| 94.05% | 209 | 2508 | 11, 19 | 19, 11 |
| 94.50% | 210 | 2520 | 7, 10, 14, 15, 21, 30, 35, 42, 70, 105 | 30, 21, 15, 14, 10, 7, 6, 5, 3, 2 |
| 94.95% | 211 | 2532 | Null | Null |
| 95.40% | 212 | 2544 | 53106 | 4, 2 |
| 95.85% | 213 | 2556 | 71 | 3 |
| 96.30% | 214 | 2568 | 107 | 2 |
| 96.75% | 215 | 2580 | 43 | 5 |
| 97.20% | 216 | 2592 | 6, 8, 9, 12, 18, 24, 27, 36, 54, 72, 108 | 36, 27, 24, 18, 12, 9, 8, 6, 4, 3, 2 |
| 97.65% | 217 | 2604 | 7, 31 | 31, 7 |
| 98.10% | 218 | 2616 | 109 | 2 |
| 98.55% | 219 | 2628 | 73 | 3 |
| 99.00% | 220 | 2640 | 10, 11, 20, 22, 44, 55, 110 | 22, 20, 11, 10, 5, 4, 2 |

TABLE 8

Resource interlace design (BW = 100 MHz, SCS = 30 KHz)

| Bandwidth percent | RB number | Subcarrier number | Interlace structure (RB/interlace) | RB spacing |
|---|---|---|---|---|
| 90.00% | 250 | 3000 | 10, 25, 50, 125 | 25, 10, 5, 2 |
| 90.36% | 251 | 3012 | Null | Null |
| 90.72% | 252 | 3024 | 9, 12, 14, 18, 21, 28, 36, 42, 63, 84, 126 | 28, 21, 18, 14, 12, 9, 7, 6, 4, 3, 2 |
| 91.08% | 253 | 3036 | 11, 23 | 23, 11 |
| 91.44% | 254 | 3048 | 127 | 2 |
| 91.80% | 255 | 3060 | 15, 17, 51, 85 | 17, 15, 5, 3 |
| 92.16% | 256 | 3072 | 8, 16, 32, 64, 128 | 32, 16, 8, 4, 2 |
| 92.52% | 257 | 3084 | Null | Null |
| 92.88% | 258 | 3096 | 43, 86, 129 | 6, 3, 2 |
| 93.24% | 259 | 3108 | 7, 37 | 37, 7 |
| 93.60% | 260 | 3120 | 10, 13, 20, 26, 52, 65, 130 | 26, 20, 13, 10, 5, 4, 2 |
| 93.96% | 261 | 3132 | 9, 29, 87 | 29, 9, 3 |
| 94.32% | 262 | 3144 | 131 | 2 |
| 94.68% | 263 | 3156 | Null | Null |
| 95.04% | 264 | 3168 | 8, 11, 12, 22, 24, 33, 44, 66, 88, 132 | 33, 24, 22, 12, 11, 8, 6, 4, 3, 2 |
| 95.40% | 265 | 3180 | 53 | 5 |
| 95.76% | 266 | 3192 | 7, 14, 19, 38, 133 | 38, 19, 14, 7, 2 |
| 96.12% | 267 | 3204 | 89 | 3 |
| 96.48% | 268 | 3216 | 67, 134 | 4, 2 |
| 96.84% | 269 | 3228 | Null | Null |

TABLE 8-continued

Resource interlace design (BW = 100 MHz, SCS = 30 KHz)

| Bandwidth percent | RB number | Subcarrier number | Interlace structure (RB/interlace) | RB spacing |
|---|---|---|---|---|
| 97.20% | 270 | 3240 | 6, 9, 10, 15, 18, 27, 30, 45, 54, 90, 135 | 45, 30, 27, 18, 15, 10, 9, 6, 5, 3, 2 |
| 97.56% | 271 | 3252 | Null | Null |
| 97.92% | 272 | 3264 | 8, 16, 17, 34, 68, 136 | 34, 17, 16, 8, 4, 2 |
| 98.28% | 273 | 3276 | 7, 13, 21, 39, 91 | 39, 21, 13, 7, 3 |
| 98.64% | 274 | 3288 | 137 | 2 |
| 99.00% | 275 | 3300 | 11, 25, 55 | 25, 11, 5 |

TABLE 9

Resource interlace design (BW = 160 MHz, SCS = 30 KHz)

| Bandwidth percent | RB number | Subcarrier number | Interlace structure (RB/interlace) | RB spacing |
|---|---|---|---|---|
| 90.00% | 400 | 4800 | 10, 16, 20, 25, 40, 50, 80, 100, 200 | 40, 25, 20, 16, 10, 8, 5, 4, 2 |
| 90.23% | 401 | 4812 | Null | Null |
| 90.45% | 402 | 4824 | 67, 134, 201 | 6, 3, 2 |
| 90.68% | 403 | 4836 | 13, 31 | 31, 13 |
| 90.90% | 404 | 4848 | 101, 202 | 4, 2 |
| 91.13% | 405 | 4860 | 9, 15, 27, 45, 81, 135 | 45, 27, 15, 9, 5, 3 |
| 91.35% | 406 | 4872 | 14, 29, 58, 203 | 29, 14, 7, 2 |
| 91.58% | 407 | 4884 | 11, 37 | 37, 11 |
| 91.80% | 408 | 4896 | 8, 12, 17, 24, 34, 51, 68, 102, 136, 204 | 51, 34, 24, 17, 12, 8, 6, 4, 3, 2 |
| 92.03% | 409 | 4908 | Null | Null |
| 92.25% | 410 | 4920 | 10, 41, 82, 205 | 41, 10, 5, 2 |
| 92.48% | 411 | 4932 | 137 | 3 |
| 92.70% | 412 | 4944 | 103, 206 | 4, 2 |
| 92.93% | 413 | 4956 | 59 | 7 |
| 93.15% | 414 | 4968 | 9, 18, 23, 46, 69, 138, 207 | 46, 23, 18, 9, 6, 3, 2 |
| 93.38% | 415 | 4980 | 83 | 5 |
| 93.60% | 416 | 4992 | 8, 13, 16, 26, 32, 52, 104, 208 | 52, 32, 26, 16, 13, 8, 4, 2 |
| 93.83% | 417 | 5004 | 139 | 3 |
| 94.05% | 418 | 5016 | 11, 19, 22, 38, 209 | 38, 22, 19, 11, 2 |
| 94.28% | 419 | 5028 | Null | Null |
| 94.50% | 420 | 5040 | 7, 10, 12, 14, 15, 20, 21, 28, 30, 35, 42, 60, 70, 84, 105, 140, 210 | 60, 42, 35, 30, 28, 21, 20, 15, 14, 12, 10, 7, 6, 5, 4, 3, 2 |
| 94.73% | 421 | 5052 | Null | Null |
| 94.95% | 422 | 5064 | 211 | 2 |
| 95.18% | 423 | 5076 | 9, 47, 141 | 47, 9, 3 |
| 95.40% | 424 | 5088 | 8, 53, 106, 212 | 53, 8, 4, 2 |
| 95.63% | 425 | 5100 | 17, 25, 85 | 25, 17, 5 |
| 95.85% | 426 | 5112 | 6, 71, 142, 213 | 71, 6, 3, 2 |
| 96.08% | 427 | 5124 | 7, 61 | 61, 7 |
| 96.30% | 428 | 5136 | 107, 214 | 4, 2 |
| 96.53% | 429 | 5148 | 11, 13, 33, 39, 143 | 39, 33, 13, 11, 3 |
| 96.75% | 430 | 5160 | 10, 43, 86, 215 | 43, 10, 5, 2 |
| 96.98% | 431 | 5172 | Null | Null |
| 97.20% | 432 | 5184 | 6, 8, 9, 12, 16, 18, 24, 27, 36, 48, 54, 72, 108, 144, 216 | 72, 54, 48, 36, 27, 24, 18, 16, 12, 9, 8, 6, 4, 3, 2 |
| 97.43% | 433 | 5196 | Null | Null |
| 97.65% | 434 | 5208 | 7, 14, 31, 62, 217 | 62, 31, 14, 7, 2 |
| 97.88% | 435 | 5220 | 15, 29, 87, 145 | 29, 15, 5, 3 |
| 98.10% | 436 | 5232 | 109, 218 | 4, 2 |
| 98.33% | 437 | 5244 | 19, 23 | 23, 19 |
| 98.55% | 438 | 5256 | 6, 73, 146, 219 | 73, 6, 3, 2 |
| 98.78% | 439 | 5268 | Null | Null |
| 99.00% | 440 | 5280 | 8, 10, 11, 20, 22, 40, 44, 55, 88, 110, 220 | 55, 44, 40, 22, 20, 11, 10, 8, 5, 4, 2 |

TABLE 10

Resource interlace design (BW = 20 MHz, SCS = 60 KHz)

| Bandwidth percent | RB number | Subcarrier number | Interlace structure (RB/interlace) | RB spacing |
|---|---|---|---|---|
| 90.00% | 25 | 300 | 25 | 1 |
| 93.60% | 26 | 312 | 13 | 2 |
| 97.20% | 27 | 324 | 9 | 3 |

TABLE 11

Resource interlace design (BW = 40 MHz, SCS = 60 KHz)

| Bandwidth percent | RB number | Subcarrier number | Interlace structure (RB/interlace) | RB spacing |
|---|---|---|---|---|
| 90.00% | 50 | 600 | 10, 25 | 5, 2 |
| 91.80% | 51 | 612 | 17 | 3 |
| 93.60% | 52 | 624 | 13, 26 | 4, 2 |
| 95.40% | 53 | 636 | Null | Null |
| 97.20% | 54 | 648 | 6, 9, 18, 27 | 9, 6, 3, 2 |
| 99.00% | 55 | 660 | 5, 11 | 11, 5 |

TABLE 12

Resource interlace design (BW = 80 MHz, SCS = 60 KHz)

| Bandwidth percent | RB number | Subcarrier number | Interlace structure (RB/interlace) | RB spacing |
|---|---|---|---|---|
| 90.00% | 100 | 1200 | 10, 20, 25, 50 | 10, 5, 4, 2 |
| 90.90% | 101 | 1212 | Null | Null |
| 91.80% | 102 | 1224 | 17, 34, 51 | 6, 3, 2 |
| 92.70% | 103 | 1236 | Null | Null |
| 93.60% | 104 | 1248 | 8, 13, 26, 52 | 13, 8, 4, 2 |
| 94.50% | 105 | 1260 | 7, 15, 21, 35 | 15, 7, 5, 3 |
| 95.40% | 106 | 1272 | 53 | 2 |
| 96.30% | 107 | 1284 | Null | Null |
| 97.20% | 108 | 1296 | 6, 9, 12, 18, 27, 36, 54 | 18, 12, 9, 6, 4, 3, 2 |
| 98.10% | 109 | 1308 | Null | Null |
| 99.00% | 110 | 1320 | 5, 10, 11, 22, 55 | 22, 11, 10, 5, 2 |

TABLE 13

Resource interlace design (BW = 100 MHz, SCS = 60 KHz)

| Bandwidth percent | RB number | Subcarrier number | Interlace structure (RB/interlace) | RB spacing |
|---|---|---|---|---|
| 90.00% | 125 | 1500 | 25 | 5 |
| 90.72% | 126 | 1512 | 9, 14, 18, 21, 42, 63 | 14, 9, 7, 6, 3, 2 |
| 91.44% | 127 | 1524 | Null | Null |
| 92.16% | 128 | 1536 | 8, 16, 32, 64 | 16, 8, 4, 2 |
| 92.88% | 129 | 1548 | 43 | 3 |
| 93.60% | 130 | 1560 | 10, 13, 26, 65 | 13, 10, 5, 2 |
| 94.32% | 131 | 1572 | Null | Null |
| 95.04% | 132 | 1584 | 11, 12, 22, 33, 44, 66 | 12, 11, 6, 4, 3, 2 |
| 95.76% | 133 | 1596 | 7, 19 | 19, 7 |
| 96.48% | 134 | 1608 | 67 | 2 |
| 97.20% | 135 | 1620 | 9, 15, 27, 45 | 15, 9, 5, 3 |
| 97.92% | 136 | 1632 | 8, 17, 34, 68 | 17, 8, 4, 2 |
| 98.64% | 137 | 1644 | Null | Null |

TABLE 14

Resource interlace design (BW = 160 MHz, SCS = 60 KHz)

| Bandwidth percent | RB number | Subcarrier number | Interlace structure (RB/interlace) | RB spacing |
|---|---|---|---|---|
| 90.00% | 200 | 2400 | 10, 20, 25, 40, 50, 100 | 20, 10, 8, 5, 4, 2 |
| 90.45% | 201 | 2412 | 67 | 3 |
| 90.90% | 202 | 2424 | 101 | 2 |
| 91.35% | 203 | 2436 | 29 | 7 |
| 91.80% | 204 | 2448 | 12, 17, 34, 51, 68, 102 | 17, 12, 6, 4, 3, 2 |
| 92.25% | 205 | 2460 | 41 | 5 |
| 92.70% | 206 | 2472 | 103 | 2 |
| 93.15% | 207 | 2484 | 9, 23, 69 | 23, 9, 3 |
| 93.60% | 208 | 2496 | 8, 13, 16, 26, 52, 104 | 26, 16, 13, 8, 4, 2 |
| 94.05% | 209 | 2508 | 11, 19 | 19, 11 |
| 94.50% | 210 | 2520 | 7, 10, 14, 15, 21, 30, 35, 42, 70, 105 | 30, 21, 15, 14, 10, 7, 6, 5, 3, 2 |
| 94.95% | 211 | 2532 | Null | Null |
| 95.40% | 212 | 2544 | 53, 106 | 4, 2 |
| 95.85% | 213 | 2556 | 71 | 3 |
| 96.30% | 214 | 2568 | 107 | 2 |
| 96.75% | 215 | 2580 | 43 | 5 |
| 97.20% | 216 | 2592 | 6, 8, 9, 12, 18, 24, 27, 36, 54, 72, 108 | 36, 27, 24, 18, 12, 9, 8, 6, 4, 3, 2 |
| 97.65% | 217 | 2604 | 7, 31 | 31, 7 |
| 98.10% | 218 | 2616 | 109 | 2 |
| 98.55% | 219 | 2628 | 73 | 3 |
| 99.00% | 220 | 2640 | 10, 11, 20, 22, 44, 55, 110 | 22, 20, 11, 10, 5, 4, 2 |

TABLE 15

Resource interlace design (BW = 320 MHz, SCS = 60 KHz)

| Bandwidth percent | RB number | Subcarrier number | Interlace structure (RB/interlace) | RB spacing |
|---|---|---|---|---|
| 90.00% | 400 | 4800 | 10, 16, 20, 25, 40, 50, 80, 100, 200 | 40, 25, 20, 16, 10, 8, 5, 4, 2 |
| 90.23% | 401 | 4812 | Null | Null |
| 90.45% | 402 | 4824 | 67, 134, 201 | 6, 3, 2 |
| 90.68% | 403 | 4836 | 13, 31 | 31, 13 |
| 90.90% | 404 | 4848 | 101, 202 | 4, 2 |
| 91.13% | 405 | 4860 | 9, 15, 27, 45, 81, 135 | 45, 27, 15, 9, 5, 3 |
| 91.35% | 406 | 4872 | 14, 29, 58, 203 | 29, 14, 7, 2 |
| 91.58% | 407 | 4884 | 11, 37 | 37, 11 |
| 91.80% | 408 | 4896 | 8, 12, 17, 24, 34, 51, 68, 102, 136, 204 | 51, 34, 24, 17, 12, 8, 6, 4, 3, 2 |
| 92.03% | 409 | 4908 | Null | Null |
| 92.25% | 410 | 4920 | 10, 41, 82, 205 | 41, 10, 5, 2 |
| 92.48% | 411 | 4932 | 137 | 3 |
| 92.70% | 412 | 4944 | 103, 206 | 4, 2 |
| 92.93% | 413 | 4956 | 59 | 7 |
| 93.15% | 414 | 4968 | 9, 18, 23, 46, 69, 138, 207 | 46, 23, 18, 9, 6, 3, 2 |
| 93.38% | 415 | 4980 | 83 | 5 |
| 93.60% | 416 | 4992 | 8, 13, 16, 26, 32, 52, 104, 208 | 52, 32, 26, 16, 13, 8, 4, 2 |
| 93.83% | 417 | 5004 | 139 | 3 |
| 94.05% | 418 | 5016 | 11, 19, 22, 38, 209 | 38, 22, 19, 11, 2 |
| 94.28% | 419 | 5028 | Null | Null |
| 94.50% | 420 | 5040 | 7, 10, 12, 14, 15, 20, 21, 28, 30, 35, 42, 60, 70, 84, 105, 140, 210 | 60, 42, 35, 30, 28, 21, 20, 15, 14, 12, 10, 7, 6, 5, 4, 3, 2 |
| 94.73% | 421 | 5052 | Null | Null |
| 94.95% | 422 | 5064 | 211 | 2 |
| 95.18% | 423 | 5076 | 9, 47, 141 | 47, 9, 3 |
| 95.40% | 424 | 5088 | 8, 53, 106, 212 | 53, 8, 4, 2 |
| 95.63% | 425 | 5100 | 17, 25, 85 | 25, 17, 5 |
| 95.85% | 426 | 5112 | 6, 71, 142, 213 | 71, 6, 3, 2 |
| 96.08% | 427 | 5124 | 7, 61 | 61, 7 |
| 96.30% | 428 | 5136 | 107, 214 | 4, 2 |
| 96.53% | 429 | 5148 | 11, 13, 33, 39, 143 | 39, 33, 13, 11, 3 |
| 96.75% | 430 | 5160 | 10, 43, 86, 215 | 43, 10, 5, 2 |
| 96.98% | 431 | 5172 | Null | Null |

TABLE 15-continued

Resource interlace design (BW = 320 MHz, SCS = 60 KHz)

| Bandwidth percent | RB number | Subcarrier number | Interlace structure (RB/interlace) | RB spacing |
|---|---|---|---|---|
| 97.20% | 432 | 5184 | 6, 8, 9, 12, 16, 18, 24, 27, 36, 48, 54, 72, 108, 144, 216 | 72, 54, 48, 36, 27, 24, 18, 16, 12, 9, 8, 6, 4, 3, 2 |
| 97.43% | 433 | 5196 | Null | Null |
| 97.65% | 434 | 5208 | 7, 14, 31, 62, 217 | 62, 31, 14, 7, 2 |
| 97.88% | 435 | 5220 | 15, 29, 87, 145 | 29, 15, 5, 3 |
| 98.10% | 436 | 5232 | 109, 218 | 4, 2 |
| 98.33% | 437 | 5244 | 19, 23 | 23, 19 |
| 98.55% | 438 | 5256 | 6, 73, 146, 219 | 73, 6, 3, 2 |
| 98.78% | 439 | 5268 | Null | Null |
| 99.00% | 440 | 5280 | 8, 10, 11, 20, 22, 40, 44, 55, 88, 110, 220 | 55, 44, 40, 22, 20, 11, 10, 8, 5, 4, 2 |

TABLE 16

Resource interlace design (BW = 0.5 GHz, SCS = 120 KHz)

| Bandwidth percent | RB number | Subcarrier number | Interlace structure (RB/interlace) | RB spacing |
|---|---|---|---|---|
| 90.00% | 312 | 3744 | 6, 8, 12, 13, 24, 26, 39, 52, 78, 104, 156 | 52, 39, 26, 24, 13, 12, 8, 6, 4, 3, 2 |
| 90.14% | 313 | 3756 | Null | Null |
| 90.43% | 314 | 3768 | 157 | 2 |
| 90.72% | 315 | 3780 | 5, 7, 9, 15, 21, 35, 45, 63, 105 | 63, 45, 35, 21, 15, 9, 7, 5, 3 |
| 91.01% | 316 | 3792 | 79, 158 | 4, 2 |
| 91.30% | 317 | 3804 | Null | Null |
| 91.58% | 318 | 3816 | 6, 53, 106, 159 | 53, 6, 3, 2 |
| 91.87% | 319 | 3828 | 11, 29 | 29, 11 |
| 92.16% | 320 | 3840 | 5, 8, 10, 16, 20, 32, 40, 64, 80, 160 | 64, 40, 32, 20, 16, 10, 8, 5, 4, 2 |
| 92.45% | 321 | 3852 | 107 | 3 |
| 92.74% | 322 | 3864 | 7, 14, 23, 46, 161 | 46, 23, 14, 7, 2 |
| 93.02% | 323 | 3876 | 17, 19 | 19, 17 |
| 93.31% | 324 | 3888 | 4, 6, 9, 12, 18, 27, 36, 54, 81, 108, 162 | 81, 54, 36, 27, 18, 12, 9, 6, 4, 3, 2 |
| 93.60% | 325 | 3900 | 5, 13, 25, 65 | 65, 25, 13, 5 |
| 93.89% | 326 | 3912 | 163 | 2 |
| 94.18% | 327 | 3924 | 109 | 3 |
| 94.46% | 328 | 3936 | 4, 8, 41, 82, 164 | 82, 41, 8, 4, 2 |
| 94.75% | 329 | 3948 | 7, 47 | 47, 7 |
| 95.04% | 330 | 3960 | 5, 6, 10, 11, 15, 22, 30, 33, 55, 66, 110, 165 | 66, 55, 33, 30, 22, 15, 11, 10, 6, 5, 3, 2 |
| 95.33% | 331 | 3972 | Null | Null |
| 95.62% | 332 | 3984 | 4, 83, 166 | 83, 4, 2 |
| 95.90% | 333 | 3996 | 9, 37, 111 | 37, 9, 3 |
| 96.19% | 334 | 4008 | 167 | 2 |
| 96.48% | 335 | 4020 | 5, 67 | 67, 5 |
| 96.77% | 336 | 4032 | 4, 6, 7, 8, 12, 14, 16, 21, 24, 28, 42, 48, 56, 84, 112, 168 | 84, 56, 48, 42, 28, 24, 21, 16, 14, 12, 8, 7, 6, 4, 3, 2 |
| 97.06% | 337 | 4044 | Null | Null |
| 97.34% | 338 | 4056 | 13, 26, 169 | 26, 13, 2 |
| 97.63% | 339 | 4068 | 113 | 3 |
| 97.92% | 340 | 4080 | 4, 5, 10, 17, 20, 34, 68, 85, 170 | 85, 68, 34, 20, 17, 10, 5, 4, 2 |
| 98.21% | 341 | 4092 | 11, 31 | 31, 11 |
| 98.50% | 342 | 4104 | 6, 9, 18, 19, 38, 57, 114, 171 | 57, 38, 19, 18, 9, 6, 3, 2 |
| 98.78% | 343 | 4116 | 7, 49 | 49, 7 |
| 99.07% | 344 | 4128 | 4, 8, 43, 86, 172 | 86, 43, 8, 4, 2 |

TABLE 17

Resource interlace design (BW = 1 GHz, SCS = 120 KHz)

| Bandwidth percent | RB number | Subcarrier number | Interlace structure (RB/interlace) | RB spacing |
|---|---|---|---|---|
| 90.00% | 625 | 7500 | 5, 25, 125 | 125, 25, 5 |
| 90.14% | 626 | 7512 | 313 | 2 |
| 90.29% | 627 | 7524 | 11, 19, 33, 57, 209 | 57, 33, 19, 11, 3 |
| 90.43% | 628 | 7536 | 157, 314 | 4, 2 |
| 90.58% | 629 | 7548 | 17, 37 | 37, 17 |
| 90.72% | 630 | 7560 | 5, 6, 7, 9, 10, 14, 15, 18, 21, 30, 35, 42, 45, 63, 70, 90, 105, 126, 210, 315 | 126, 105, 90, 70, 63, 45, 42, 35, 30, 21, 18, 15, 14, 10, 9, 7, 6, 5, 3, 2 |
| 90.86% | 631 | 7572 | Null | Null |
| 91.01% | 632 | 7584 | 8, 79, 158, 316 | 79, 8, 4, 2 |
| 91.15% | 633 | 7596 | 211 | 3 |
| 91.30% | 634 | 7608 | 317 | 2 |
| 91.44% | 635 | 7620 | 5, 127 | 127, 5 |
| 91.58% | 636 | 7632 | 6, 12, 53, 106, 159, 212, 318 | 106, 53, 12, 6, 4, 3, 2 |
| 91.73% | 637 | 7644 | 7, 13, 49, 91 | 91, 49, 13, 7 |
| 91.87% | 638 | 7656 | 11, 22, 29, 58, 319 | 58, 29, 22, 11, 2 |
| 92.02% | 639 | 7668 | 9, 71, 213 | 71, 9, 3 |
| 92.16% | 640 | 7680 | 5, 8, 10, 16, 20, 32, 40, 64, 80, 128, 160, 320 | 128, 80, 64, 40, 32, 20, 16, 10, 8, 5, 4, 2 |
| 92.30% | 641 | 7692 | Null | Null |
| 92.45% | 642 | 7704 | 6, 107, 214, 321 | 107, 6, 3, 2 |
| 92.59% | 643 | 7716 | Null | Null |
| 92.74% | 644 | 7728 | 7, 14, 23, 28, 46, 92, 161, 322 | 92, 46, 28, 23, 14, 7, 4, 2 |
| 92.88% | 645 | 7740 | 5, 15, 43, 129, 215 | 129, 43, 15, 5, 3 |
| 93.02% | 646 | 7752 | 17, 19, 34, 38, 323 | 38, 34, 19, 17, 2 |
| 93.17% | 647 | 7764 | Null | Null |
| 93.31% | 648 | 7776 | 4, 6, 8, 9, 12, 18, 24, 27, 36, 54, 72, 81, 108, 162, 216, 324 | 162, 108, 81, 72, 54, 36, 27, 24, 18, 12, 9, 8, 6, 4, 3, 2 |
| 93.46% | 649 | 7788 | 11, 59 | 59, 11 |
| 93.60% | 650 | 7800 | 5, 10, 13, 25, 26, 50, 65, 130, 325 | 130, 65, 50, 26, 25, 13, 10, 5, 2 |
| 93.74% | 651 | 7812 | 7, 21, 31, 93, 217 | 93, 31, 21, 7, 3 |
| 93.89% | 652 | 7824 | 4, 163, 326 | 163, 4, 2 |
| 94.03% | 653 | 7836 | Null | Null |
| 94.18% | 654 | 7848 | 6, 109, 218, 327 | 109, 6, 3, 2 |
| 94.32% | 655 | 7860 | 5, 131 | 131, 5 |
| 94.46% | 656 | 7872 | 4, 8, 16, 41, 82, 164, 328 | 164, 82, 41, 16, 8, 4, 2 |
| 94.61% | 657 | 7884 | 9, 73, 219 | 73, 9, 3 |
| 94.75% | 658 | 7896 | 7, 14, 47, 94, 329 | 94, 47, 14, 7, 2 |
| 94.90% | 659 | 7908 | Null | Null |
| 95.04% | 660 | 7920 | 4, 5, 6, 10, 11, 12, 15, 20, 22, 30, 33, 44, 55, 60, 66, 110, 132, 165, 220, 330 | 165, 132, 110, 66, 60, 55, 44, 33, 30, 22, 20, 15, 12, 11, 10, 6, 5, 4, 3, 2 |
| 95.18% | 661 | 7932 | Null | Null |
| 95.33% | 662 | 7944 | 331 | 2 |
| 95.47% | 663 | 7956 | 13, 17, 39, 51, 221 | 51, 39, 17, 13, 3 |
| 95.62% | 664 | 7968 | 4, 8, 83, 166, 332 | 166, 83, 8, 4, 2 |
| 95.76% | 665 | 7980 | 5, 7, 19, 35, 95, 133 | 133, 95, 35, 19, 7, 5 |
| 95.90% | 666 | 7992 | 6, 9, 18, 37, 74, 111, 222, 333 | 111, 74, 37, 18, 9, 6, 3, 2 |
| 96.05% | 667 | 8004 | 23, 29 | 29, 23 |
| 96.19% | 668 | 8016 | 4, 167, 334 | 167, 4, 2 |
| 96.34% | 669 | 8028 | 223 | 3 |
| 96.48% | 670 | 8040 | 5, 10, 67, 134, 335 | 134, 67, 10, 5, 2 |
| 96.62% | 671 | 8052 | 11, 61 | 61, 11 |
| 96.77% | 672 | 8064 | 4, 6, 7, 8, 12, 14, 16, 21, 24, 28, 32, 42, 48, 56, 84, 96, 112, 168, 224, 336 | 168, 112, 96, 84, 56, 48, 42, 32, 28, 24, 21, 16, 14, 12, 8, 7, 6, 4, 3, 2 |
| 96.91% | 673 | 8076 | Null | Null |
| 97.06% | 674 | 8088 | 337 | 2 |
| 97.20% | 675 | 8100 | 5, 9, 15, 25, 27, 45, 75, 135, 225 | 135, 75, 45, 27, 25, 15, 9, 5, 3 |
| 97.34% | 676 | 8112 | 4, 13, 26, 52, 169, 338 | 169, 52, 26, 13, 4, 2 |
| 97.49% | 677 | 8124 | Null | Null |
| 97.63% | 678 | 8136 | 6, 113, 226, 339 | 113, 6, 3, 2 |
| 97.78% | 679 | 8148 | 7, 97 | 97, 7 |

TABLE 17-continued

Resource interlace design (BW = 1 GHz, SCS = 120 KHz)

| Bandwidth percent | RB number | Sub-carrier number | Interlace structure (RB/interlace) | RB spacing |
|---|---|---|---|---|
| 97.92% | 680 | 8160 | 4, 5, 8, 10, 17, 20, 34, 40, 68, 85, 136, 170, 340 | 170, 136, 85, 68, 40, 34, 20, 17, 10, 8, 5, 4, 2 |
| 98.06% | 681 | 8172 | 227 | 3 |
| 98.21% | 682 | 8184 | 11, 22, 31, 62, 341 | 62, 31, 22, 11, 2 |
| 98.35% | 683 | 8196 | Null | Null |
| 98.50% | 684 | 8208 | 4, 6, 9, 12, 18, 19, 36, 38, 57, 76, 114, 171, 228, 342 | 171, 114, 76, 57, 38, 36, 19, 18, 12, 9, 6, 4, 3, 2 |
| 98.64% | 685 | 8220 | 5, 137 | 137, 5 |
| 98.78% | 686 | 8232 | 7, 14, 49, 98, 343 | 98, 49, 14, 7, 2 |
| 98.93% | 687 | 8244 | 229 | 3 |
| 99.07% | 688 | 8256 | 4, 8, 16, 43, 86, 172, 344 | 172, 86, 43, 16, 8, 4, 2 |

TABLE 18

Resource interlace design (BW = 0.5 GHz, SCS = 240 KHz)

| Bandwidth percent | RB number | Sub-carrier number | Interlace structure (RB/interlace) | RB spacing |
|---|---|---|---|---|
| 90.00% | 156 | 1872 | 6, 12, 13, 26, 39, 52, 78 | 26, 13, 12, 6, 4, 3, 2 |
| 90.43% | 157 | 1884 | Null | Null |
| 91.01% | 158 | 1896 | 79 | 2 |
| 91.58% | 159 | 1908 | 53 | 3 |
| 92.16% | 160 | 1920 | 5, 8, 10, 16, 20, 32, 40, 80 | 32, 20, 16, 10, 8, 5, 4, 2 |
| 92.74% | 161 | 1932 | 7, 23 | 23, 7 |
| 93.31% | 162 | 1944 | 6, 9, 18, 27, 54, 81 | 27, 18, 9, 6, 3, 2 |
| 93.89% | 163 | 1956 | Null | Null |
| 94.46% | 164 | 1968 | 4, 41, 82 | 41, 4, 2 |
| 95.04% | 165 | 1980 | 5, 11, 15, 33, 55 | 33, 15, 11, 5, 3 |
| 95.62% | 166 | 1992 | 83 | 2 |
| 96.19% | 167 | 2004 | Null | Null |
| 96.77% | 168 | 2016 | 4, 6, 7, 8, 12, 14, 21, 24, 28, 42, 56, 84 | 42, 28, 24, 21, 14, 12, 8, 7, 6, 4, 3, 2 |
| 97.34% | 169 | 2028 | 13 | 13 |
| 97.92% | 170 | 2040 | 5, 10, 17, 34, 85 | 34, 17, 10, 5, 2 |
| 98.50% | 171 | 2052 | 9, 19, 57 | 19, 9, 3 |
| 99.07% | 172 | 2064 | 4, 43, 86 | 43, 4, 2 |

TABLE 19

Resource interlace design (BW = 1 GHz, SCS = 240 KHz)

| Bandwidth percent | RB number | Sub-carrier number | Interlace structure (RB/interlace) | RB spacing |
|---|---|---|---|---|
| 90.00% | 312 | 3744 | 6, 8, 12, 13, 24, 26, 39, 52, 78, 104, 156 | 52, 39, 26, 24, 13, 12, 8, 6, 4, 3, 2 |
| 90.14% | 313 | 3756 | Null | Null |
| 90.43% | 314 | 3768 | 157 | 2 |
| 90.72% | 315 | 3780 | 5, 7, 9, 15, 21, 35, 45, 63, 105 | 63, 45, 35, 21, 15, 9, 7, 5, 3 |
| 91.01% | 316 | 3792 | 79, 158 | 4, 2 |
| 91.30% | 317 | 3804 | Null | Null |
| 91.58% | 318 | 3816 | 6, 53, 106, 159 | 53, 6, 3, 2 |
| 91.87% | 319 | 3828 | 11, 29 | 29, 11 |
| 92.16% | 320 | 3840 | 5, 8, 10, 16, 20, 32, 40, 64, 80, 160 | 64, 40, 32, 20, 16, 10, 8, 5, 4, 2 |
| 92.45% | 321 | 3852 | 107 | 3 |
| 92.74% | 322 | 3864 | 7, 14, 23, 46, 161 | 46, 23, 14, 7, 2 |
| 93.02% | 323 | 3876 | 17, 19 | 19, 17 |
| 93.31% | 324 | 3888 | 4, 6, 9, 12, 18, 27, 36, 54, 81, 108, 162 | 81, 54, 36, 27, 18, 12, 9, 6, 4, 3, 2 |

TABLE 19-continued

Resource interlace design (BW = 1 GHz, SCS = 240 KHz)

| Bandwidth percent | RB number | Sub-carrier number | Interlace structure (RB/interlace) | RB spacing |
|---|---|---|---|---|
| 93.60% | 325 | 3900 | 5, 13, 25, 65 | 65, 25, 13, 5 |
| 93.89% | 326 | 3912 | 163 | 2 |
| 94.18% | 327 | 3924 | 109 | 3 |
| 94.46% | 328 | 3936 | 4, 8, 41, 82, 164 | 82, 41, 8, 4, 2 |
| 94.75% | 329 | 3948 | 7, 47 | 47, 7 |
| 95.04% | 330 | 3960 | 5, 6, 10, 11, 15, 22, 30, 33, 55, 66, 110, 165 | 66, 55, 33, 30, 22, 15, 11, 10, 6, 5, 3, 2 |
| 95.33% | 331 | 3972 | Null | Null |
| 95.62% | 332 | 3984 | 4, 83, 166 | 83, 4, 2 |
| 95.90% | 333 | 3996 | 9, 37, 111 | 37, 9, 3 |
| 96.19% | 334 | 4008 | 167 | 2 |
| 96.48% | 335 | 4020 | 5, 67 | 67, 5 |
| 96.77% | 336 | 4032 | 4, 6, 7, 8, 12, 14, 16, 21, 24, 28, 42, 48, 56, 84, 112, 168 | 84, 56, 48, 42, 28, 24, 21, 16, 14, 12, 8, 7, 6, 4, 3, 2 |
| 97.06% | 337 | 4044 | Null | Null |
| 97.34% | 338 | 4056 | 13, 26, 169 | 26, 13, 2 |
| 97.63% | 339 | 4068 | 113 | 3 |
| 97.92% | 340 | 4080 | 4, 5, 10, 17, 20, 34, 68, 85, 170 | 85, 68, 34, 20, 17, 10, 5, 4, 2 |
| 98.21% | 341 | 4092 | 11, 31 | 31, 11 |
| 98.50% | 342 | 4104 | 6, 9, 18, 19, 38, 57, 114, 171 | 57, 38, 19, 18, 9, 6, 3, 2 |
| 98.78% | 343 | 4116 | 7, 49 | 49, 7 |
| 99.07% | 344 | 4128 | 4, 8, 43, 86, 172 | 86, 43, 8, 4, 2 |

TABLE 20

Resource interlace design (BW = 2 GHz, SCS = 240 KHz)

| Bandwidth percent | RB number | Sub-carrier number | Interlace structure (RB/interlace) | RB spacing |
|---|---|---|---|---|
| 90.00% | 625 | 7500 | 5, 25, 125 | 125, 25, 5 |
| 90.14% | 626 | 7512 | 313 | 2 |
| 90.29% | 627 | 7524 | 11, 19, 33, 57, 209 | 57, 33, 19, 11, 3 |
| 90.43% | 628 | 7536 | 157, 314 | 4, 2 |
| 90.58% | 629 | 7548 | 17, 37 | 37, 17 |
| 90.72% | 630 | 7560 | 5, 6, 7, 9, 10, 14, 15, 18, 21, 30, 35, 42, 45, 63, 70, 90, 105, 126, 210, 315 | 126, 105, 90, 70, 63, 45, 42, 35, 30, 21, 18, 15, 14, 10, 9, 7, 6, 5, 3, 2 |
| 90.86% | 631 | 7572 | Null | Null |
| 91.01% | 632 | 7584 | 8, 79, 158, 316 | 79, 8, 4, 2 |
| 91.15% | 633 | 7596 | 211 | 3 |
| 91.30% | 634 | 7608 | 317 | 2 |
| 91.44% | 635 | 7620 | 5, 127 | 127, 5 |
| 91.58% | 636 | 7632 | 6, 12, 53, 106, 159, 212, 318 | 106, 53, 12, 6, 4, 3, 2 |
| 91.73% | 637 | 7644 | 7, 13, 49, 91 | 91, 49, 13, 7 |
| 91.87% | 638 | 7656 | 11, 22, 29, 58, 319 | 58, 29, 22, 11, 2 |
| 92.02% | 639 | 7668 | 9, 71, 213 | 71, 9, 3 |
| 92.16% | 640 | 7680 | 5, 8, 10, 16, 20, 32, 40, 64, 80, 128, 160, 320 | 128, 80, 64, 40, 32, 20, 16, 10, 8, 5, 4, 2 |
| 92.30% | 641 | 7692 | Null | Null |
| 92.45% | 642 | 7704 | 6, 107, 214, 321 | 107, 6, 3, 2 |
| 92.59% | 643 | 7716 | Null | Null |
| 92.74% | 644 | 7728 | 7, 14, 23, 28, 46, 92, 161, 322 | 92, 46, 28, 23, 14, 7, 4, 2 |
| 92.88% | 645 | 7740 | 5, 15, 43, 129, 215 | 129, 43, 15, 5, 3 |
| 93.02% | 646 | 7752 | 17, 19, 34, 38, 323 | 38, 34, 19, 17, 2 |
| 93.17% | 647 | 7764 | Null | Null |
| 93.31% | 648 | 7776 | 4, 6, 8, 9, 12, 18, 24, 27, 36, 54, 72, 81, 108, 162, 216, 324 | 162, 108, 81, 72, 54, 36, 27, 24, 18, 12, 9, 8, 6, 4, 3, 2 |
| 93.46% | 649 | 7788 | 11, 59 | 59, 11 |
| 93.60% | 650 | 7800 | 5, 10, 13, 25, 26, 50, 65, 130, 325 | 130, 65, 50, 26, 25, 13, 10, 5, 2 |
| 93.74% | 651 | 7812 | 7, 21, 31, 93, 217 | 93, 31, 21, 7, 3 |

TABLE 20-continued

Resource interlace design (BW = 2 GHz, SCS = 240 KHz)

| Bandwidth percent | RB number | Subcarrier number | Interlace structure (RB/interlace) | RB spacing |
|---|---|---|---|---|
| 93.89% | 652 | 7824 | 4, 163, 326 | 163, 4, 2 |
| 94.03% | 653 | 7836 | Null | Null |
| 94.18% | 654 | 7848 | 6, 109, 218, 327 | 109, 6, 3, 2 |
| 94.32% | 655 | 7860 | 5, 131 | 131, 5 |
| 94.46% | 656 | 7872 | 4, 8, 16, 41, 82, 164, 328 | 164, 82, 41, 16, 8, 4, 2 |
| 94.61% | 657 | 7884 | 9, 73, 219 | 73, 9, 3 |
| 94.75% | 658 | 7896 | 7, 14, 47, 94, 329 | 94, 47, 14, 7, 2 |
| 94.90% | 659 | 7908 | Null | Null |
| 95.04% | 660 | 7920 | 4, 5, 6, 10, 11, 12, 15, 20, 22, 30, 33, 44, 55, 60, 66, 110, 132, 165, 220, 330 | 165, 132, 110, 66, 60, 55, 44, 33, 30, 22, 20, 15, 12, 11, 10, 6, 5, 4, 3, 2 |
| 95.18% | 661 | 7932 | Null | Null |
| 95.33% | 662 | 7944 | 331 | 2 |
| 95.47% | 663 | 7956 | 13, 17, 39, 51, 221 | 51, 39, 17, 13, 3 |
| 95.62% | 664 | 7968 | 4, 8, 83, 166, 332 | 166, 83, 8, 4, 2 |
| 95.76% | 665 | 7980 | 5, 7, 19, 35, 95, 133 | 133, 95, 35, 19, 7, 5 |
| 95.90% | 666 | 7992 | 6, 9, 18, 37, 74, 111, 222, 333 | 111, 74, 37, 18, 9, 6, 3, 2 |
| 96.05% | 667 | 8004 | 23, 29 | 29, 23 |
| 96.19% | 668 | 8016 | 4, 167, 334 | 167, 4, 2 |
| 96.34% | 669 | 8028 | 223 | 3 |
| 96.48% | 670 | 8040 | 5, 10, 67, 134, 335 | 134, 67, 10, 5, 2 |
| 96.62% | 671 | 8052 | 11, 61 | 61, 11 |
| 96.77% | 672 | 8064 | 4, 6, 7, 8, 12, 14, 16, 21, 24, 28, 32, 42, 48, 56, 84, 96, 112, 168, 224, 336 | 168, 112, 96, 84, 56, 48, 42, 32, 28, 24, 21, 16, 14, 12, 8, 7, 6, 4, 3, 2 |
| 96.91% | 673 | 8076 | Null | Null |
| 97.06% | 674 | 8088 | 337 | 2 |
| 97.20% | 675 | 8100 | 5, 9, 15, 25, 27, 45, 75, 135, 225 | 135, 75, 45, 27, 25, 15, 9, 5, 3 |
| 97.34% | 676 | 8112 | 4, 13, 26, 52, 169, 338 | 169, 52, 26, 13, 4, 2 |
| 97.49% | 677 | 8124 | Null | Null |
| 97.63% | 678 | 8136 | 6, 113, 226, 339 | 113, 6, 3, 2 |
| 97.78% | 679 | 8148 | 7, 97 | 97, 7 |
| 97.92% | 680 | 8160 | 4, 5, 8, 10, 17, 20, 34, 40, 68, 85, 136, 170, 340 | 170, 136, 85, 68, 40, 34, 20, 17, 10, 8, 5, 4, 2 |
| 98.06% | 681 | 8172 | 227 | 3 |
| 98.21% | 682 | 8184 | 11, 22, 31, 62, 341 | 62, 31, 22, 11, 2 |
| 98.35% | 683 | 8196 | Null | Null |
| 98.50% | 684 | 8208 | 4, 6, 9, 12, 18, 19, 36, 38, 57, 76, 114, 171, 228, 342 | 171, 114, 76, 57, 38, 36, 19, 18, 12, 9, 6, 4, 3, 2 |
| 98.64% | 685 | 8220 | 5, 137 | 137, 5 |
| 98.78% | 686 | 8232 | 7, 14, 49, 98, 343 | 98, 49, 14, 7, 2 |
| 98.93% | 687 | 8244 | 229 | 3 |
| 99.07% | 688 | 8256 | 4, 8, 16, 43, 86, 172, 344 | 172, 86, 43, 16, 8, 4, 2 |

TABLE 21

Resource interlace design (BW = 0.5 GHz, SCS = 480 KHz)

| Bandwidth percent | RB number | Subcarrier number | Interlace structure (RB/interlace) | RB spacing |
|---|---|---|---|---|
| 90.00% | 78 | 936 | 6, 13, 26, 39 | 13, 6, 3, 2 |
| 91.01% | 79 | 948 | Null | Null |
| 92.16% | 80 | 960 | 4, 5, 8, 10, 16, 20, 40 | 20, 16, 10, 8, 5, 4, 2 |
| 93.31% | 81 | 972 | 9, 27 | 9, 3 |
| 94.46% | 82 | 984 | 41 | 2 |
| 95.62% | 83 | 996 | Null | Null |
| 96.77% | 84 | 1008 | 4, 6, 7, 12, 14, 21, 28, 42 | 21, 14, 12, 7, 6, 4, 3, 2 |
| 97.92% | 85 | 1020 | 5, 17 | 17, 5 |
| 99.07% | 86 | 1032 | 43 | 2 |

TABLE 22

Resource interlace design (BW = 1 GHz, SCS = 480 KHz)

| Bandwidth percent | RB number | Subcarrier number | Interlace structure (RB/interlace) | RB spacing |
|---|---|---|---|---|
| 90.00% | 156 | 1872 | 6, 12, 13, 26, 39, 52, 78 | 26, 13, 12, 6, 4, 3, 2 |
| 90.43% | 157 | 1884 | Null | Null |
| 91.01% | 158 | 1896 | 79 | 2 |
| 91.58% | 159 | 1908 | 53 | 3 |
| 92.16% | 160 | 1920 | 5, 8, 10, 16, 20, 32, 40, 80 | 32, 20, 16, 10, 8, 5, 4, 2 |
| 92.74% | 161 | 1932 | 7, 23 | 23, 7 |
| 93.31% | 162 | 1944 | 6, 9, 18, 27, 54, 81 | 27, 18, 9, 6, 3, 2 |
| 93.89% | 163 | 1956 | Null | Null |
| 94.46% | 164 | 1968 | 4, 41, 82 | 41, 4, 2 |
| 95.04% | 165 | 1980 | 5, 11, 15, 33, 55 | 33, 15, 11, 5, 3 |
| 95.62% | 166 | 1992 | 83 | 2 |
| 96.19% | 167 | 2004 | Null | Null |
| 96.77% | 168 | 2016 | 4, 6, 7, 8, 12, 14, 21, 24, 28, 42, 56, 84 | 42, 28, 24, 21, 14, 12, 8, 7, 6, 4, 3, 2 |
| 97.34% | 169 | 2028 | 13 | 13 |
| 97.92% | 170 | 2040 | 5, 10, 17, 34, 85 | 34, 17, 10, 5, 2 |
| 98.50% | 171 | 2052 | 9, 19, 57 | 19, 9, 3 |
| 99.07% | 172 | 2064 | 4, 43, 86 | 43, 4, 2 |

TABLE 23

Resource interlace design (BW = 2 GHz, SCS = 480 KHz)

| Bandwidth percent | RB number | Subcarrier number | Interlace structure (RB/interlace) | RB spacing |
|---|---|---|---|---|
| 90.00% | 312 | 3744 | 6, 8, 12, 13, 24, 26, 39, 52, 78, 104, 156 | 52, 39, 26, 24, 13, 12, 8, 6, 4, 3, 2 |
| 90.14% | 313 | 3756 | Null | Null |
| 90.43% | 314 | 3768 | 157 | 2 |
| 90.72% | 315 | 3780 | 5, 7, 9, 15, 21, 35, 45, 63, 105 | 63, 45, 35, 21, 15, 9, 7, 5, 3 |
| 91.01% | 316 | 3792 | 79, 158 | 4, 2 |
| 91.30% | 317 | 3804 | Null | Null |
| 91.58% | 318 | 3816 | 6, 53, 106, 159 | 53, 6, 3, 2 |
| 91.87% | 319 | 3828 | 11, 29 | 29, 11 |
| 92.16% | 320 | 3840 | 5, 8, 10, 16, 20, 32, 40, 64, 80, 160 | 64, 40, 32, 20, 16, 10, 8, 5, 4, 2 |
| 92.45% | 321 | 3852 | 107 | 3 |
| 92.74% | 322 | 3864 | 7, 14, 23, 46, 161 | 46, 23, 14, 7, 2 |
| 93.02% | 323 | 3876 | 17, 19 | 19, 17 |
| 93.31% | 324 | 3888 | 4, 6, 9, 12, 18, 27, 36, 54, 81, 108, 162 | 81, 54, 36, 27, 18, 12, 9, 6, 4, 3, 2 |
| 93.60% | 325 | 3900 | 5, 13, 25, 65 | 65, 25, 13, 5 |
| 93.89% | 326 | 3912 | 163 | 2 |
| 94.18% | 327 | 3924 | 109 | 3 |
| 94.46% | 328 | 3936 | 4, 8, 41, 82, 164 | 82, 41, 8, 4, 2 |
| 94.75% | 329 | 3948 | 7, 47 | 47, 7 |
| 95.04% | 330 | 3960 | 5, 6, 10, 11, 15, 22, 30, 33, 55, 66, 110, 165 | 66, 55, 33, 30, 22, 15, 11, 10, 6, 5, 3, 2 |
| 95.33% | 331 | 3972 | Null | Null |
| 95.62% | 332 | 3984 | 4, 83, 166 | 83, 4, 2 |
| 95.90% | 333 | 3996 | 9, 37, 111 | 37, 9, 3 |
| 96.19% | 334 | 4008 | 167 | 2 |

TABLE 23-continued

Resource interlace design (BW = 2 GHz, SCS = 480 KHz)

| Bandwidth percent | RB number | Subcarrier number | Interlace structure (RB/interlace) | RB spacing |
|---|---|---|---|---|
| 96.48% | 335 | 4020 | 5, 67 | 67, 5 |
| 96.77% | 336 | 4032 | 4, 6, 7, 8, 12, 14, 16, 21, 24, 28, 42, 48, 56, 84, 112, 168 | 84, 56, 48, 42, 28, 24, 21, 16, 14, 12, 8, 7, 6, 4, 3, 2 |
| 97.06% | 337 | 4044 | Null | Null |
| 97.34% | 338 | 4056 | 13, 26, 169 | 26, 13, 2 |
| 97.63% | 339 | 4068 | 113 | 3 |
| 97.92% | 340 | 4080 | 4, 5, 10, 17, 20, 34, 68, 85, 170 | 85, 68, 34, 20, 17, 10, 5, 4, 2 |
| 98.21% | 341 | 4092 | 11, 31 | 31, 11 |
| 98.50% | 342 | 4104 | 6, 9, 18, 19, 38, 57, 114, 171 | 57, 38, 19, 18, 9, 6, 3, 2 |
| 98.78% | 343 | 4116 | 7, 49 | 49, 7 |
| 99.07% | 344 | 4128 | 4, 8, 43, 86, 172 | 86, 43, 8, 4, 2 |

TABLE 24

Resource interlace design (BW = 0.5 GHz, SCS = 960 KHz)

| Bandwidth percent | RB number | Subcarrier number | Interlace structure (RB/interlace) | RB spacing |
|---|---|---|---|---|
| 90.00% | 39 | 468 | 13 | 3 |
| 92.16% | 40 | 480 | 4, 5, 8, 10, 20 | 10, 8, 5, 4, 2 |
| 94.46% | 41 | 492 | Null | Null |
| 96.77% | 42 | 504 | 6, 7, 14, 21 | 7, 6, 3, 2 |
| 99.07% | 43 | 516 | Null | Null |

TABLE 25

Resource interlace design (BW = 1 GHz, SCS = 960 KHz)

| Bandwidth percent | RB number | Subcarrier number | Interlace structure (RB/interlace) | RB spacing |
|---|---|---|---|---|
| 90.00% | 78 | 936 | 6, 13, 26, 39 | 13, 6, 3, 2 |
| 91.01% | 79 | 948 | Null | Null |
| 92.16% | 80 | 960 | 4, 5, 8, 10, 16, 20, 40 | 20, 16, 10, 8, 5, 4, 2 |
| 93.31% | 81 | 972 | 9, 27 | 9, 3 |
| 94.46% | 82 | 984 | 41 | 2 |
| 95.62% | 83 | 996 | Null | Null |
| 96.77% | 84 | 1008 | 4, 6, 7, 12, 14, 21, 28, 42 | 21, 14, 12, 7, 6, 4, 3, 2 |
| 97.92% | 85 | 1020 | 5, 17 | 17, 5 |
| 99.07% | 86 | 1032 | 43 | 2 |

TABLE 26

Resource interlace design (BW = 2 GHz, SCS = 960 KHz)

| Bandwidth percent | RB number | Subcarrier number | Interlace structure (RB/interlace) | RB spacing |
|---|---|---|---|---|
| 90.00% | 156 | 1872 | 6, 12, 13, 26, 39, 52, 78 | 26, 13, 12, 6, 4, 3, 2 |
| 90.43% | 157 | 1884 | Null | Null |
| 91.01% | 158 | 1896 | 79 | 2 |
| 91.58% | 159 | 1908 | 53 | 3 |
| 92.16% | 160 | 1920 | 5, 8, 10, 16, 20, 32, 40, 80 | 32, 20, 16, 10, 8, 5, 4, 2 |
| 92.74% | 161 | 1932 | 7, 23 | 23, 7 |
| 93.31% | 162 | 1944 | 6, 9, 18, 27, 54, 81 | 27, 18, 9, 6, 3, 2 |
| 93.89% | 163 | 1956 | Null | Null |
| 94.46% | 164 | 1968 | 4, 41, 82 | 41, 4, 2 |
| 95.04% | 165 | 1980 | 5, 11, 15, 33, 55 | 33, 15, 11, 5, 3 |

TABLE 26-continued

Resource interlace design (BW = 2 GHz, SCS = 960 KHz)

| Bandwidth percent | RB number | Subcarrier number | Interlace structure (RB/interlace) | RB spacing |
|---|---|---|---|---|
| 95.62% | 166 | 1992 | 83 | 2 |
| 96.19% | 167 | 2004 | Null | Null |
| 96.77% | 168 | 2016 | 4, 6, 7, 8, 12, 14, 21, 24, 28, 42, 56, 84 | 42, 28, 24, 21, 14, 12, 8, 7, 6, 4, 3, 2 |
| 97.34% | 169 | 2028 | 13 | 13 |
| 97.92% | 170 | 2040 | 5, 10, 17, 34, 85 | 34, 17, 10, 5, 2 |
| 98.50% | 171 | 2052 | 9, 19, 57 | 19, 9, 3 |
| 99.07% | 172 | 2064 | 4, 43, 86 | 43, 4, 2 |

Figure 14:
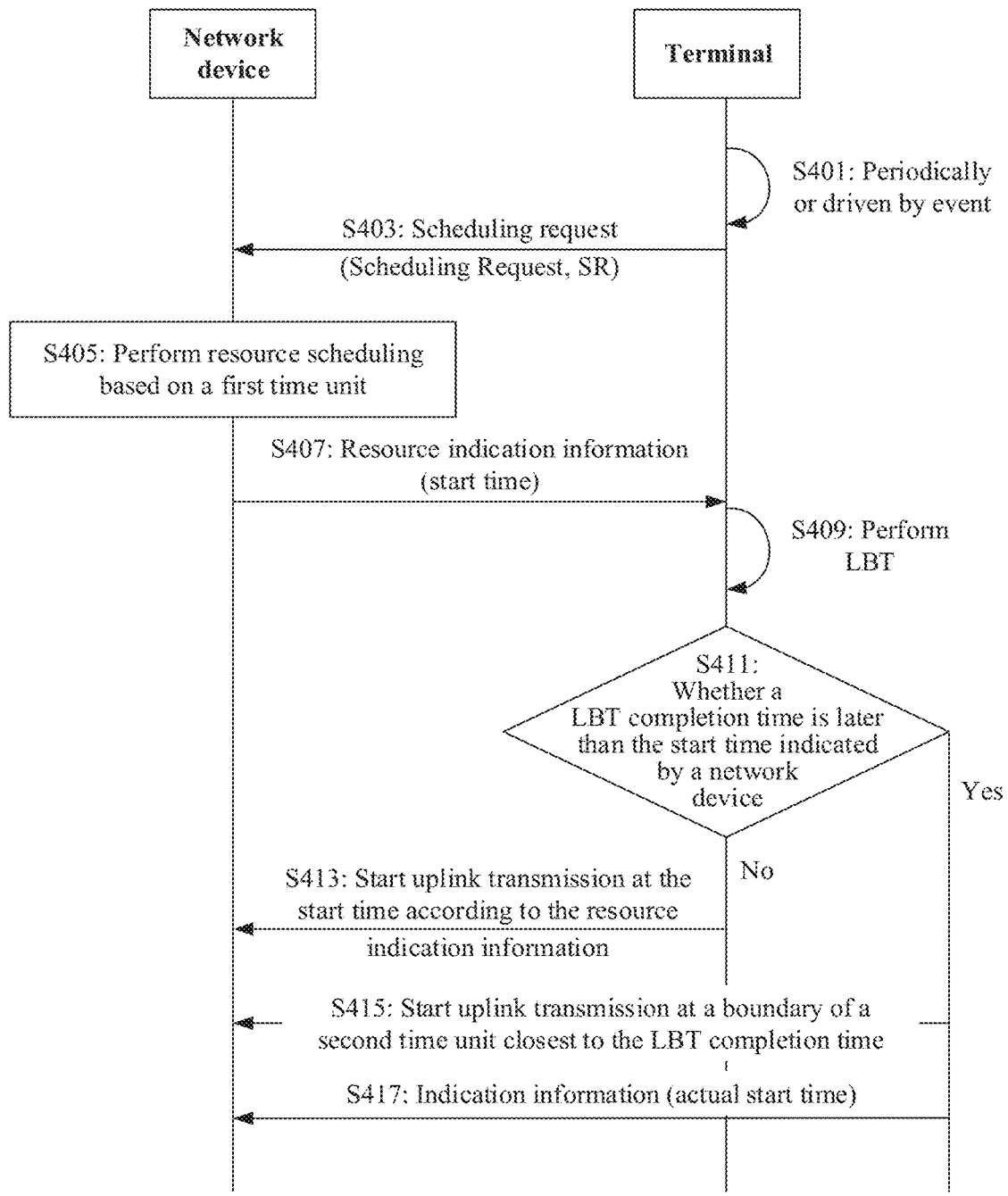
FIG. 14 is a schematic flowchart of another signal transmission method according to this application.

In addition, FIG. 14 shows another signal transmission method according to this application, to improve transmission efficiency. As shown in FIG. 14, the method may include the following operations.

S403: A network device receives a scheduling request (SR) sent by a terminal. The scheduling request is used to request the network device to allocate an uplink transmission resource.

Referring to operation S101 in FIG. 7, the terminal may periodically send the scheduling request to the network device. For example, the terminal sends the scheduling request to the network device once every transmission time interval (TTI). Alternatively, the terminal may send the scheduling request to the network device when driven by an event. For example, when there is uplink data to be transmitted, the terminal sends the scheduling request to the network device. Arrival of the uplink data herein is an event driving the terminal to send the scheduling request. This embodiment of this application imposes no limitation on a mechanism for triggering the terminal to send the scheduling request.

S405: The network device may allocate the uplink transmission resource to the terminal based on a first time unit. Herein, the first time unit may be a subframe, a timeslot (slot), a transmission spacing (TTI), a short transmission spacing (short TTI), a micro timeslot (mini-slot), or the like.

S407: The network device may return resource indication information to the terminal, where the resource indication information may include a start time at which the terminal performs uplink transmission and that is indicated by the network device. In one embodiment, the resource indication information may further include a transmission length scheduled by the network device to the terminal. The transmission length may include one or more first time units. In one embodiment, the transmission length may be indicated by a quantity of first time units. For an implementation of the resource indication information by using signaling, refer to the implementation of the resource indication information by using signaling described in the embodiment in FIG. 7. Details are not described herein again.

S409: Correspondingly, after receiving the resource indication information, the terminal needs to perform LBT before uplink transmission.

S411-S415: After completing LBT and detecting an idle spectrum, the terminal may determine whether an LBT completion time is later than the start time indicated by the network device. If the LBT completion time is not later than the start time, the terminal may start, according to an indication of the network device, uplink transmission at the start time. Refer to S413. If the LBT completion time is later than the start time, the terminal may start uplink transmission at a boundary of a second time unit closest to the LBT completion time. For details, refer to S415.

Herein, the boundary refers to a start moment or an end moment of the second time unit. One time unit (for example, a mini-slot or a short TTI) may usually correspond to two boundaries: a start boundary and an end boundary. The start boundary refers to a start moment of the second time unit, and the end boundary refers to an end moment of the second time unit. It may be understood that a start boundary of one second time unit is an end boundary of another second time unit, and the two second time units are adjacent in time domain.

In one embodiment, the second time unit may be a smaller time unit such as a mini-slot or a short TTI, and is less than the first time unit. In this way, when the LBT completion time is later than the start time scheduled by the network device, the terminal starts uplink transmission at the boundary of the second time unit closest to the LBT completion time, so that the terminal does not need to wait for re-scheduling by the network device. This improves uplink transmission efficiency.

S417: During uplink transmission, the terminal may further send indication information to the network device, where the indication information is used to indicate an actual start time of uplink transmission. In one embodiment, the indication information may be an index of the closest second time unit, for example, an index of the mini-slot or the short TTI, or may be a time offset between an actual transmission time and the start time indicated by the network device. In one embodiment, the indication information may further include indication information of the second time unit, namely, a time unit that indicates a structure actually used for uplink transmission.

Figure 15:
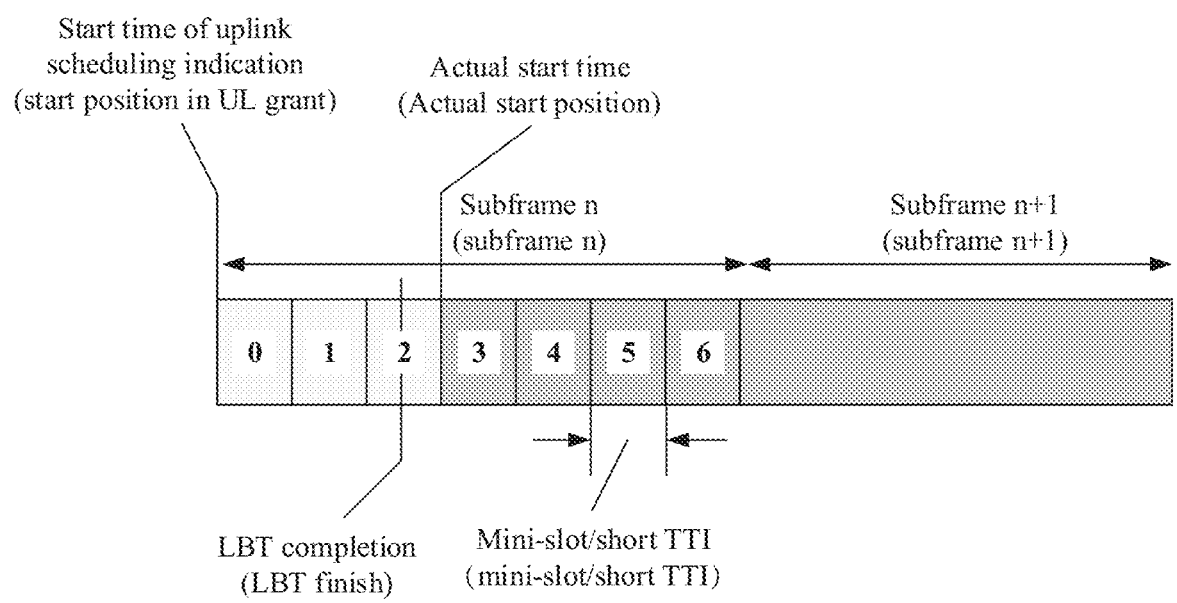
FIG. 15 is a schematic diagram of an uplink transmission time sequence according to an embodiment in FIG. 14 of this application.

For example, as shown in FIG. 15, it is assumed that the network device schedules the terminal to perform uplink transmission in a subframe n, namely, a start time indicated by the network device is a start boundary of the subframe n. After receiving the scheduling information, the terminal needs to perform LBT first. As shown in FIG. 15, it is assumed that the LBT completion time is a third mini-slot (a mini-slot 2) in the subframe n. In other words, the LBT completion time is later than the start time indicated by the network device. The terminal may perform uplink transmission at the boundary of the second time unit closest to the LBT completion time. In one embodiment, the terminal may perform uplink transmission at a start boundary of a fourth mini-slot (a mini-slot 3) in the subframe n. Herein, the start boundary of the mini-slot 3 is an end boundary of the mini-slot 2. In this way, even if the LBT completion time is later than the start time scheduled by the network device, the terminal does not need to wait for re-scheduling by the network device and can start uplink transmission in time at the boundary of the second time unit closest to the LBT completion time. Therefore, this improves uplink transmission efficiency.

According to the embodiment in FIG. 14, when the LBT completion time is later than the start time scheduled by the network device, the terminal starts uplink transmission at the boundary of the second time unit closest to the LBT completion time and does not need to wait for re-scheduling by the network device. This improves uplink transmission efficiency.

Figure 16:
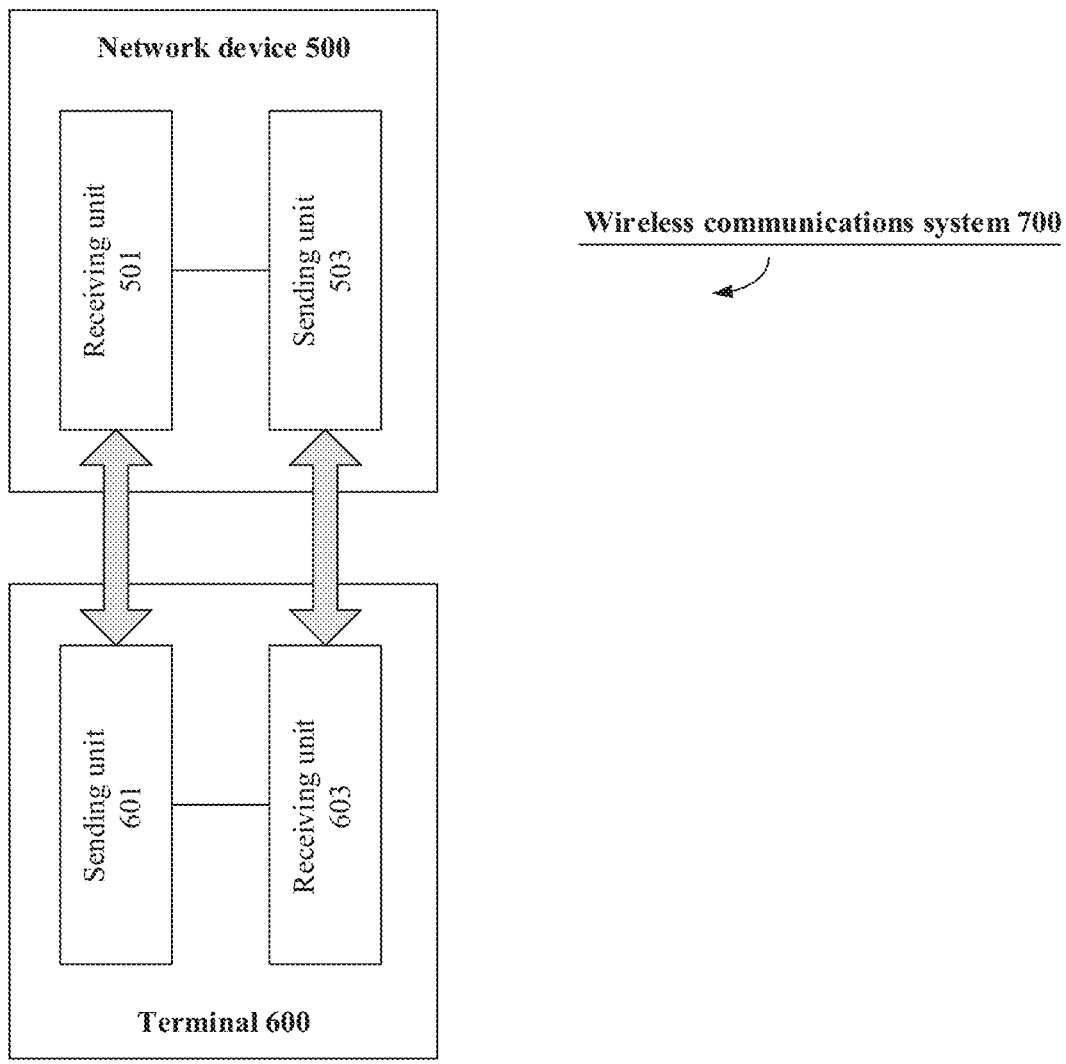
FIG. 16 is a schematic diagram of a structure of a wireless communications system, a network device, and a terminal according to an embodiment of this application.

FIG. 16 shows a wireless communications system 700 and a network device in the wireless communications system 700 according to an embodiment of this application. The network device 500 may be the network device in the foregoing method embodiment, and may be configured to receive a scheduling request of a terminal, and allocate an uplink signal transmission resource to the terminal on an unlicensed frequency band. The terminal 600 may be the terminal in the foregoing method embodiment, and may perform uplink transmission on an idle bandwidth detected by using LBT according to a scheduling indication of the network device 500.

As shown in FIG. 16, the network device 500 may include a receiving unit 501 and a sending unit 503.

The sending unit 503 may be configured to send first indication information to a terminal 600, where the first indication information is used to indicate an uplink resource allocated by the network device to the terminal 600 in a first bandwidth, and the uplink resource is an integer quantity of resource blocks evenly distributed in a part or all of the first bandwidth.

The receiving unit 501 may be configured to receive second indication information sent by the terminal 600. The second indication information is used to indicate an idle second bandwidth that is detected by the terminal 600 and that is used for uplink transmission.

As shown in FIG. 16, the terminal 600 may include a sending unit 601 and a receiving unit 603.

The receiving unit 603 may be configured to receive first indication information sent by the network device 500, where the first indication information is used to indicate an uplink resource that is allocated by the network device to the terminal 600 in a first bandwidth. The resource indicated by the first indication information includes an integer quantity of resource blocks evenly distributed in a part or all of the first bandwidth.

The sending unit 601 may be configured to perform uplink transmission on a detected idle second bandwidth.

The sending unit 601 may further be configured to send second indication information to the network device 500. The second indication information is used to indicate the second bandwidth.

In this application, the network device 500 may provide three main resource scheduling manners.

In a first resource scheduling manner, the network device performs bandwidth resource scheduling in the first bandwidth at a full bandwidth level, and performs resource scheduling based on a fixed RB spacing of a resource interlace. In other words, the RB spacing does not change with the first bandwidth. Different from an existing resource interlace defined in the LTE, the RB spacing of the resource interlace defined in this application is fixed and does not change with a bandwidth.

For an implementation of the first resource scheduling manner, refer to the embodiment in FIG. 7. Details are not described herein again.

In a second resource scheduling manner, the network device performs subband resource scheduling in the first bandwidth at a subband level, and performs resource scheduling based on an interlace segment corresponding to a subband. Herein, an interlace is one that is evenly distributed on the full bandwidth of the first bandwidth and whose RB spacing is fixed at N, namely, an interlace corresponding to the first bandwidth. Different from the first resource scheduling manner, resource allocation is not performed based on the interlace corresponding to the first bandwidth. Instead, the interlace corresponding to the first bandwidth is divided into interlace segments corresponding to a plurality of subbands, and a resource is allocated based on an interlace segment corresponding to each subband.

For an implementation of the second resource scheduling manner, refer to the embodiment shown in FIG. 10, and details are not described herein again.

In a third resource scheduling manner, the network device performs subband resource scheduling in the first bandwidth at a subband level, selects an appropriate Interlace structure on a subband, and performs resource scheduling based on an interlace on the subband. The interlace may be one with a fixed quantity and evenly distributed on a subband, or may be one with a fixed RB spacing and evenly distributed on the subband.

For a an implementation of the third resource scheduling manner, refer to the embodiment shown in FIG. 12. Details are not described herein again.

It may be understood that for implementations of functional units included in the network device 500, refer to related functions of the network device in the method embodiments shown in FIG. 7, FIG. 10, or FIG. 11, and for implementations of functional units included in the terminal 500, refer to related functions of the terminal in the method embodiments shown in FIG. 7, FIG. 10, or FIG. 11. Details are not described herein again.

In addition, an embodiment of the present application further provides a wireless communications system. The wireless communications system may be the wireless communications system 200 shown in FIG. 2, or the wireless communications system 700 shown in FIG. 16, and may include a network device and s terminal. The terminal may be the terminal in the method embodiments respectively shown in FIG. 7, FIG. 10, and FIG. 12, and the network device may be the network device in the method embodiments respectively show in FIG. 7, FIG. 10, and FIG. 12.

Using the terminal shown in FIG. 3 as an example, the terminal processor 304 is configured to invoke an instruction stored in the memory 312 to control the transmitter 306 to send in unlicensed and/or licensed frequency bands and control the receiver 308 to receive in the unlicensed and/or licensed frequency bands. The transmitter 306 is configured to support the terminal to perform a data and/or signaling transmission process in FIG. 7, FIG. 10, or FIG. 12. The receiver 308 is configured to support the terminal to perform a data and/or signaling receiving process in FIG. 7, FIG. 10, or FIG. 12. The memory 312 is configured to store program code and data of the terminal.

In one embodiment, the terminal may be the terminal 300 shown in FIG. 4, and the network device may be the network device 400 shown in FIG. 5. The terminal may alternatively be the terminal 600 shown in FIG. 16, and the network device may alternatively be the network device 500 shown in FIG. 16. For implementations of the network device and the terminal, refer to the method embodiments corresponding to FIG. 7, FIG. 10, or FIG. 12. Details are not described herein again.

Using the network device shown in FIG. 4 as an example, the network device processor 405 is configured to control the transmitter 407 to send in unlicensed and/or licensed frequency bands, and control the receiver 409 to receive in the unlicensed and/or licensed frequency bands. The transmitter 407 is configured to support the network device to perform a data and/or signaling transmission process in FIG. 7, FIG. 10, or FIG. 12. The receiver 409 is configured to support the network device to perform a data and/or signaling receiving process in FIG. 7, FIG. 10, or FIG. 12. The memory 405 is configured to store program code and data of the network device.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

In conclusion, the embodiments of the present application can support flexible bandwidth transmission, and can better adapt to a multi-bandwidth scenario supported by a next-generation new radio technology.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium includes: any medium that can store program code, such as a ROM, a random access memory RAM, a magnetic disk, or an optical disc.

What is claimed is:

1. A terminal, comprising: a transmitter, a receiver, a memory, and a processor coupled to the memory, wherein the processor is configured to invoke an instruction stored in the memory to control the receiver to receive first indication information and wherein the processor is further configured to control the transmitter to perform uplink transmission; wherein the receiver is configured to receive first indication information from a network device, wherein the first indication information is used to indicate an uplink resource that is allocated by the network device to the terminal in a first bandwidth; the uplink resource comprises one or more interlace segments corresponding to one or more subbands in the first bandwidth, wherein each one of the one or more interlace segments is a segment of an interlace located in a subband;

the transmitter is configured to perform uplink transmission on the one or more interlace segments corresponding to the one or more subbands after sensing the one or more subbands to be idle.

2. The terminal according to claim 1, wherein a spacing between two adjacent resource blocks in the interlace is N, and N is a positive integer.

3. The terminal according to claim 2, wherein if a sub-carrier spacing of the first bandwidth is 15 kHz, N=10.

4. The method according to claim 2, wherein if a subcarrier spacing of the first bandwidth is 30 kHz, N=5.

5. The terminal according to claim 1, wherein resource blocks of the each one of the one or more interlace segments are a part of resource blocks of a corresponding interlace.

6. The terminal according to claim 1, wherein for different subbands, a spacing between any two adjacent resource blocks in the one or more interlace segments corresponding to the different subbands is the same.

7. The terminal according to claim 1, wherein the first indication information comprises one or more indices of the one or more subbands respectively corresponding to the one or more interlace segments and an index of the interlace corresponding to the one or more interlace segments.

8. The terminal according to claim 1, wherein the first indication information comprises a resource indication value (RIV).

9. The terminal according to claim 1, wherein the transmitter is configured to send a second indication information to the network device, wherein the second indication information is used to indicate an idle second bandwidth that is detected by the terminal and that is used for uplink transmission, the second indication information comprises at least one of the following: a size and/or index of a subband occupied by uplink transmission, an index of a carrier or a subcarrier occupied by uplink transmission, a range of the carrier or the subcarrier occupied by uplink transmission, or an index of a resource block occupied by uplink transmission.

10. A signal transmission method, comprising:
  receiving, by a terminal, first indication information from a network device, wherein the first indication information is used to indicate an uplink resource allocated by the network device to the terminal in a first bandwidth; the uplink resource comprises one or more interlace segments corresponding to one or more subbands in the first bandwidth, wherein each one of the one or more interlace segments is a segment of an interlace located in a subband;
  performing, by the terminal, uplink transmission on the one or more interlace segments corresponding to the one or more subbands after sensing the one or more subbands to be idle.

11. The method according to claim 10, wherein for different subbands, a spacing between any two adjacent resource blocks in the one or more interlace segments corresponding to the different subbands is the same.

12. The method according to claim 10, wherein the first indication information comprises one or more indices of the one or more subbands respectively corresponding to the one or more interlace segments and an index of the interlace corresponding to the one or more interlace segments.

13. The method according to claim 10, wherein a spacing between two adjacent resource blocks in the interlace is N, and N is a positive integer.

14. The method according to claim 13, if a subcarrier spacing of the first bandwidth is 15 kHz, N=10; if a subcarrier spacing of the interlace is 30 kHz, N=5.

15. The method according to claim 10, the method further comprising:
  sending, by the terminal, a second indication information to the network device, wherein the second indication information is used to indicate an idle second bandwidth that is detected by the terminal and that is used for uplink transmission, the second indication information comprises at least one of the following: a size and/or index of a subband occupied by uplink transmission, an index of a carrier or a subcarrier occupied by uplink transmission, a range of the carrier or the subcarrier occupied by uplink transmission, or an index of a resource block occupied by uplink transmission.

16. The method according to claim 10, wherein resource blocks of the each one of the one or more interlace segments are a part of resource blocks of a corresponding interlace.

17. The method according to claim 10, wherein the first indication information comprises a resource indication value (MV).

18. The method according to claim 10, wherein if a subcarrier spacing of the first bandwidth is 30 kHz, N=5.

19. The network device according to claim 18, wherein if a subcarrier spacing of the first bandwidth is 15 kHz, N=10.

20. The network device according to claim 18, wherein if a subcarrier spacing of the first bandwidth is 30 kHz, N=5.

21. A network device, comprising: a transmitter, a receiver, a memory, and a processor coupled to the memory, wherein the processor is configured to invoke an instruction stored in the memory to control the transmitter;
  the transmitter is configured to send first indication information to a terminal, wherein the first indication information is used to indicate an uplink resource allocated by the network device to the terminal in a first bandwidth, and the uplink resource comprises one or more interlace segments corresponding to one or more subbands in the first bandwidth, wherein each one of the one or more interlace segments is a segment of an interlace located in a subband; and
  the receiver is configured to receive second indication information sent by the terminal, wherein the second indication information is used to indicate an idle second bandwidth that is detected by the terminal and that is used for uplink transmission, wherein uplink transmission to the receiver is performed by the terminal on the one or more interlace segments corresponding to the one or more subbands after sensing the one or more subbands to be idle.

22. The network device according to claim 21, wherein the second indication information comprises at least one of the following: a size and/or index of a subband occupied by uplink transmission, an index of a carrier or a subcarrier occupied by uplink transmission, a range of the carrier or the subcarrier occupied by uplink transmission, or an index of a resource block occupied by uplink transmission.

23. The network device according to claim 21, wherein a spacing between two adjacent resource blocks in the interlace is N, and N is a positive integer.

24. The network device according to claim 21, wherein resource blocks of the each one of the one or more interlace segments are a part of resource blocks of a corresponding interlace.

25. The network device according to claim 21, wherein for different subbands, a spacing between any two adjacent resource blocks in the one or more interlace segments corresponding to the different subbands is the same.

26. The network device according to claim 21, wherein the first indication information comprises one or more indices of the one or more subbands respectively corresponding to the one or more interlace segments and an index of the interlace corresponding to the one or more interlace segments.

27. The network device according to claim 21, wherein the first indication information comprises a resource indication value (MV).

* * * * *

UNITED STATES PATENT AND TRADEMARK OFFICE
CERTIFICATE OF CORRECTION

| | | |
|---|---|---|
| PATENT NO. | : 11,387,969 B2 | Page 1 of 1 |
| APPLICATION NO. | : 16/706017 | |
| DATED | : July 12, 2022 | |
| INVENTOR(S) | : Qiong Jia, Jun Zhu and Yingpei Lin | |

It is certified that error appears in the above-identified patent and that said Letters Patent is hereby corrected as shown below:

In the Claims

In Claim 17, Column 56, Line 10, delete "(MV)" and insert --(RIV)--.

In Claim 27, Column 56, Line 66, delete "(MV)" and insert --(RIV)--.

Signed and Sealed this
Nineteenth Day of December, 2023

Katherine Kelly Vidal
*Director of the United States Patent and Trademark Office*